(12) United States Patent
Wagner et al.

(10) Patent No.: US 12,204,234 B2
(45) Date of Patent: *Jan. 21, 2025

(54) ACTIVELY STABILIZED PAYLOAD SUPPORT APPARATUS AND METHODS

(71) Applicants: Steven D. Wagner, Belmont, CA (US); Garrett W. Brown, Philadelphia, PA (US); Jerry Holway, Exton, PA (US); H. Robert Orf, Simi Valley, CA (US)

(72) Inventors: Steven D. Wagner, Belmont, CA (US); Garrett W. Brown, Philadelphia, PA (US); Jerry Holway, Exton, PA (US); H. Robert Orf, Simi Valley, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 17/353,360

(22) Filed: Jun. 21, 2021

(65) Prior Publication Data

US 2021/0364899 A1  Nov. 25, 2021

Related U.S. Application Data

(63) Continuation-in-part of application No. 16/518,420, filed on Jul. 22, 2019, now Pat. No. 11,042,078,
(Continued)

(51) Int. Cl.
*F16M 11/18* (2006.01)
*F16M 11/10* (2006.01)
(Continued)

(52) U.S. Cl.
CPC ......... *G03B 17/563* (2013.01); *F16M 11/105* (2013.01); *F16M 11/18* (2013.01);
(Continued)

(58) Field of Classification Search
CPC ...... F16M 13/04; F16M 11/123; F16M 11/18; F16M 11/38; F16M 13/00; F16M 11/041;
(Continued)

(56) References Cited

U.S. PATENT DOCUMENTS 3,638,502 A * 2/1972 Leavitt .................. G03B 15/00
                                                    74/5.34
4,989,466 A * 2/1991 Goodman .............. G01C 21/18
                                                    74/5.22
(Continued)

FOREIGN PATENT DOCUMENTS

FR           3029264 A1    6/2016
WO       2018178776 A1   10/2018

OTHER PUBLICATIONS

Masten, Inertially stabilized platforms for optical imaging systems, 2008, IEEE, p. 47-64 (Year: 2008).*
(Continued)

*Primary Examiner* — McDieunel Marc
(74) *Attorney, Agent, or Firm* — Barnes & Thornburg LLP

(57) ABSTRACT

A payload stabilizer and methods for stabilizing a payload suitable for use with video camera payloads. The support and stabilizing apparatus has a gimbal having two or more mutually perpendicular axes about which motion is generated by at least two of a pan motor, a tilt motor and a roll motor wherein the pan motor is integral to the gimbal handle and surrounds the main post. The stabilizer has a feedback system providing supplemental torques to the payload through a gimbal.

12 Claims, 49 Drawing Sheets

Related U.S. Application Data which is a continuation-in-part of application No. 15/924,819, filed on Mar. 19, 2018, now Pat. No. 10,359,690, which is a continuation of application No. 15/438,290, filed on Feb. 21, 2017, now Pat. No. 9,921,459, which is a continuation-in-part of application No. 15/160,675, filed on May 20, 2016, now Pat. No. 9,575,330, which is a continuation-in-part of application No. 14/267,500, filed on May 1, 2014, now Pat. No. 9,360,740, which is a continuation-in-part of application No. PCT/US2012/063298, filed on Nov. 2, 2012.

(60) Provisional application No. 62/175,666, filed on Jun. 15, 2015, provisional application No. 62/165,461, filed on May 22, 2015, provisional application No. 61/587,439, filed on Jan. 17, 2012, provisional application No. 61/554,676, filed on Nov. 2, 2011.

(51) Int. Cl.
| | |
|---|---|
| *F16M 11/20* | (2006.01) |
| *F16M 13/00* | (2006.01) |
| *F16M 13/04* | (2006.01) |
| *G02B 27/64* | (2006.01) |
| *G03B 17/56* | (2021.01) |

(52) U.S. Cl.
CPC ........ *F16M 11/2064* (2013.01); *F16M 13/00* (2013.01); *F16M 13/04* (2013.01); *G02B 27/646* (2013.01); *G03B 17/561* (2013.01); *F16M 2200/042* (2013.01); *F16M 2200/044* (2013.01)

(58) Field of Classification Search
CPC .. F16M 11/2064; F16M 11/105; F16M 11/08; F16M 2200/041; F16M 2200/044; F16M 2200/042; G03B 17/561; G03B 17/563; G02B 27/646

See application file for complete search history.

(56) References Cited

U.S. PATENT DOCUMENTS

| | | | |
|---|---|---|---|
| 5,555,019 | A | 9/1996 | Dole |
| 5,995,758 | A * | 11/1999 | Tyler .................... G02B 27/646 |
| | | | 248/325 |
| 9,360,740 | B2 * | 6/2016 | Wagner .................. F16M 11/18 |
| 9,575,330 | B2 * | 2/2017 | Wagner .............. F16M 11/2064 |
| 9,921,459 | B2 * | 3/2018 | Wagner .................. F16M 13/04 |
| 11,042,078 | B2 * | 6/2021 | Wagner ................ G02B 27/646 |
| 2010/0124414 | A1 | 5/2010 | Brown |
| 2014/0288694 | A1 | 9/2014 | Wagner et al. |
| 2018/0332197 | A1 | 11/2018 | Crone |
| 2020/0014316 | A1 | 1/2020 | Hobbs |

OTHER PUBLICATIONS

Hilkert, Inertially stabilized platform technology Concepts and principles, 2008, IEEE, p. 28-46 (Year: 2008).*
Kamm, Controlled Motion, 1996, IEEE, p. 153-171 (Year: 1996).*
Kwak et al., Dual stage and digital image based method for sight stabilization, 2008, IEEE, p. 1114-1119 (Year: 2008).*
International Search Report and Written Opinion mailed Nov. 18, 2022 in International Patent Application PCT/US2022/034318.
Reduction of Cogging Torque in Surface Mounted Permanent Magnet Brushless DC Motor by Adapting Rotor Magnetic Displacement (Anuja et al.) Energies 2021, 14, 2861. May 15, 2021.

* cited by examiner

SECTION A-A

SECTION A-A

ACTIVELY STABILIZED PAYLOAD SUPPORT APPARATUS AND METHODS

CROSS REFERENCE TO RELATED APPLICATIONS

This application is a continuation-in-part of U.S. patent application Ser. No. 16/518,420, filed Jul. 22, 2019, which is a continuation in part of U.S. patent application Ser. No. 15/924,819, filed Mar. 19, 2018, which is a continuation of U.S. patent application Ser. No. 15/438,290, filed Feb. 21, 2017. U.S. patent application Ser. No. 15/438,290 is a continuation-in-part of U.S. patent application Ser. No. 15/160,675, filed May 20, 2016, which issued as U.S. Pat. No. 9,575,330. U.S. patent application Ser. No. 15/160,675 claims benefit of U.S. Provisional Patent Application No. 62/165,461, filed May 22, 2015, and U.S. Provisional Patent Application No. 62/175,666, filed Jun. 15, 2015, and is a continuation-in-part of U.S. patent application Ser. No. 14/267,500, filed May 1, 2014, which issued as U.S. Pat. No. 9,360,740. U.S. patent application Ser. No. 14/267,500 is a continuation-in-part of International Patent Application No. PCT/US2012/063298, filed Nov. 2, 2012, which claims the benefit of U.S. Provisional Patent Application No. 61/587,439, filed Jan. 17, 2012, and U.S. Provisional Patent Application No. 61/554,676, filed Nov. 2, 2011. The aforementioned applications and patents are incorporated herein by reference.

BACKGROUND OF THE INVENTION

This invention relates generally to inertial stabilizing devices and to methods therefore, and is applicable to payloads such as, for example, image capture devices including portable video and film cameras.

Mobile film or video cameras typically require angular and spatial stability in order to obtain smooth, quality results. One type of stabilizer is a passive inertial camera stabilizer. Passive inertial camera stabilizers reduce or avoid unwanted angular and spatial motion, while also benefiting from direct operator control. Passive inertial stabilizers are used to support a variety of cameras including, for example, light-weight hand-held cameras and large cameras. Most passive stabilizers require significant training time and effort to become technically proficient in their use. Passive stabilizing systems for light-weight cameras with reduced moments of inertia, may require greater skill and technique for effective use.

Although a variety of camera stabilization systems are available, challenges still remain in providing consistent stabilization control of payload platforms. Particularly, there is a need for an active stabilizer system for use with miniaturized/lightweight cameras.

SUMMARY OF THE INVENTION

Embodiments of an actively stabilized payload support apparatus are disclosed. The payload support apparatus has a gimbal with a first gimbal axis, for example a roll axis, and a second gimbal axis, such as a tilt axis, wherein the gimbal axes are perpendicular to the second gimbal axis. The gimbal has a torque generator system that includes torque generators for one or more of the gimbal axes. In an exemplary embodiment, a rotation measuring device measures an angle θ of rotation of a pan shaft or pan motion, which represents a third gimbal axis. Processing devices are configured to receive angle θ and one or more non-transitory storage devices on which is stored executable computer code are operatively coupled to the one or more processing devices. When the code is executed algorithms obtain a first gimbal axis torque and a second gimbal axis torque. The torque generators then generate the first and second gimbal axis torques.

Further disclosed are payload support apparatuses that can be used with methods disclosed herein. An illustrative apparatus of the support and stabilizing apparatus has a gimbal having two or more mutually perpendicular axes about which motion is generated by at least two of a pan motor, a tilt motor and a roll motor wherein the pan motor is integral to the gimbal handle and surrounds the main post.

DESCRIPTION OF THE DRAWINGS

The detailed description refers to drawings briefly described here. Arrows showing rotation in the drawings are merely to indicate rotation and not to limit the rotation as to direction. Components in some figures are removed to expose other parts of interest. All figures are of illustrative embodiments of an actively stabilizing payload support, components thereof or accessories thereto.

DETAILED DESCRIPTION OF THE INVENTION

For simplicity, illustrative embodiments of the actively stabilized payload support will be described as they relate to a camera payload.

Illustrative embodiments of the actively stabilized payload support include an arrangement of interdependent sub-assemblies coupled in an interconnected continuous feedback loop fashion. In an illustrative embodiment, four possible sub-assemblies include:

1: Balanced Component Assembly

The balanced component assembly includes a "SLED" structure. An illustrative sled structure is described in U.S. Pat. No. 4,017,168, incorporated herein by reference, where it is designated as "equipment for use in hand held photography". The sled structure will be referred to herein in an abbreviated manner as a rig or stabilizer. The stabilizer together with a payload, such as a camera and related equipment, will be referred to as a "balanced component assembly."

Figure 1:
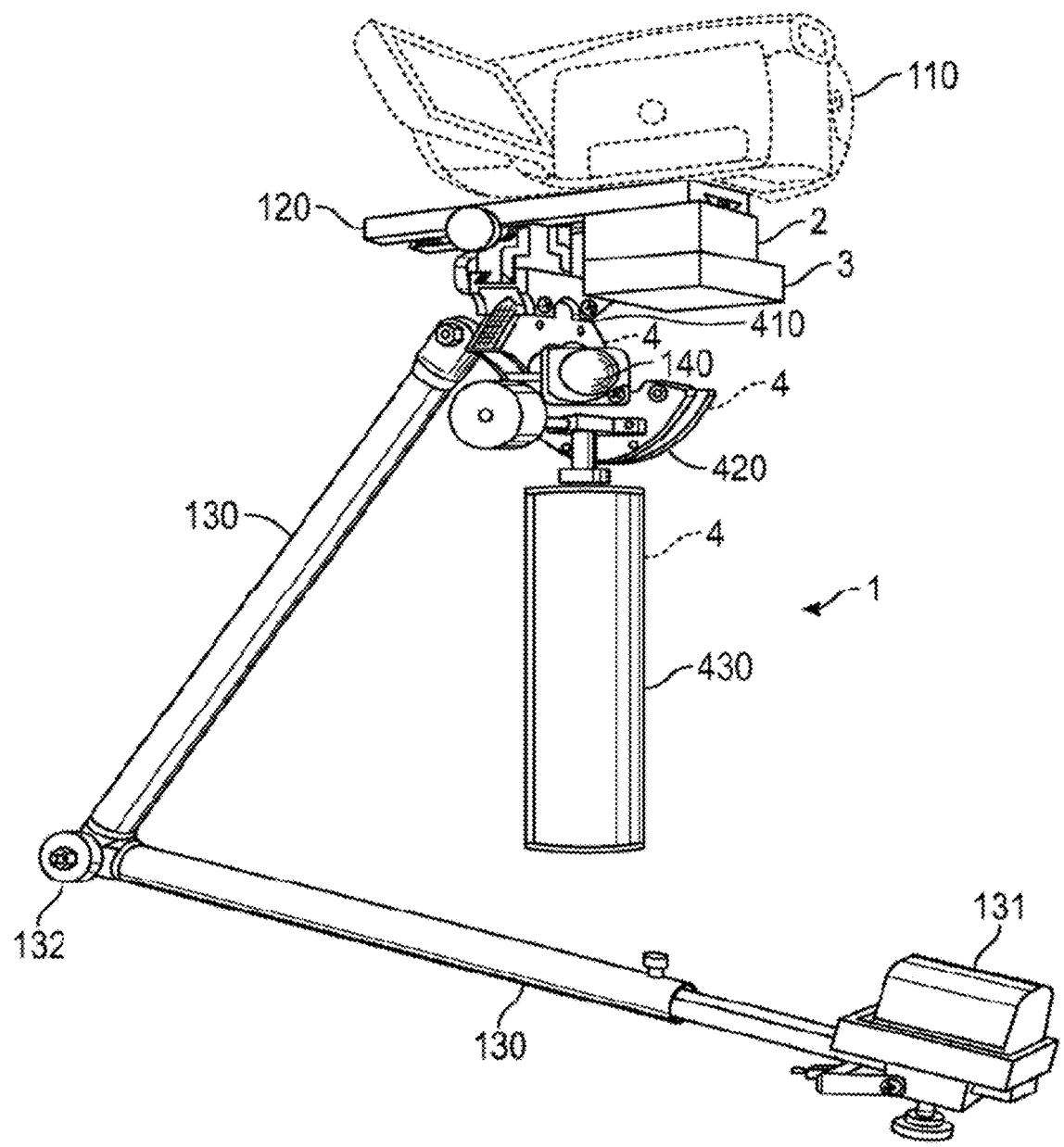
FIG. 1 depicts a stabilizer according to an illustrative embodiment of the invention.

FIG. 1 depicts a balanced component assembly according to an illustrative embodiment of the invention. Stabilizer 1 comprises a platform 120 for supporting a camera payload 110 or other payload to be oriented; the platform is coupled to a stiff space-frame 130 extending away from and below platform 120. At the distal end of coupled space-frame 130 are counterweights often consisting of useful components such as a battery 131 and/or a video monitor or simple counter-balance weights 132. The balanced component assembly has a shifted center of gravity (CG) outside and below the supported payload's natural center of gravity where we can place an omni axial gimbal. The omni axial gimbal comprises a roll axis torque generator 410, a tilt axis torque generator 420 and a pan torque generator 430, or other mutually perpendicular set of axes. The omni axial gimbal transfers the weight of the balanced structure to an external support, such as a handle, which is part of pan torque generator 430, while allowing free rotation of the balanced component assembly about its CG, preferably around any and all possible rotational axes with respect to the external support's orientation. Attached to the balanced component assembly near its CG is an operator control or "guide" 140 to which the operator may apply steering torques to the "sled" to point or otherwise guide the supported payload, such as to frame the subject to be captured by a camera, for example.

As will be shown, illustrative embodiments of the stabilized payload support build upon and may add inertial stability to traditional balanced Steadicam®-type or other stabilizing structures, such as stabilizer 1, and work cooperatively with and may use to its advantage natural passive angular inertia therein. Existing actively stabilized mounts try to minimize inertia of the camera payload, and thus, may require more accurate and possibly expensive inertial sensors, higher bandwidth and potentially less stable feedback control and more precise physical structures to achieve the same level of angular stability. Conventional actively stabilized mounts may also be more limited as to the size and weight of the supported camera.

Illustrative embodiments of the inertial enhancement feature are particularly applicable to the newer, smaller, lighter, and lower inertia rigs such as the Steadicam Merlin® sold by The Tiffen Company, LLC. As will be shown, illustrative embodiments of the actively stabilized payload support multiply angular inertia, which may make these small rigs less susceptible to wind disturbance and inadvertent operator input, possibly making them perform like larger/heavier rigs without adding significant weight/size.

Referring again to FIG. 1, attached to and responsive to stabilizer 1 is the next component, namely:

2: Angular Motion Sensing Unit.

Angular motion sensing units, such as inertial measurement units (IMUs), for example, typically measure the angular rotation rates and linear accelerations and the orientation with respect to gravity of the objects or vehicles to which they are attached. In an illustrative embodiment, a so called "six degrees of freedom" angular motion sensing unit is employed measuring the composite angular rotation rate of the attached stabilizer plus camera about three substantially mutually orthogonal axes by so called "angular rate sensors" and the spatial acceleration along three linear and mutually orthogonal axes via accelerometers. The three angular rate sensors are typically mounted in alignment with the camera's, or other payload's, "roll", "tilt" and "pan" axes of rotation. The linear accelerometers of the angular motion sensing unit are typically aligned along the camera's "up-down", "left-right" and "fore-aft" axes. The accelerometers respond to actual linear acceleration through space as well as the static acceleration due to gravity, the latter useable to detect the steady state angles of orientation of the camera payload referenced to earth based "vertical/horizontal" directions.

According to illustrative embodiments of the invention, the angular motion sensing unit preferably estimates all possible motions of the sled plus payload and allows development of stabilizing counter-torques via the feedback controller algorithms, which will be described below.

The phrase "supplemental torques" is used to mean "stabilizing counter torques", "counter torques", "supplemental torques", "correctional torques", or "stabilizing torque signals", which are torques applied actively through the gimbal's attached omni-axial torque generator 4 to achieve stability.

By estimating the balanced component assembly's rotation via the angular rate sensors and its gravitational orientation via the accelerometers, the algorithms have information signals required to develop stabilizing counter torques creating the stabilizing adjustments developed by the next sub-assembly, of FIG. 1 which is responsive to the angular motion sensing unit, namely:

3: The Signal Processor and Its Supported Feedback Controller, and the Combination of Both Algorithmic Methods that It Supports:

Feedback Controller 3 receives motion signals from the angular motion sensing unit subassembly 2 and through a combination of algorithms produces stabilizing counter torque signals. These counter torque signals are converted to physical torques with the omni-axial torque generator 4, comprising for example three individual torque generators 410, 420, 430 responsive to the stabilizing counter torque signals. Torque generators 410, 420, 430 produce torques about the roll axis, tilt axis, and pan axis, respectively. The angular motion sensing unit 2 measures the resulting rotational orientation and rates and produces representative signals that are fed back to feedback controller 3 to complete a feedback loop producing the desired stability.

Feedback Controller 3 with its algorithms, which is responsive to angular motion sensing unit subassembly 2 shown in FIG. 1 and co-located with payload 110, monitors the maximum supplemental torques available to be generated and coupled between the payload (camera) side of the gimbal and the operator side. Feedback controller 3 further synthesizes an inertial enhancement, static and dynamic frictional and leveling torques and combines them so that the operator experiences them at control guide 140 of the stabilizer in a preferably substantially natural way such that the operator may be unaware that the unit is actively stabilized. In an exemplary embodiment of the actively stabilized payload support, the device mimics the feel of a passive stabilizer via the stability enhancement features and acting additively to the physical rig's natural passive feel.

In an exemplary embodiment of the actively stabilized payload support, the operator is provided with a familiar "hands on" way to orient the balanced component assembly while Feedback Controller 3 acts simultaneously and cooperatively to enhance or otherwise modify stability.

Feedback Controller 3 hardware supporting the algorithms is implemented by a so called "real time signal processor", such as a digital signal processor. "Real time" as used herein means that the processor will receive input signal(s), act upon them pursuant to the algorithms and produce a final result with a delay short enough that it will not negatively affect the stability or performance of Feedback Controller 3 and its controlled structure.

Figure 2:
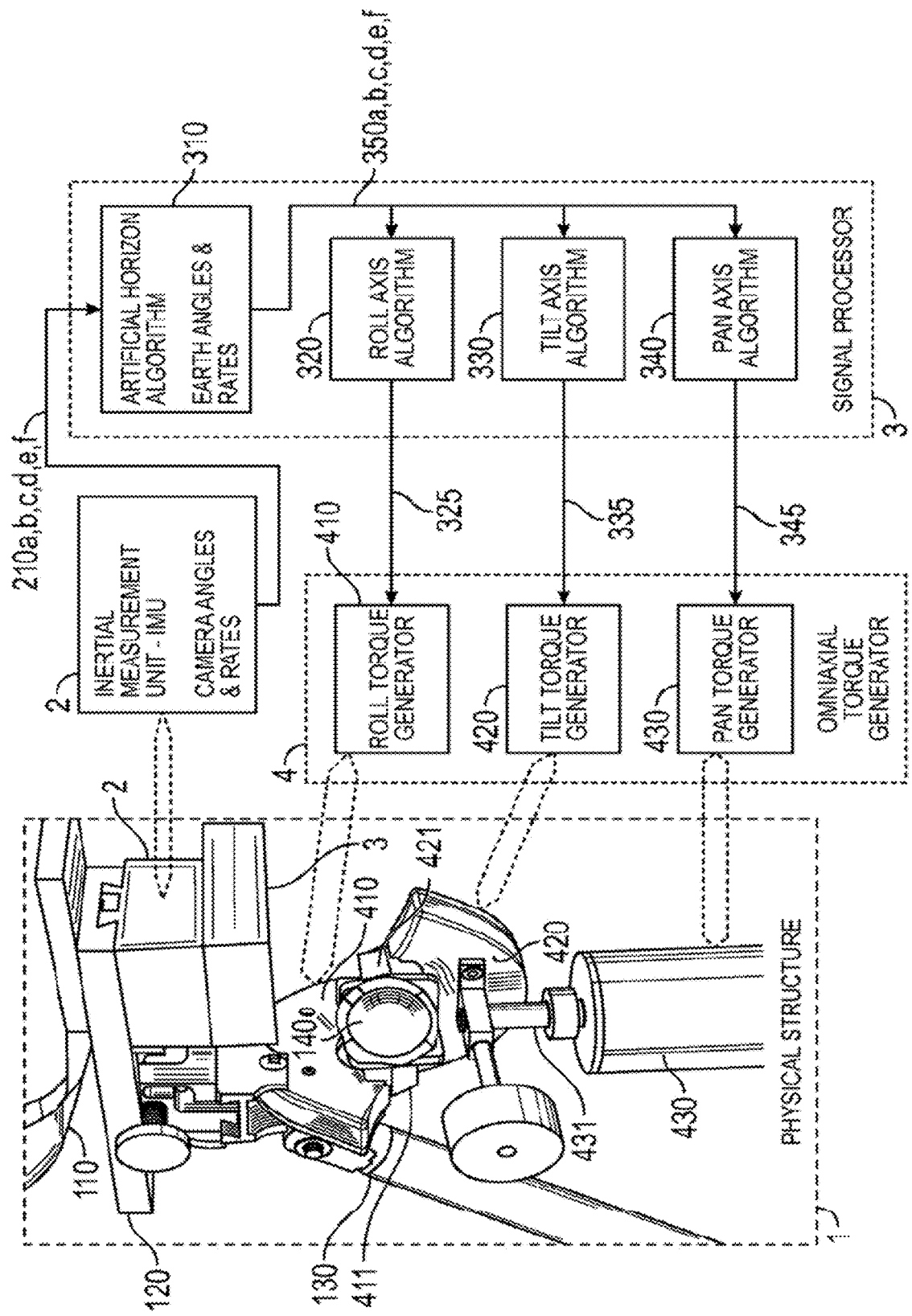
FIG. 2 is a block diagram of an illustrative embodiment of the invention and depicts the correspondence to an illustrative physical structure.

In an illustrative embodiment of the actively stabilized payload support, processed in the first part of Feedback Controller 3 algorithm combination are angular motion sensing unit 2 sensor signals using, or based upon, algorithms such as those known as "vertical gyro", "artificial horizon" or "attitude and heading reference system (AHRS)" algorithms, referred to herein as an "artificial horizon" algorithm 310 of FIG. 2. This algorithm receives the "vehicle referenced" (in this illustrative case, camera payload referenced) signals, such as 210a, b, c, d, e, f from inertial sensors attached to camera payload 110 and converts them to "earth-referenced" signals, such as 350a, b, c, d, e, f that are useable (preferably directly) by subsequent algorithms 320, 330, 340, for example. "Earth-referenced" as used herein means that artificial horizon algorithm 310 produces motion signals that represent the roll/pitch/yaw rates of rotation and absolute angular orientation of camera payload 110 with respect to the earth and in particular with respect to a plane that is parallel to the earth's local horizon, and thus, is perpendicular to the direction of local gravity. As applied to orienting a camera, as opposed to an air or space vehicle, the equivalent terms "roll/tilt/pan" are used instead of "roll/pitch/yaw" rates and absolute angles.

Artificial horizon algorithm 310 estimates absolute earth-based tilt and roll angles of the supported payload despite lateral acceleration motions. This can be likened to creating a virtual "stable table," upon which the camera platform can be virtually mounted, facilitating stability enhancements, such as those described next.

Note that the terms "inertia", "angular inertia", and "moment of inertia" are used interchangeably throughout this description as they relate to angular stabilization.

Stability enhancement algorithms implementation will now be explained. According to illustrative embodiments of the actively stabilized payload support, referring now to FIG. 2, we subdivide and implement the remaining algorithmic methods in three parallel paths, each assigned to a particular axis of rotation of stabilizer 1 and each producing a corrective torque applied through a corresponding axis of omni-axial torque generator 4 attached to a gimbal of the stabilizer 1, namely:

(1) Roll Axis Algorithm 320 implements the horizon leveling feature by applying supplemental torque through the roll axis of the gimbal mounted torque generator 410.

(2) Pan Axis Model Follower Algorithm 340 implements the pan inertia enhancement plus static and dynamic frictions for this axis by applying supplemental torque through the pan axis of the gimbal mounted torque generator 430.

(3) Tilt Axis Model Follower Algorithm 330 implements the tilt inertia enhancement plus static and dynamic frictions for this axis by applying supplemental torque through the tilt axis of the gimbal mounted torque generator 420.

It is noted that "roll", "pan" and "tilt" are used for illustrative purposes, but as mentioned earlier, they can be replaced by other mutually perpendicular axes.

The algorithmic separation between roll, tilt and pan axis algorithms 320, 330 340, allows stability corrections of different strengths to be applied to each axis, which may be advantageous because conventional balanced stabilizing rigs may exhibit differing amounts of natural angular inertia about each primary axis of rotation. For example, the tilt and roll axis inertia is usually greater than the pan inertia due to the typical sled being somewhat taller than it is deep or wide. Illustrative embodiments of the actively stabilized payload support may create a stabilized rig that may equalize the angular inertia among all axes as perceived by the operator at the control handle/guide if desired.

Figure 5:
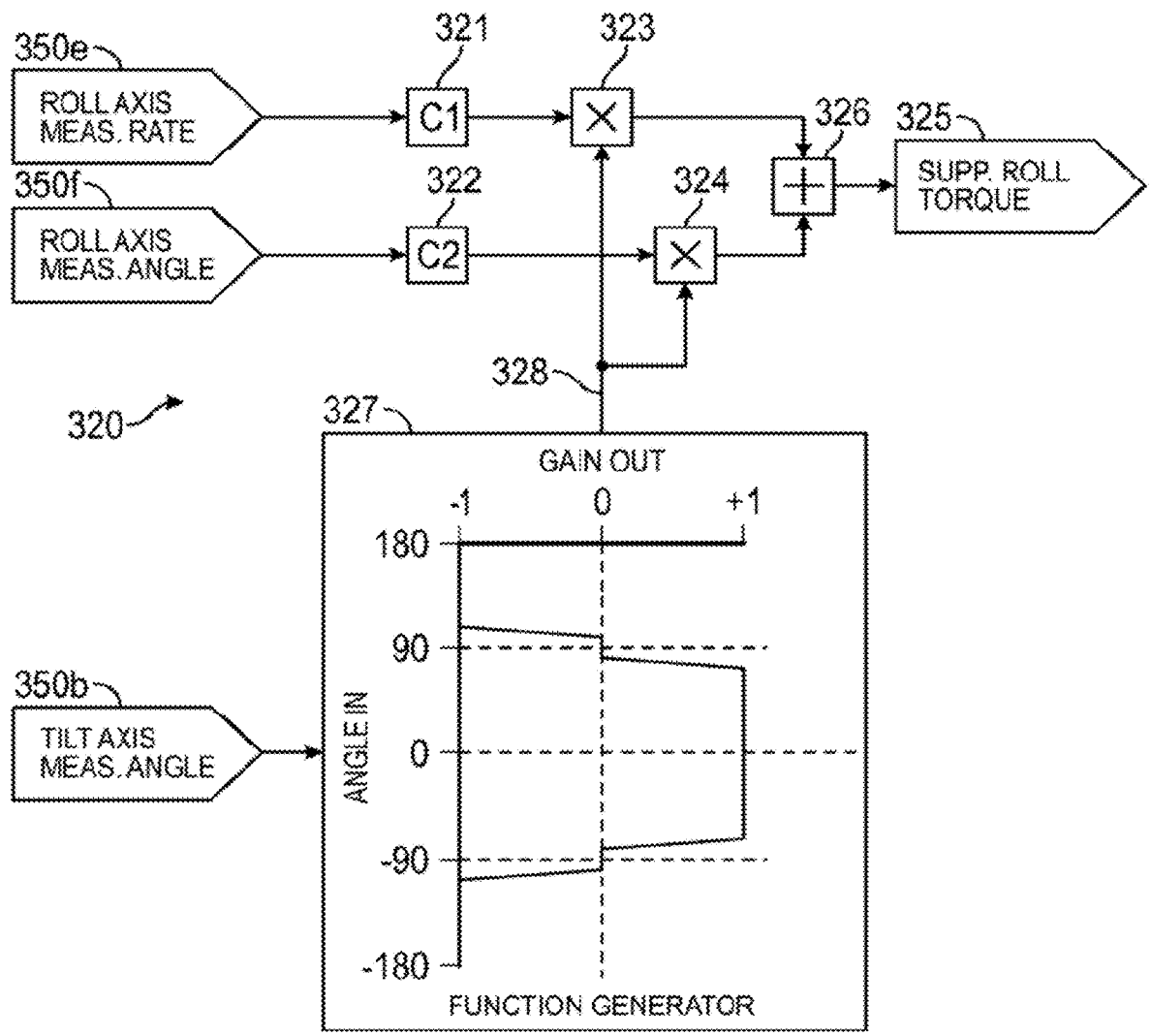
FIG. 5 is a signal processing block diagram of an algorithm applicable to stabilize the roll axis according to an illustrative embodiment of the invention.

Description of the Stabilizing Algorithms for Each Axis:

Roll Axis Algorithm 320 of FIG. 2 and FIG. 5—Horizon Leveling:

Roll Axis Algorithm 320 according to an illustrative example provides, optionally with no additional moving parts to the assembly 1, a horizon leveling feature. Operators of traditional stabilizers dedicate significant mental effort in keeping it level. Having this low level chore done automatically frees the operator to concentrate on the framing of the camera move at hand and navigating through the set to achieve the shot. Furthermore, since the leveling feature is provided through active gimbal torques, the balanced component assembly comprising stabilizer 1 may be neutrally balanced instead of bottom-heavy as is the custom. Advantageously, in an exemplary embodiment of the invention, an operator may tilt at will without fighting the constant torque of a bottom-heavy rig resulting in more stable framing at larger tilt angles. Importantly, roll axis algorithm 320 causes the horizon leveling to be maintained a plurality of or all tilt angles and while panning at all or many practical speeds.

Illustrative embodiments of the invention may mimic the inherently level horizon of a ground-based and leveled tripod or dolly plus camera attached to a standard pan-tilt mount. Such an arrangement allows an operator to frame and follow a subject by pushing on a so called pan-tilt handle, freely "panning and tilting" to capture the subject all while the camera's horizon remains automatically level, thus, of no concern to the operator. By construction and set-up, the tilt axis of a ground-based mount is typically parallel to the ground so the mounted camera typically remains level.

Referring to FIG. 5, the aforementioned horizon leveling is achieved using two signals provided by the artificial horizon algorithm 310: roll axis measured rate 350e and absolute roll axis measured angle 350f referenced to earth. The roll angle is arranged to read zero when the camera is level (tilt axis is horizontal) and to read positive when the camera is non-level clockwise, negative when non-level counterclockwise. Similarly, the roll rate is zero when the camera is not rotating about the roll axis, positive if in motion rotating clockwise, negative if in motion rotating counterclockwise about the roll axis. We scale each of these signals by selected scale factors C1, C2 respectively (321, 322) and sum them with adder 326 to create a 'roll counter torque' feedback signal 325, i.e. supplemental roll torque, applied through gimbal-mounted roll torque generator 410. With properly selected scale factors a rapidly responsive feedback loop is created that coaxes the rig plus camera back to level despite external disturbances.

Pan and Tilt Axis Algorithms—Enhanced Inertia Plus Static and Dynamic Frictions, Referring to FIG. 2:

In addition to inertial enhancement, pan and tilt axis algorithms 340, 330 add to a stabilizer assembly's features from the standard ground-based camera's fluid damped pan-tilt head, namely dynamic and static friction, referenced to a fixed inertial frame provided by artificial horizon algorithm 310. Static friction helps the camera operator maintain a fixed pan/tilt orientation—so called "lock-off" with reduced or minimal effort. Dynamic friction typically enhances slow pan and tilt smoothness particularly with long (telephoto) lenses. Both of these synthesized frictions may also help attenuate camera disturbances due to wind gusts and excessive operator input to the guide 140.

Pan axis algorithm 340 and tilt axis algorithm may be identical but may employ different inertia, static friction, and dynamic friction objectives, creating a separately controllable desired response for each axis.

Tilt axis model follower algorithm 330 is responsive to artificial horizon algorithm 310 provided angular tilt rate 350*a* and absolute tilt angle 350*b* produce a supplemental tilt torque 335 applied through the omni-axial torque generator's tilt axis via tilt torque generator 420.

Similarly, pan axis model follower algorithm 340 is responsive to artificial horizon algorithm 310 provided angular pan rate 350*c* and pan angle 350*d* produce a supplemental pan axis corrective torque 345 applied through the omni-axial torque generator's pan axis via pan torque generator 430.

Note that pan angle is relative to an arbitrary starting position and is not absolute as with roll/tilt since the artificial horizon algorithm gives no absolute indication as to which direction the camera is pointing pan-wise without a compass or the like. The pan axis algorithm accounts for this by computing corrective torques based on changes in pan angle not absolute pan angular direction.

The Pan/Tilt axis algorithm will now be described referring now to FIG. 3 and FIG. 4. Synthesized inertial enhancement plus beneficial frictions are added to the pan and tilt axes of a passive balanced component assembly. Algorithms for the pan and tilt axis simulated physical models 341, 331 are employed plus pan and tilt axis model followers 346, 336 are employed. The basic technique comprises building a real time simulation of an idealized model that mimics the physics of the desired enhanced balanced component assembly within the signal processor. The simulated balanced component assembly is driven by an estimate of net external pan/tilt torques signals 343, 333 applied to the actual passive balanced component assembly. The simulated balanced component assembly's computed desired motions are then compared to the actual passive balanced component assembly's measured motions and correctional feedback torques based on differences thereof are developed that coerce the physical balanced component assembly's motions in an effort to match those of the simulated one. If omni-axial torque generator 4 is powerful enough and the bandwidth of the feedback loop is high enough, the balanced component assembly will generally closely match (and possibly feel nearly identical for the operator) to the idealized simulated model.

A physical mechanism that models the desired inertia feature is a flywheel mounted on a relatively low friction bearing. The simulated flywheel obeys Newton's laws of rotational motion: If stationary (not rotating) it remains so unless acted upon by an applied external torque. If rotating, it continues at a constant angular rate (in degrees per second for example), either clockwise (CW) or counterclockwise (CCW) unless acted upon by an applied external torque. The flywheel has only two states of being versus time, also known as "states": its current rotational rate (a positive CW value, or a negative CCW value, or zero in degrees per second) and current angular position in degrees. If a constant torque is applied to the stationary flywheel it begins to rotate from zero at an ever increasing angular rate, i.e. it angularly accelerates in proportion to the applied torque divided by the flywheel's modeled moment of inertia. Equivalently, its angular rate increases uniformly over time from zero. If a negative torque is applied to the flywheel it decreases its angular rate uniformly for the time that the torque is applied, eventually stopping then reversing direction if the negative torque persists long enough.

Newton also relates angular position to angular velocity: for example if the flywheel is rotating at a constant rate of one degree per second its angular position advances one full turn in 360 seconds or two full turns in 720 seconds, etc.

The behavior of the modeled inertial flywheel, (i.e. torque input over time produces angular rate over time and angular position over time outputs) can be encapsulated in the following equation set:

Angular rate over time=(integral of [torque in] over time) divided by moment of inertia.

Angular position over time=integral of angular rate over time. Note that the "integral over time" of a time variable quantity is simply the "area under the curve" accumulated below that quantity plotted on a graph versus time, starting at time zero and ending at the current time. The signal processor uses the accepted integrator or accumulator for this function.

Figure 3:
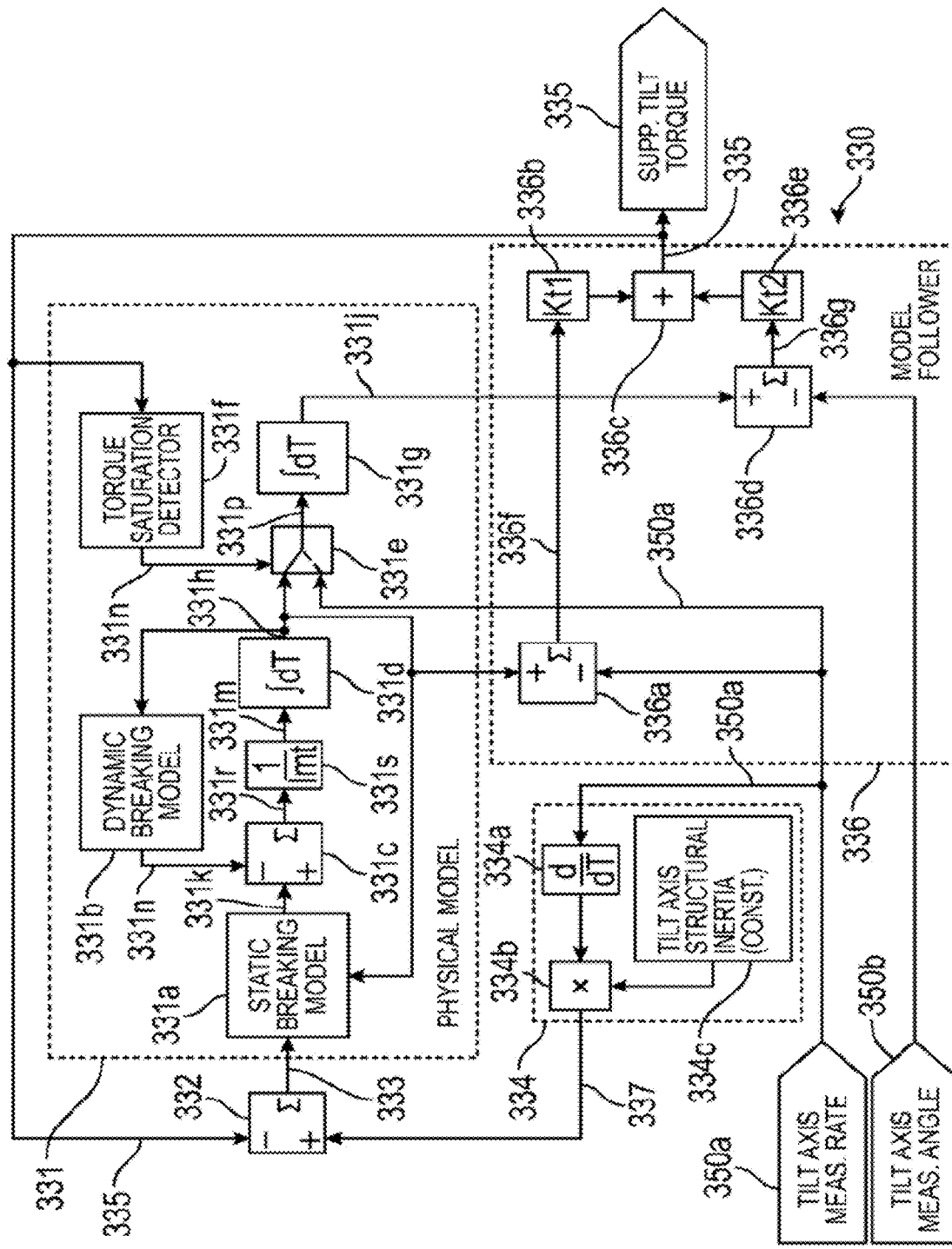
FIG. 3 is a signal processing block diagram of an algorithm applicable to stabilize the tilt axis according to an illustrative embodiment of the invention.

Referring to FIG. 3, we describe the above equation implementation for the tilt axis simulated physical model 331: Torque signal 331*r* is divided by desired moment of inertia Imt by divider 331*s* producing modeled tilt angular acceleration 331*m*. Integrator 331*d* integrates over time the modeled tilt angular acceleration 331*m* producing modeled tilt rate signal 331*h*, passed to second integrator 331*g*, which integrates it over time to produce modeled tilt angle 331*j*. Based on the state of 331*n* (0 or 1) a selector switch 331*e* passes to 331*p* either the signal 331*h* when torque is not saturated as detected by 331*f*, or signal 350*a* when torque is saturated as detected by 331*f*.

Figure 4:
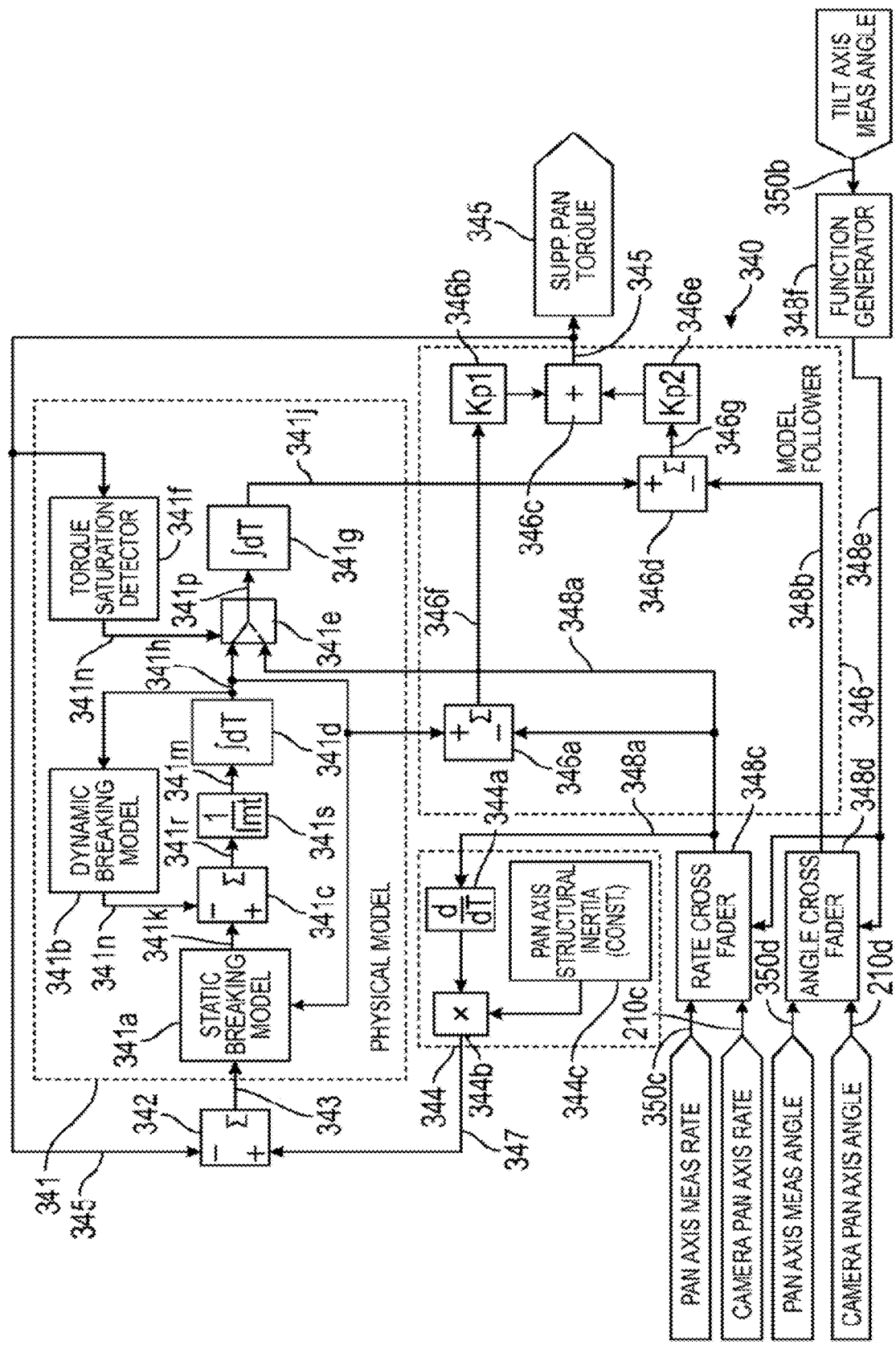
FIG. 4 is a signal processing block diagram of an algorithm applicable to stabilize the pan axis according to an illustrative embodiment of the invention.

Similarly, for the pan axis, referring now to FIG. 4: Torque signal 341*r* is divided by desired moment of inertia Imp by divider 341*s* producing modeled pan angular acceleration 341*m*. Integrator 341*d* integrates over time the modeled pan angular acceleration 341*m* producing modeled pan rate 341*h*, passed to second integrator 341*g*, which integrates it over time to produce modeled pan angle 341*j*. Based on the state of 341*n* (0 or 1) a selector switch 341*e* passes to 341*p* either the signal 341*h* when torque is not saturated as detected by 341*f*, or signal 350*a* when torque is saturated as detected by 341*f*.

The desired simulated static and dynamic frictional torques are now added to the simple inertia only flywheel model. This is equivalent to adding a 'brake' to the flywheel. The brake applies a new opposing torque to the model. If the current angular velocity of the model is zero, we apply a 'static friction' holding torque that matches and preferably completely opposes (is subtracted from) all external torques input to the model up to a set threshold. When external torque applied to the model approaches the set threshold we gradually 'release the brake' (gradually remove the holding torque) allowing the model to begin angularly accelerating in response to the full external torque. When the angular velocity approaches zero the model gradually reapplies the 'static friction' brake. This results in a braking torque coupled from the camera side through the gimbal to the support side via the omni-axial torque generator 4 and its controlling algorithms as will be described.

Referring to FIG. 3 for the tilt axis; a static braking model 331a responds to net external tilt torque signal 333 and as described either passes it directly as tilt torque signal 331k, when modeled tilt rate signal 331h is nonzero, or passes torque of zero to tilt torque signal 331k when tilt torque signal 333 is less than a selected threshold while modeled tilt rate signal 331h is nominally zero.

Referring to FIG. 4 for the pan axis; a second static braking model 341a responds to net external pan torque signal 343 and as described either passes it directly as pan torque signal 341k, when pan modeled rate signal 341h is nonzero, or passes torque of zero to pan torque signal 341k when net external pan torque signal 343 is less than a second selected threshold while modeled pan rate signal 341h is nominally zero.

In parallel to the static friction brake we employ a simulated dynamic friction braking component. This is achieved by adding a dynamic negative feedback torque to the input of the model in opposition to the external torque input. The dynamic negative torque is achieved simply by creating and applying a new torque in scaled proportion to the current angular rate of the model and subtracting the new torque from the external torque input with the difference applied to the model. A scale factor, also known as the 'coefficient of dynamic braking' controls the strength of the dynamic braking effect and when increased is comparable to tightening the 'drag adjusting knob' of a conventional passive fluid damped pan-tilt camera mount.

As a result, the dynamically braked flywheel model responds differently to torque input than does the inertia only version. The inertia only version accelerates continuously with ever increasing angular rate given a constant torque input. With the dynamic braking applied the model angularly accelerates until dynamic braking negative torque equals external torque resulting in preferably net zero torque to the model, which thus settles into constant angular rate motion. This typically will closely model the desirable performance characteristic of the fluid damped pan tilt mount.

For the tilt axis, dynamic braking model 331b responds to the current modeled tilt rate signal 331h, scaling it by a 'tilt axis coefficient of dynamic braking' and produces a tilt dynamic braking torque 331n, which is subtracted from static braking model 331a modified tilt torque signal 331k using subtractor 331c.

For the pan axis, dynamic braking model 341b responds to the current modeled pan rate signal 341h, scaling it by a 'pan axis coefficient of dynamic braking' and produces a dynamic braking torque 341n, which is subtracted from static braking model 341a modified pan torque signal 341k using subtractor 341c.

According to an illustrative embodiment, a modification to the described dynamic braking feature comprises adjusting the 'coefficient of dynamic braking' as a function of rig rotational rate. For instance, we would normally apply maximum dynamic braking for low rotational rates, which typically occur for slow pan and tilt moves called for when using a long (telephoto-type) lens. On the other hand, the natural "friction free" behavior of a traditional passive rig allows very fluid rotating pan and tilt moves launched by the operator by applying some torque to the rig and simply letting go to let it 'coast' to follow a subject. If we gradually reduce the dynamic braking coefficient to zero above a certain axial rotation rate we can accommodate this type of operator move without losing beneficial friction enhanced low pan/tilt rate stability. Thus, the 'coefficient of dynamic braking' implemented by dynamic braking models 331b, 341b of the tilt and pan axis algorithms, respectively, may be a non-linear function of the respective modeled rates 331h, 341h rather than a simple proportional scaling constant.

Further, according to the illustrative embodiment, and as stated earlier, for the tilt and pan axis simulated physical models 331, 341 to respond similarly to actual passive structures, they respond (be driven by torques) as is the stabilizer assembly 1. That is, the models only or primarily respond to torques applied by the operator to the control guide 140 and/or by external disturbances such as wind/air resistance and imbalance torque. The model preferably does not respond to the torques applied through the omni-axial torque generator 4 to which the physical rig 1 is also responsive. In other words, the model preferably is not driven with the total torque derived from the motion signals provided by the artificial horizon algorithm, as it is responsive to all torques the physical rig feels (since the angular motion sensing unit is fixed to the rig), including the supplemental torque, absent a configuration to create a different outcome, thus, it is termed "Total Torque". A "Net External Torque" representing the operator input and external disturbances should be the only driver of the model.

According to this illustrative embodiment, the axis algorithm, such as algorithms 320, 330 or 340, has enough information to estimate this quantity. We first estimate Total Torque by differentiating the axis (pan or tilt) angular rate from the artificial horizon algorithm (that is estimate the slope of the rate signal versus time). This differentiator output is a measure of angular acceleration about the axis. Again using one of Newton's laws we produce:

"Total Torque"="Structural Moment of Inertia" times "angular acceleration"

Where the "Structural Moment of Inertia" is a known physical constant value that may need only be measured once for the particular physical rig axis we are controlling.

We also know the "supplemental torque" generated through the omni axial torque generator about the axis, since it is generated and applied as the final result of this axis algorithm, thus:

"Net External Torque"="Total Torque" minus "supplemental torque" for each axis.

This is the value applied to the simulated physical model. This completes a model with the desired inertial and frictional characteristics, which model can provide angular rate and position goals for use in the next algorithm.

Specifically for the tilt axis, referring to FIG. 3, the 'total tilt torque' 337 is estimated using total tilt torque estimator 334, which differentiates the tilt axis measured rate 350a with signal differentiator 334a, then scales the differentiator output by a constant representative of the known structural inertia about the tilt axis 334c using multiplier 334b to form 'total tilt torque' 337.

Finally we subtract known 'supplemental tilt torque' 335 from 'total tilt torque' 337 using subtractor 332 to produce 'net external tilt torque' 333 applied to the tilt axis simulated physical model 331.

For the pan axis, referring to FIG. 4, the 'total pan torque' 347 is estimated using total pan torque estimator 344, which differentiates the measured pan rate 348*a* with signal differentiator 344*a*, then scales the differentiator output by a constant representative of the known structural inertia about the pan axis 344*c* using multiplier 344*b* to form 'total pan torque' 347.

Finally known 'supplemental pan torque' 345 is subtracted from 'total pan torque' 347 using subtractor 342 to produce 'net external pan torque' signal 343 applied to the pan axis simulated physical model 341.

The remaining sub-algorithm of this illustrative embodiment for the pan and tilt axis, the Model Follower will now be described:

In the model follower algorithm the simulated axis physical models 331, 341 become the 'master reference' and provide modeled angular rate and position goals as already described. The entire balanced component assembly becomes the 'slave' which will be nudged or coerced—via the supplemental tilt and pan torques 335, 345 from the torque generator 4—to match the rate and position goals dictated by the simulated physical model master. If the difference between slave and master is kept small enough the total balanced component assembly may respond and feel to the user closely to a real rig with the stability enhanced physical characteristics that the model simulates.

The artificial horizon algorithm 310 provides the measured rate and orientation of each controlled axis of the rig. From here a feedback loop can be formed to produce the final supplemental torque for each axis. Measured rate and orientation of the physical slave is compared to the modeled rate and position goals of the master by subtraction. These differences are scaled and summed to form the final supplemental torque for this axis. More specifically, the following equation can be used:

"Supplemental Torque"=$K1$ times (modeled_rate minus measured_rate) plus $K2$ times (modeled_angle minus measured_angle)

This equation forms a negative feedback loop wherein the bandwidth and damping of the loop is controlled by choice of the feedback coefficients K1, K2. K1 and K2 are preferably set as large as possible to maximize the fidelity of the slave to the master model. However, typically, practical inertial sensors have some residual electrical noise that will introduce jitter into the system if these coefficients are set too large; therefore the optimum will vary for various examples of the invention.

The polarity of the "supplemental torque" is chosen such that if the physical slave 'falls behind' the master model a positive "supplemental torque" is produced that advances the slave through torque from the torque generator causing it to catch up with the master, conversely if the slave moves ahead of the model a negative torque at the generator retards the slave so it 'falls back' to the master model's position goal.

Specifically for the tilt axis, in reference to FIG. 3, the model follower 336 is implemented by first subtracting tilt axis measured rate 350*a* from modeled tilt rate signal 331*h* forming difference 336*f* using subtractor 336*a*. Secondly, tilt axis measured angle 350*b* is subtracted from modeled tilt angle 331*j* forming difference 336*g* using subtractor 336*d*. Finally, differences 336*f*, 336*g* are scaled by constants Kt1, Kt2, respectively using constant multipliers 336*b* and 336*e*, respectively and summed via adder 336*c* to form final supplemental tilt torque 335.

For the pan axis, in reference to FIG. 4, the model follower 346 is implemented by first subtracting pan axis measured rate 348*a* from modeled pan rate signal 341*h* forming difference 346*f* using subtractor 346*a*. Secondly, pan axis measured angle 348*b* is subtracted from modeled pan angle 341*j* forming difference 346*g* using subtractor 346*d*. Finally, differences 346*f*, 346*g* are scaled by constants Kp1, Kp2, respectively using constant multipliers 346*b* and 346*e*, respectively and summed via adder 346*c* to form final supplemental pan torque 345.

This completes the basic axis algorithm applied individually to the pan and tilt axes for this illustrative embodiment.

Additional Aspects of the Pan and Tilt Axis Algorithms

The practical shortcomings of the described standard "physical simulation model plus model follower" algorithms may be addressed by various illustrative embodiments of the invention. The aforementioned algorithms are effective for as long as the generated supplemental torques remain large enough to overcome the strength of the operator's applied torque and will thus keep the physical rig substantially aligned with the model.

For any practical realizations of the invention, the omni-axial torque generator 4 may be of limited maximum torque due to size and weight limitations of the practical torque motors employed.

Assume for example the standard conventional algorithm is simply employed as described previously. If the operator applies an ever increasing torque, the 'slave' (physical structure) will faithfully follow the 'master' model and the apparatus will accurately provide the desired stability features of inertia enhancement and friction until the omni-axial torque generator 4 reaches its maximum available torque. At that point the 'feel' of the balanced component assembly suddenly changes because there is not enough additional supplemental torque available to coerce the rig to match the model. The balanced component assembly will instantly lose synthesized inertia and will begin to speed up unexpectedly as the operator continues to apply more torque. As orientation of the physical structure races ahead, it begins to significantly outpace the model's positional goal. The operator finally senses the change in feel and instinctively begins to reduce or release completely his/her torque applied to the rig. The torque generator feedback loop eventually comes out of saturation and senses that the balanced component assembly is angularly way ahead of the model's position goal so it applies a maximum torque in the opposite direction coercing the physical rig to rapidly 'fall back' to match the model. This produces, what some may find as an annoying and clearly unacceptable 'servo-instability' or 'reverse spring back' physical behavior as the algorithm strives to reestablish a positional match between physical rig and model.

Illustrative embodiments of the invention address the above shortcomings. Rather than employing the standard physical model with a fixed modeled moment of inertia and fixed coefficient of dynamic braking friction, instead the system automatically reduces the above two model parameters over time in response, for instance, to a function of increasing measured angular rate about each controlled axis.

Thus, as the operator applies constant torque about a selected axis, the measured angular rate about that axis gradually increases and the modeled moment of inertia and dynamic braking strength are gradually reduced. This causes the physical rig to begin to accelerate more quickly than expected but gradually enough so as to produce a timely cue sensed by the operator allowing him/her to reduce applied torque before the torque generator reaches maximum and possibly deleterious results occurs.

Should the operator ignore the above cueing feedback feature, the noted unacceptable 'spring-back' effect can be further mitigated by first sensing when an axis torque generator reaches its maximum torque saturation point. When this occurs the simulated physical model's angular position goal is overridden and replaced with one that lags the physical angular position by a constant amount equal to the model to physical difference that existed when saturation occurs. This modification can ensure that the modeled to physical angular position disparity remains small enough that little or 'no spring-back' occurs when the operator finally releases control of the handle.

Preferably the result of these novel modifications to the simulated physical model is that the stabilized structure of illustrative embodiments of the invention respond to the operator's inputs in a repeatable and controllable way such that although it may not necessarily respond ideally—with fixed enhanced inertia plus friction—it still may be entirely productive in the hands of even an inexperienced operator.

Specifically for the tilt axis, in reference to FIG. 3; The tilt axis modifications are implemented by first reducing the 'tilt axis coefficient of dynamic braking' within the dynamic braking model 331b in response to modeled tilt angular rate signal 331h increases. Further, the modeled moment of inertia Imt within divider 331s is reduced as modeled tilt rate signal 331h increases. This provides the described desired operator cue. Secondly a 'torque saturation detector' 331f indicates when the tilt axis torque generator 420 reaches its maximum value, and in response toggles switch 331e to its downward position, replacing modeled tilt rate signal 331h with tilt axis measured rate 350a to the integrator 331g input via switch 331e output 331p connected to the integrator input. This has the desired effect of causing modeled tilt angle 331j to lag or lead tilt axis measured angle 350b by no more than the difference that existed when saturation occurred, as needed to prevent spring-back instabilities about the tilt axis.

Similarly for the pan axis, in reference to FIG. 4; The pan axis modifications are implemented by first reducing the 'pan axis coefficient of dynamic braking' within the dynamic braking model 341b in response to modeled pan angular rate signal 341h increases. Further, the modeled moment of inertia Imp within divider 341s is reduced as modeled pan rate signal 341h increases. This provides the described desired operator cue. Secondly another 'torque saturation detector' 341f indicates when the pan torque generator 430 reaches its maximum value, and in response toggles switch 341e to its downward position, replacing modeled pan rate signal 341h with pan axis measured rate 348a to the integrator 341g input via switch 341e output 341p connected to the integrator input. This has the desired effect of causing modeled pan angle 341j to lag or lead pan axis measured angle 348b by no more than the difference that existed when saturation occurred, as needed to prevent spring-back instabilities about the pan axis.

Although the independent stabilizing algorithms have each been described as assigned to a separate physical axis of rotation of the rig, the scope of illustrative embodiments of the invention include an alternative that simultaneously models the physical motion of a three dimensional structure in all of its possible rotations, notwithstanding potentially different angular inertias among its axes. A combined algorithm creates the stability enhancements via a three dimensional corrective torque vector applied through the omniaxial torque generator attached to the rig's gimbal. The torque vector aligns with the axis (in three dimensions) about which the torque is to be coupled and has length representing the quantity (clockwise or counterclockwise) of generator torque to be coupled between the 'operator' side and the 'payload' side of the gimbal.

Another observed and generally undesired behavior of the described roll, tilt, pan algorithms is noted and addressed in illustrative embodiments of the invention by further modifications: Specifically, as the physical structure is tilted to a high angle of tilt approaching 90 degrees, known as a the 'zenith' angle the previously described roll horizon leveling algorithm approaches a singularity where its mimicry of the standard pan-tilt mount breaks down and becomes unproductive.

If you observe the behavior of a passive conventional ground based pan-tilt head that can reach 90 degrees of tilt an interesting phenomenon occurs as it approaches the tilt 'zenith': Pushing on the pan-tilt handle in the 'pan' direction increasingly 'rolls' the camera about its roll axis and at true zenith the mechanism locks and camera-referenced pan is no longer possible. While at zenith you are still able to tilt away from zenith and roll about the camera's roll axis but can no longer pan about the camera's pan axis. This behavior, commonly referred to as 'gimbal lock' is avoided in conventional pan tilt mounts as they are constrained to somewhat less than +/−90 degree tilt range.

As exemplary embodiments of the invention are freely hand carried there is little or no physical way to avoid operator tilts through zenith, furthermore the traditional body carried Steadicam®-type mount allows controllable tilt orientation through zenith as the operator can position the gimbal to avoid gimbal lock since the gimbals' axes are not constrained to align with those of the camera.

Therefore, alternate algorithmic rules are justified and can be beneficial to illustrative embodiments of the invention.

Roll Axis Modification for Extreme Tilt Angles:

For a range of tilt angles, say within +/−80 degrees or so of horizontal the described roll axis leveling algorithm prevails. Beyond a predetermined angle as zenith is approached the roll axis drive to horizontal is gradually reduced in feedback strength and is gradually replaced with an 'inertial only' algorithm which tends to maintain the current camera roll angle. Illustrative embodiments of the stabilizer either rely on the physical structure's passive roll inertia and further anticipate transitioning to a roll axis active inertial enhancement similar to that provided by described pan/tilt inertial enhancement algorithms.

Specifically, for the roll axis, in reference to FIG. 5; the tilt axis measured angle 350b is applied to a function generator 327, which as shown produces a variable gain signal output 328, which reduces gain to zero as tilt angles approach zenith and 180 degrees away from zenith. Variable gain signal output 328 is applied to multipliers 323, 324 reducing the roll torque feedback strength as zenith, anti-zenith angles are approached.

Pan Axis Modification for Extreme Tilt Angles:

The pan axis algorithm as described is responsive to an earth oriented measure of pan rate and angle provided by the artificial horizon algorithm. The measured earth oriented pan axis being substantially aligned vertically to local gravity. As a hand held or body carried physical structure, for example, is tilted to zenith the earth pan axis is no longer reasonably aligned with the camera's pan axis and indeed approaches a 90 degree orthogonal relationship. Therefore, illustrative embodiments of the invention, upon sensing a tilt angle beyond a set 'extreme' threshold modifies the pan axis algorithm to be increasingly responsive instead to a measured angle and rate oriented to the camera's own pan axis. Thus, the pan axis algorithm, at extreme angles of tilt, stabilizes the camera about its own pan axis and not an earth based axis. This may 'unlock' the pan axis from the strict earth based pan-tilt mount model and its undesired gimbal lock behavior.

Indeed and of note it has been discovered that if the pan torque generator's axis is reasonably well aligned with the natural pan axis of the camera, a measure of pan rate and orientation may be continuously provided to the pan axis algorithm from inertial sensors aligned to the camera pan axis, rather than an earth-aligned axis. The arrangement may naturally handle pan behavior for all angles of tilt including the 'through zenith' tilt angle situation noted above without algorithm modifications responsive to tilt angle.

To achieve the aforementioned pan axis modification, referring to FIG. 4; the earth-referenced pan axis measured rate and angle 350c, 350d are replaced with camera-referenced pan axis measured rate and angle 210c, 210d, respectively when measured tilt angle 350b of FIG. 2 exceeds a selected threshold. Or if pan torque generator axis is reasonably aligned with the camera's pan axis, the earth-referenced pan axis measured rate and position 350c, 350d is permanently replaced with camera-referenced pan axis measured rate and angle 210c, 210d and input them to the pan axis algorithm of FIG. 4. More specifically, again referring to FIG. 4, standard cross fade elements 348c, 348d are employed to gradually replace earth-referenced pan axis measured rate and angle 350c, 350d with camera-referenced pan axis measured rate and angle 210c, 210d, respectively, as a function of measured tilt angle 350b as determined by function generator 348f, which produces a selected cross fade fraction 348e. The aforementioned cross fade elements operate by multiplying a first input by the selected fraction of between zero and one and multiplying a second input by one minus the selected fraction and summing the two products.

Passive Trans-Gimbal Couplings

Further modifications can be made that enable single handed support plus orientation. An elastic coupling between an outer handle and inner assembly can provide a 'soft end stop' property which directs the camera payload to smoothly accelerate angularly if the operator rotates the handle beyond the gimbal's maximum angular range, particularly for the roll and tilt axes where limited angular range voice coils are typically employed. An example of such devices can be found in U.S. patent publication 2011/0080563A1, such devices as described, incorporated herein by reference. An exemplary embodiment of the invention has unlimited or near unlimited, pan angle rotation range, but an elastic coupling across the pan axis has also been shown to productively allow one handed carrying plus orientation. The one-handed mode of operation is particularly useful when the operator's free hand is needed for steering a vehicle or the like. The algorithms disclosed herein can be applied to such an elastically coupled pan axis torque generator.

As previously described, illustrative embodiments of the invention may enhance stability for operators of the stabilizing equipment directly and locally controlling it hands-on. A remotely controllable variant, however, can be implemented producing the described stability features for a remote camera platform.

In a first remote control application of the invention the typical passive remote control joystick or the like is employed. The joystick's signals are converted to represent torque commands and these transmitted commands are summed with those already provided by the feedback controller as previously described, the sums passed to the omni-axial torque generator. As a result the joystick-based torque commands replace those of a hands-on operator.

In a second remote controlled illustrative embodiment of the invention the aforementioned passive joystick or the like is replaced with a so called 'force feedback', or 'haptic feedback' input device. In illustrative embodiments of the invention the device is driven reflectively in a powered fashion by actual camera orientation angles provided via feedback from the artificial horizon algorithm. A remote operator now has in hand a control surface with which to orient the remote platform mounted camera in a way that may closely resemble that provided for a hands-on operator of illustrative embodiments of the inventive stabilizer.

The described feedback controller 3 provides 'supplemental' torque signals, one for each axis to be controlled through the final essential submodule:

4: Omni-Axial Torque Generator:

The omni-axial torque generator subassembly is coupled to the omni-axial gimbal of the 'sled' of the stabilizer assembly 1, and responsive to the 'supplemental torque' signals provided by the algorithmic feedback controller 3.

The omni-axial torque generator is coupled between the supported side of the gimbal and the payload side. It couples orienting torques, through the gimbal, between the "sled" plus supported camera payload and the support side in parallel with those of the operator.

This subassembly may employ various methods and components but resulting torques are preferably precisely controllable and uniform despite any angular position of the gimbal. Candidate torque generators include conventional permanent magnet DC motors driven by constant current power amplifiers, and 'voice coil actuators' which may be single coil permanent magnet DC motors that rotate less than a full turn.

In an exemplary embodiment of the invention, a chosen torque generator or motor is attached to each rotatable joint of the gimbal so that torques may be coupled between the stationary side of that joint and its rotating side. The motors may be arranged so their weight does not unbalance the neutral balance of the assembly and the motor body positioning does not interfere with the operator's access to the control handle/guide.

Since feedback controller 3 develops correctional supplemental torques referenced to the camera payload's primary axes (pan, tilt, and roll), the omni-axial torque generator must take this into account. Some gimbal arrangements have axes of rotation that do not necessarily align with those of the camera. Only the gimbal pan axis of this arrangement aligns with camera's pan axis. The other two axes of the gimbal instead align with the center of balance of the camera and all its counter-balancing masses.

A first rotary joint attaches to the operator support, a second rotary joint, the axis of which is perpendicular to that of the first joint, attaches to the rotating side of the first joint and finally the rotating side of second rotary joint attaches to the stationary side of the pan axis joint, the axis of which is substantially perpendicular to both first and second joint axes, with the camera payload attached to the rotating side of the pan joint. As the camera is panned its roll and tilt axes rotate with respect to the first joint and second joint axes.

Therefore, the supplemental correction torques produced by the feedback controller 3 must be rotated the torques aligned to camera payload 110 roll and tilt axes, and instead align them with the actual first joint, second joint axes. This is achieved by the feedback controller 3 provided it receives the current angle of the pan joint via an attached angle sensor generated signal.

For the handheld illustrative embodiment of the invention the order is reversed of the axis joints as is conventionally done. Referencing FIG. 2, the stationary side of a roll axis torque generator 410 is attached to the platform 120 with its axis substantially parallel to the camera's roll axis. The rotor coil assembly 411 is attached to roll/tilt guide 140, attached to tilt rotor coil assembly 421 of the tilt rotary joint, having an axis substantially perpendicular to that of the roll joint. Finally, the stationary side of the tilt axis torque generator 420 is attached to the rotating side of the pan torque generator output shaft 431, the axis of which is substantially perpendicular to those of both the roll and tilt joints, the pan rotary joint embedded in a pan axis torque generator that also serves as a handle 430 carried in the operator's hand.

In this illustrative embodiment, the axes may be well enough aligned with those of the camera that feedback controller 3 provided roll, tilt, and pan correctional supplemental torques may be applied directly through torque generators 4 attached to corresponding rotary joints of the gimbal without the need for rotary joint angle sensing.

In one such handheld illustrative embodiment, referring now to FIGS. 1 and 2 omni-axial torque generator 4 is implemented for the roll and tilt axes of the gimbal using voice coil motors for roll and tilt axis torques generators 410, 420 with the stator, rotor of each motor corresponding to the stationary, rotary sides of the described roll, tilt axis joints. Finally, pan axis torque generator 430 is implemented with a standard DC motor embedded inside the operator's hand carried handle that contains pan axis torque generator 430, the pan torque passing between the handle and the connected tilt rotary joint 420 attached to the remaining rig structure.

Figure 6:
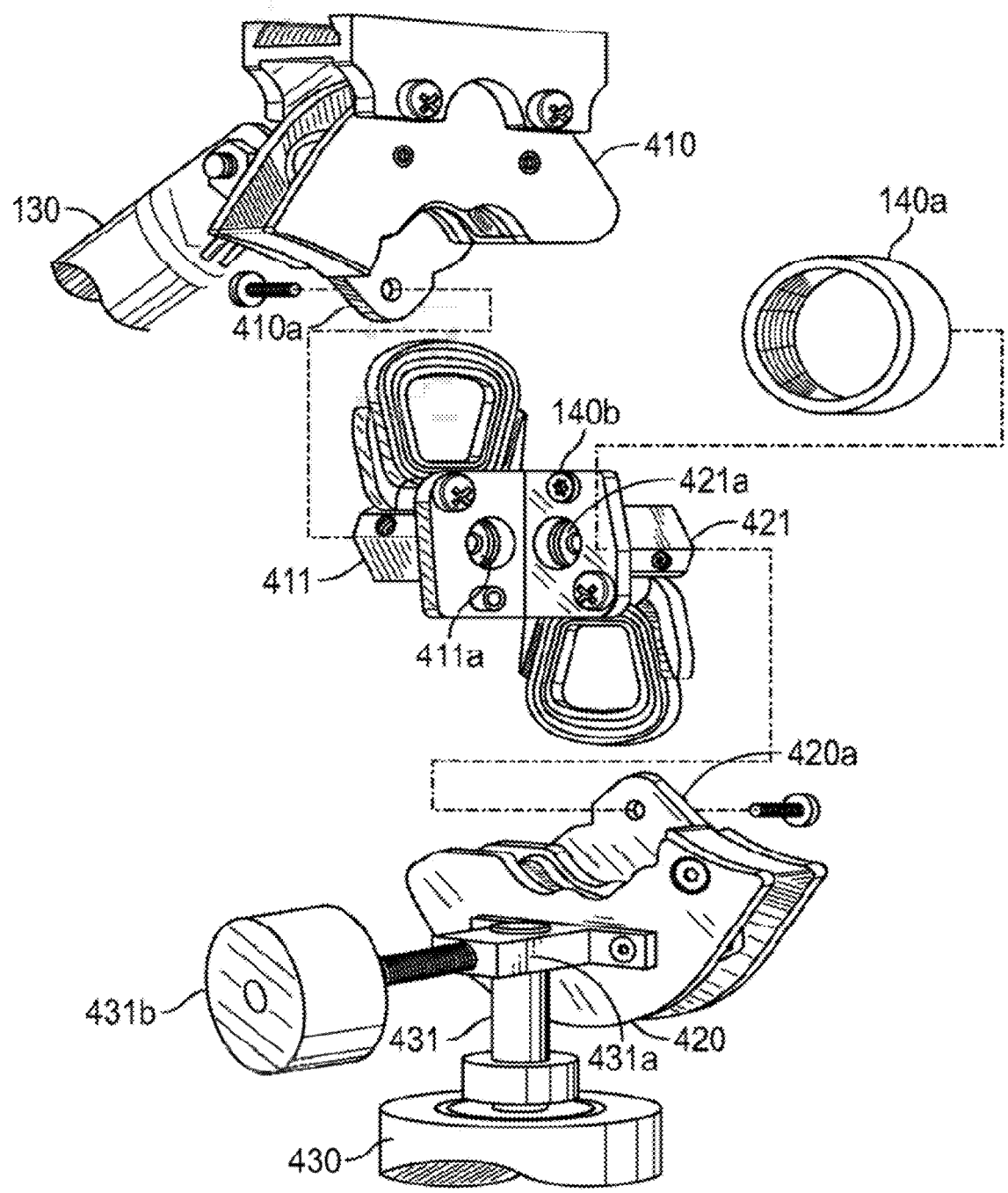
FIG. 6 and FIG. 7 are exploded views of an illustrative embodiment of the invention.

To further understand the gimbal arrangement of the roll and tilt axes for the preferred handheld illustrative embodiment, refer to FIG. 6 which shows an exploded view. As shown, the roll axis employs a rotary voice coil motor as a roll axis torque generator 410 with its stationary or stator side fixedly attached to the camera side of the physical structure, and its rotor coil assembly 411 attached to right angle plate 140b. Shown within the rotor coil assembly 411 is a radial bearing 411a whose inner side is fastened to plate 410a with a screw to the stator of roll axis torque generator 410 as shown. The outer side of the bearing 411a within rotor coil assembly 411 is fixedly attached to the combined assembly 411, 140b, 421. The central axis of bearing 411a within rotor coil assembly 411 nominally or precisely coincides with the gimbal's axis of roll.

Similarly, the tilt axis employs a voice coil motor as a tilt axis torque generator with its stator side fixedly attached to the pan torque handle assembly containing pan axis torque generator 430 pan torque generator output shaft 431 via coupling block 431a. Tilt rotor coil assembly 421 is fixedly attached to the right angle plate 140b. Shown within the tilt rotor coil assembly 421 is a standard radial bearing 421a whose inner side is fastened to plate 420a with a screw to the stator side of tilt axis generator 420 as shown. The outer side of the bearing 421a within tilt rotor coil assembly 421 is fixedly attached to the combined assembly 411, 140b, 421.

The central axis of the outer side of standard radial bearing 421a within tilt rotor coil assembly 421 substantially coincides with the gimbal's axis of tilt.

By construction of the right angle plate 140b the axes of roll and tilt and those of their respective bearings 411a, 421a intersect at or near the physical rig's 1 center of gravity. Furthermore, the axis of pan is preferably coincident with the central axis of the pan torque handle output shaft 431 with the axis nominally or precisely passing through the intersection of the roll and tilt axes. Counterweight 431b substantially balances the weight of assemblies 421, 420 such that their common center of gravity is substantially coincident with the axis of pan, allowing the balanced component assembly center of gravity substantially coincident with the gimbal axes' intersection.

Operator control surface 140a is attached to right angle plate 140b. Control surface 140a is for example a textured partial sphere with its center substantially coincident with the roll, tilt, pan axes intersection and the physical rig 1 center of gravity. Other types of operator control interfaces are within the scope of the invention. Various types of gimbals and other devices allowing analogous or comparable degrees of freedom can also be implemented with methods and assemblies of the embodiments of the disclosure.

An operator may apply pan and tilt steering torques to the textured sphere to orient the supported camera payload. As constructed, the control surface 140a of this handheld illustrative embodiment only allows operator orientation in the pan and tilt directions, as the roll axis is automatically maintained level by the roll axis algorithm 320.

For the handheld illustrative embodiment, as described previously, pan axis torque generator 430 is implemented within the operator carrying handle by employing for instance a common permanent magnet DC (PMDC) motor. By employing the PMDC motor as shown in the arrangement of FIG. 7, substantially unlimited rotation of a pan rotary joint within an operator carrying handle, likely allowing the operator to 'walk around' the stabilizer to assume an optimum operating position without needing to re-grip the handle as the stabilizer continues to point in a particular desired angular direction may be achieved.

Figure 7:
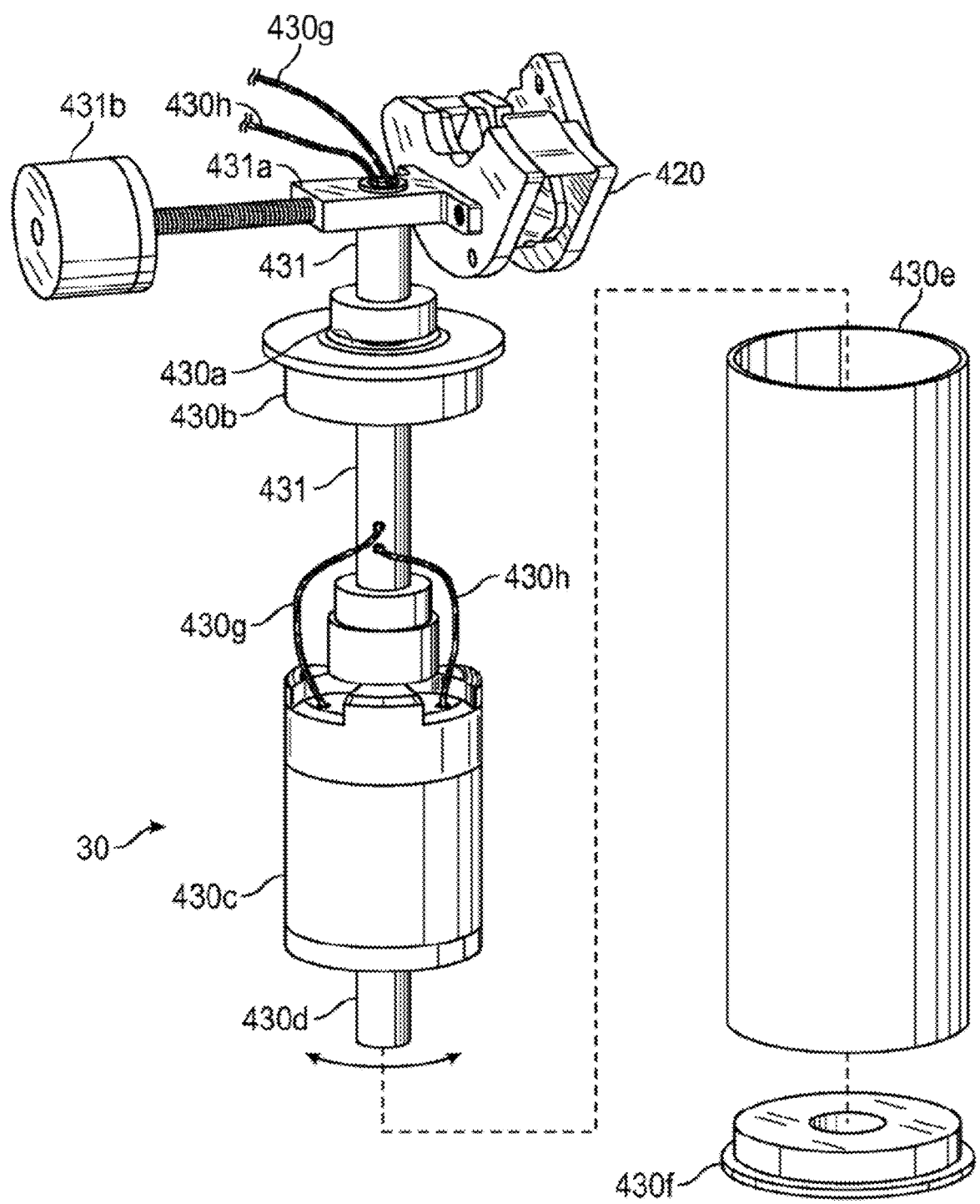

Referring now to FIG. 7: The stator body of a standard PMDC motor 430c or other suitable motor, is fixedly attached to pan torque generator output shaft 431, the shaft maybe hollow as shown. Power wires 430g, 430h for motor 430c enter shaft 431 and exit the shaft as shown to connect power to motor 430c. A top end cap 430b with embedded standard radial bearing 430a freely rotates about shaft 431 while fixedly engaging top end of handle shell 430e. Finally a bottom end cap 430f fixedly engages handle shell 430e bottom end while motor 430c output shaft 430d passes through a central hole in bottom end cap 430f central hole and is fixedly engaged thereto.

Thus, the handle shell 430e, carried in the operator's hand, is rotatable about the pan axis output shaft 431 without twisting the motor 430c power wires 430g, 430h.

Further illustrative embodiments of the invention provide alternative or additional means to address bottom-heaviness of a balancing apparatus. Maintaining 'level' (the true correspondence of the sled 'roll' axis to the local horizon), and 'headroom' (the necessary tilt angle to maintain the desired shot), are two tasks that an operator generally desires to accomplish. Both tasks are conventionally assisted by operating with the gimbal position adjusted to be centered slightly above the center-of-balance of the entire sled. Absent any significant lateral accelerations, this results in slight bottom-heaviness. Bottom-heaviness typically causes pendularity during lateral accelerations such as starting, stopping or cornering; and any subsequently desired change from that nominal tilt angle is difficult to consistently maintain.

Nevertheless, the tilt and roll feedbacks from this elective bottom-heaviness are often taken to be so essential, that operators learn to apply the momentary angular counter-pressures required to neutralize pendularity. This typically takes significant skill. Illustrative embodiments of the invention provide an alternative means to address this phenomenon.

A further illustrative embodiment of the invention provides a 'power-assisted gimbal' replacement for conventional stabilizing apparatus gimbal assemblies, employing the substantially acceleration-proof angular detection methods and hardware as described herein in other illustrative embodiments, coupled with a novel means for applying appropriate assistive torques to at least two gimbal/yoke axes, despite the fact that the angles are likely to be variously and persistently decoupled from the fixed sled axes of 'roll' and 'tilt'.

Previously noted illustrative embodiments have substantially fixed axes of torque applied, unlike traditional stabilizing apparatus gimbal yokes, which are momentarily positioned anywhere around the axis of the sled center post, according to the demands of the shot, and any 'torque' assistance applied to these gimbal axes must proportionally take these discrepantly shifting angular orientations into account for useful correction. The further illustrative embodiment of the invention, various aspects of which can be used with other illustrative elements, therefore adds an optical, digital or analogue counter around the sled 'pan' axis that tracks the momentary position of a conventional stabilizing apparatus gimbal yoke, even as the operator moves his body, and thus the yoke, around the rig, from side to front to back, while obtaining his or her shots. This pan-axis counter, along with an associated new algorithm, therefore tracks the proportion between the sum and angular directionality of the gimbal torques as their momentary relationships vary with respect to the 'roll' and 'tilt' axes of the actual sled.

The counter hardware and software algorithms of this illustrative embodiment of the invention track this angular relationship to appropriately power and vector the output of torque generators operating, respectively, around the axis that is represented by the conventional yoke trunnion bearings ("tilt") in the diagrams and the perpendicular axis of the yoke itself ("roll") such as the bearing axis. This permits the sled to be neutrally balanced, and therefore, non-pendular—and yet still provides direct net torque assistance to maintain level for the sled, and additionally maintain desired 'headroom' by continuously powering the 'tilt' axis angle.

FIG. 9, which will be described in more detail below, shows the relative percentage and direction of torque required for trunnion ("tilt") motors vs. yoke ("roll") motors to continuously influence the roll axis to the right as the yoke moves 360° around the pan bearing. Note the central arrows indicating the 'forward' direction for each iteration.

The percent allocation of the torques to the generators is a torque vector rotation. We want to rotate a roll, tilt torque vector referenced to the camera (or other payload being balanced) as produced by the algorithms to a new roll, tilt torque vector aligned with the actual gimbal torque generators, which are attached to and aligned with the operator side of the rig. The torque vector rotation is related directly to the pan angle.

Figure 8:
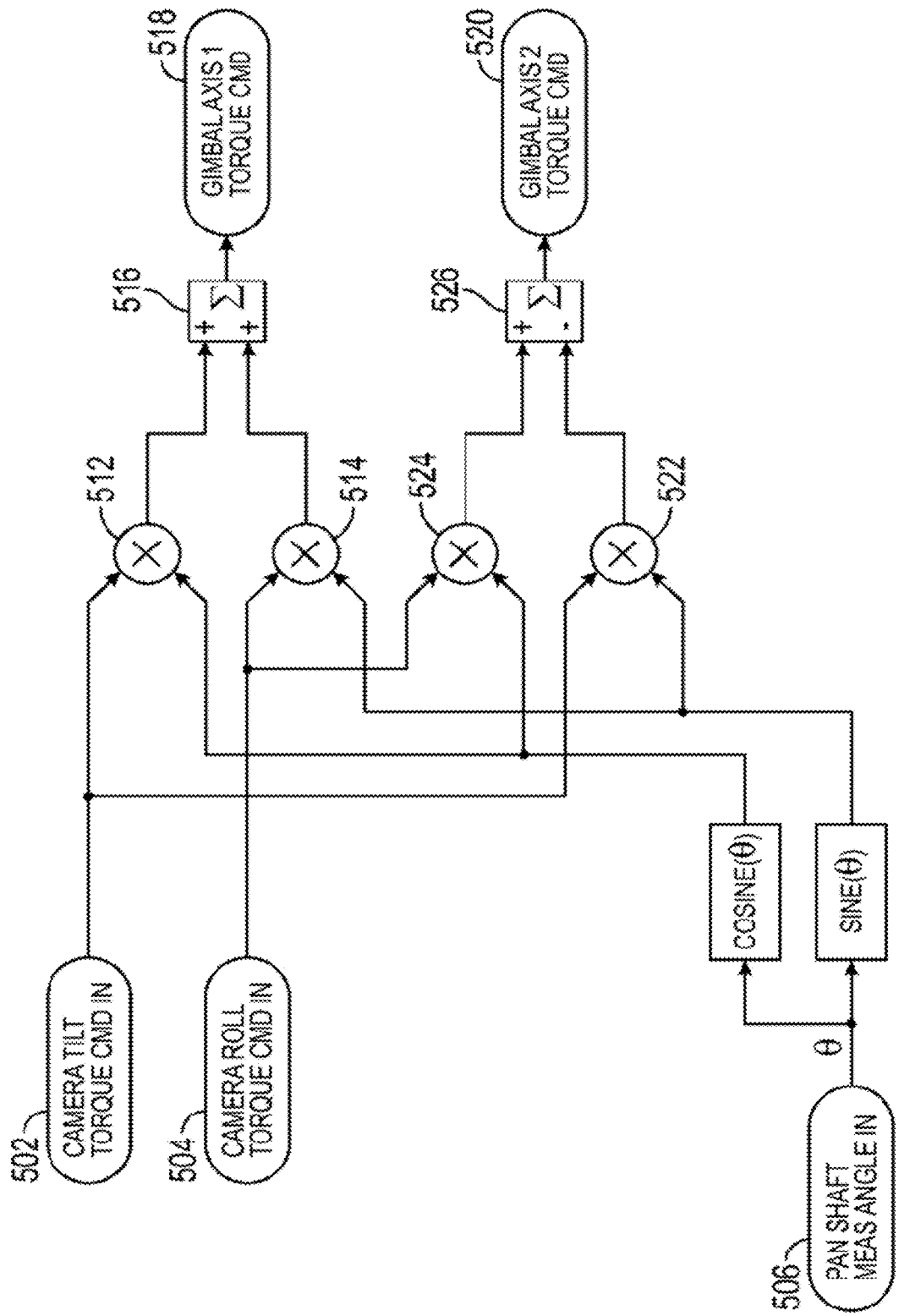
FIG. 8 is a flow chart representing the calculation of actual torques to be generated by the roll and tilt motors.

The standard equation for rotating a two dimensional (2D) vector, as represented in FIG. 8, is:

$$X' = X^* \cos \theta - Y^* \sin \theta$$

$$Y' = X^* \sin \theta + Y^* \cos \theta$$

where X, Y are desired supplemental torque signals from the algorithm to be applied to payload aligned roll, tilt axes respectively. X', Y' are actual torques to be generated by the gimbal "roll" and "tilt" motors, respectively, attached to operator side roll, tilt gimbal axes, respectively. $\theta$ is an angular portion of a 360 degree measure of the pan bearing rotation and is zero when gimbal "roll" axis aligns with payload roll axis and gimbal "tilt" axis aligns with payload "tilt."

The degree of pan bearing rotation can be sensed by any known method compatible with the apparatus and its use. Examples include: standard linear potentiometer, sine cosine potentiometer, angular resolver (magnetic angle sensing using rotor and stator coils) and optical encoder, both the relative type, for which an angular reset is typically required, and absolute type, which delivers an angle signal without any reset means required.

Turning to FIG. 8, calculation of the actual torques to be generated by the roll and tilt motors will be described. Block 502 indicates the supplemental payload tilt torque value "Y" and block 504 indicates the supplemental payload roll value "X". Block 506 provides the pan shaft angle $\theta$. Steps 508 and 510 show cosine $\theta$ and sine $\theta$, respectively. The payload tilt torque value "Y" is multiplied by cos $\theta$ in step 512. In step 514, the payload roll torque value "X" is multiplied by sin $\theta$. The results generated in steps 512 and 514 are summed in step 516 to obtain the actual torque Y' to be generated by the gimbal tilt motor as provided in block 518.

The actual torque to be generated by the gimbal roll motor is depicted by block 520 and obtained by the following steps: The supplemental payload tilt torque "Y" from block 502 is multiplied by sin $\theta$ in step 522. The supplemental payload roll torque "X" is multiplied by cos $\theta$ in step 524. In step 526, the result from step 522 is subtracted from the result generated in step 524 to obtain the actual torque "X'" in block 520.

Figure 9A:
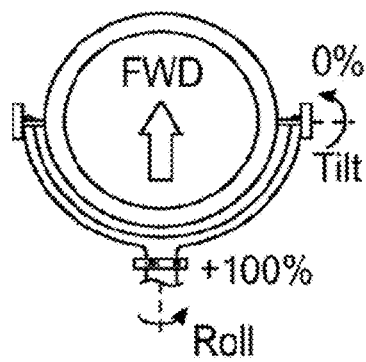
FIGS. 9A-H show mix factors for roll and tilt with pan axis angles of 0, 45°, 90°, 135°, 180°, 225°, 270° and 315° according to an illustrative embodiment of the invention.
Figure 9B:
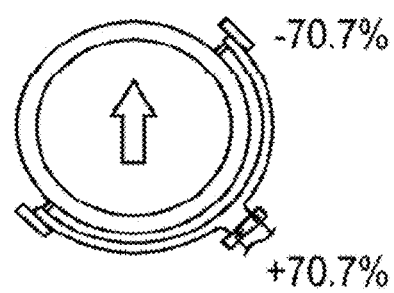
Figure 9C:
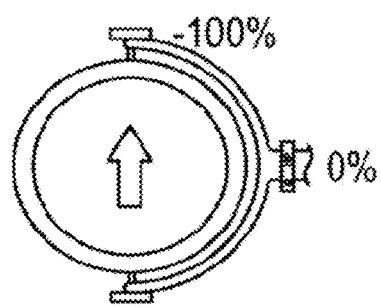
Figure 9D:
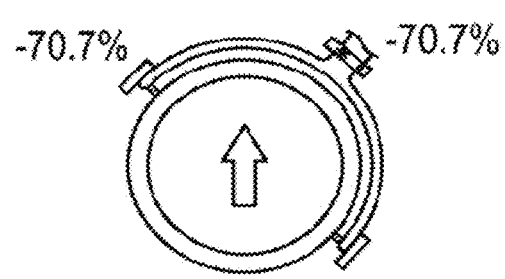
Figure 9E:
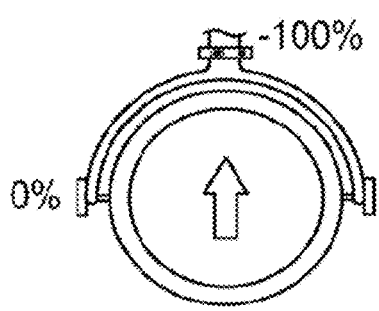
Figure 9F:
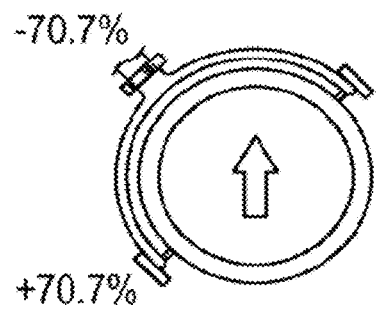
Figure 9G:
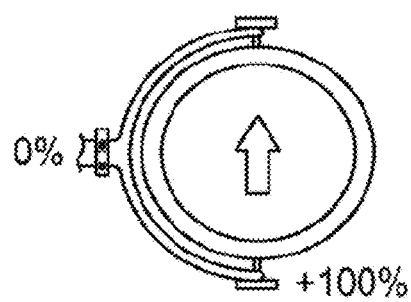
Figure 9H:
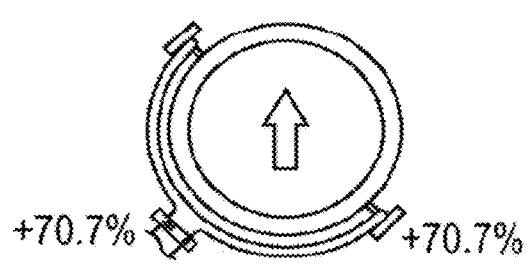

If you plug in 0, 90°, 180°, 270° for $\theta$ into the above equations you will get the mix factors shown in FIGS. 9A, 9C, 9E and 9G, respectively. FIG. 9A depicts the mix factor values when the gimbal roll and tilt axes are aligned with the payload roll and tilt axes, +100% for the roll axis and zero for the tilt axis. $\theta = 0$ in this configuration so no adjustment is needed. FIG. 9c depicts a configuration where $\theta = 90°$, which corresponds to factors of zero for the roll axis and −100% for the tilt axis. FIG. 9E represents the configuration when $\theta = 180°$, wherein the factors are zero for the tilt axis and −100% for the roll axis. At $\theta - 270°$, the tilt factor is +100% and the roll factor is zero as shown in FIG. 9G. Additional increments of 90° from the initial 45° are depicted in FIGS. 9D, 9F and 9H, wherein the mix factors in FIG. 9D ($\theta = 135°$) are −70.7% for both the roll and tilt axes; the mix of factors in FIG. 9F ($\theta = 225°$) are +70.7% for the tilt axis and −70.7% for the roll axis; and the factors for both the tilt and roll axes in FIG. 9H ($\theta = 315°$) are +70.7%. At 45° you obtain +70.7% for the roll axis, and −70.7% for the tilt axis, as represented in FIG. 9B. This makes sense as at 45° the torque motors have less mechanical advantage and each needs more torque to achieve the final algorithm-requested torque referenced to the payload axes, now rotated 45° away from torque generator axes.

Since gimbal torques are applied 90° apart they are not additive but instead obey a vector addition equation:

$$T_{total} = \sqrt{T_{roll}^2 + T_{tilt}^2}$$

wherein:

$$1 = \sqrt{0.707^2 + 0.707^2}$$

Utilizing the various calculations and apparatus described above, the tilt axis can be preset for a desired 'headroom' just as the roll axis is automatically preset to seek level.

Figure 10:
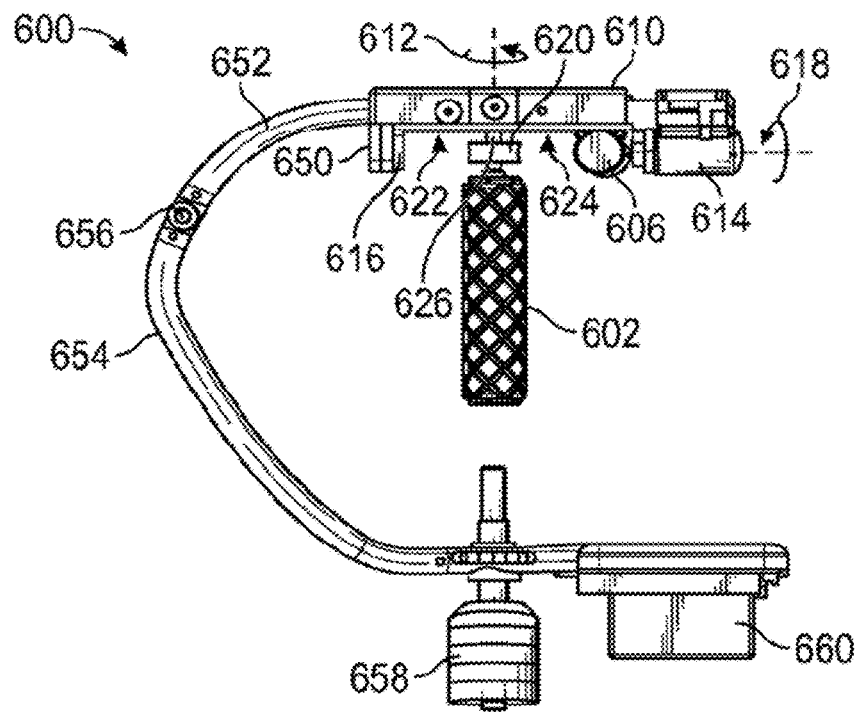
FIG. 10 depicts an apparatus for stabilizing a payload according to an illustrative embodiment of the invention.
Figure 11:
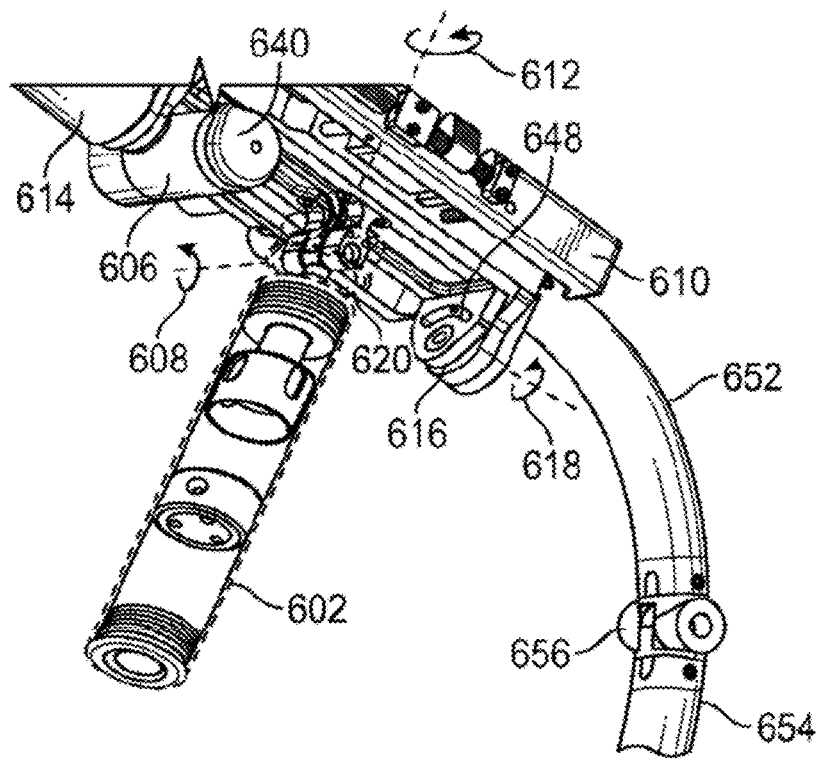
FIG. 11 is a transparency view of an apparatus for stabilizing a payload according an illustrative embodiment of the invention.

FIG. 10 depicts an apparatus 600 for stabilizing a payload according to an illustrative embodiment, in which the methods described herein can be applied. A handle 602 houses a pan motor 604, which can be seen in the transparency view of FIG. 11 of an illustrative embodiment. Pan motor 604 generates angular motion of a stage 610 about a pan axis 612. A tilt motor 606 generates angular motion about a tilt axis 608 to tilt stage 610 with respect to the longitudinal axis of handle 602. A roll motor 614 rotates a roll frame 616 about a roll axis 618. Roll frame 616 can be contoured to roll into a complimentary gap, such as in an outer frame or beneath stage 610. Pan, tilt and roll axes 612, 608, 618, respectively, converge generally at a grip 620 or roughly at or near the center of gravity of the apparatus 600 when containing a payload positioned on stage 610.

Grip 620 provides an operator control surface to enable a user to control pan, roll and tilt motion by finger pressure. Preferably this manual control can overcome the force of one or more of the motors. When a user releases pressure on grip 620, the motors will hold the position utilizing algorithms as described herein. Grip 620 can be designed to float "independently" and stay referenced to stage 610 or roll with handle 602.

Figure 12:
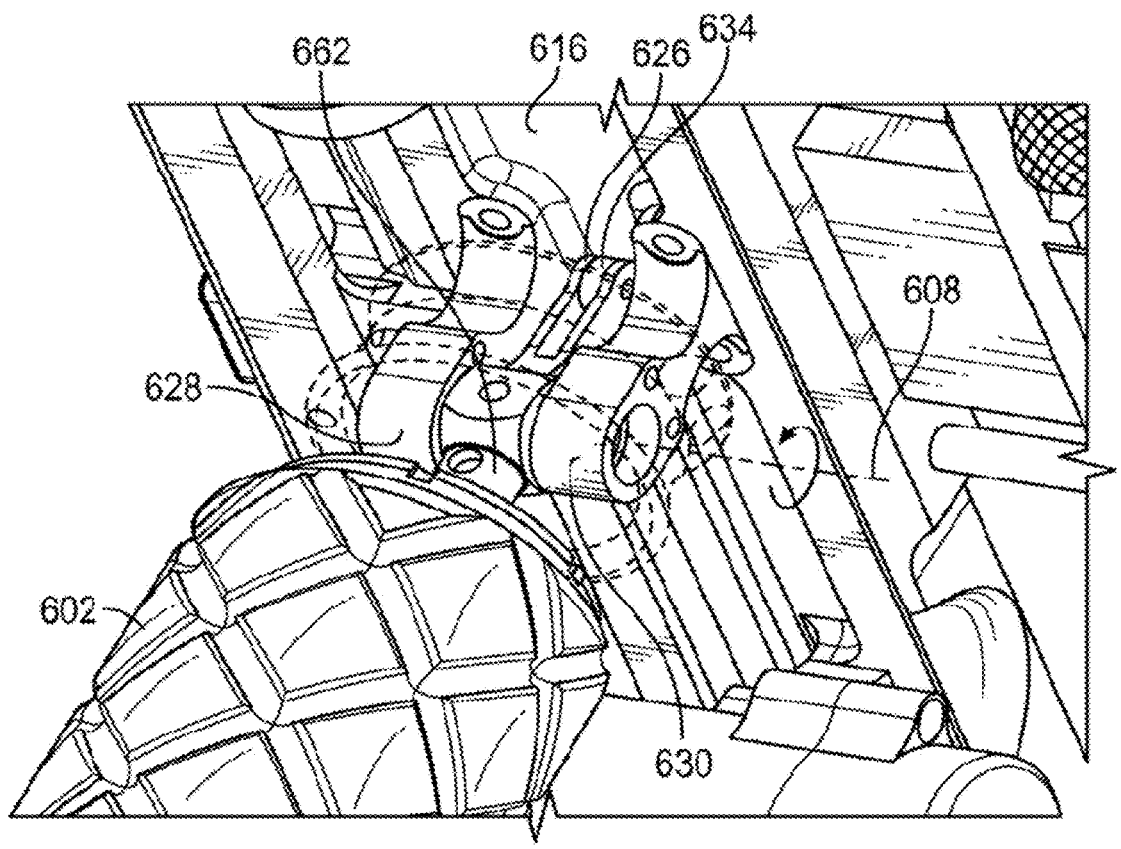
FIG. 12 is a close up of portions of the pan, tilt and roll mechanisms of the stabilizing apparatus of FIG. 11, according to an illustrative embodiment of the invention.

As shown by the illustrative embodiment depicted in FIG. 12, roll frame 616 is fixedly attached to bosses 628, 630. Bosses 628, 630 are rotatable about tilt axis 608. Mounting 626 extends between bosses 628, 630 and is fixedly attached to shaft 662 of a pan motor within handle 602 so that mounting 626 is rotatable about pan axis 612, which is identified in FIG. 11.

As shown in FIG. 10, sufficient clearance is present in areas 622, 624 to facilitate use of grip 620, i.e. to provide room for a user's fingers to manipulate grip 620 to create movement about one or more of axes 608 612, 618.

Figure 13:
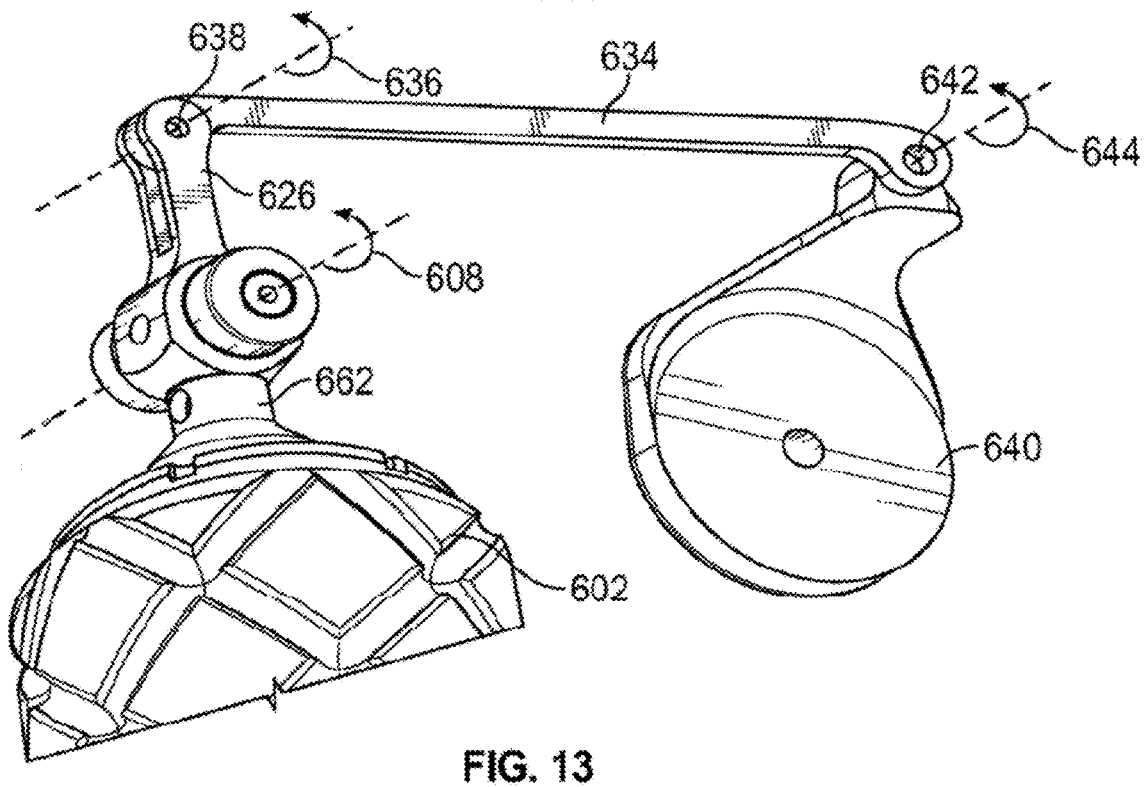
FIG. 13 depicts components of a tilt mechanism of the apparatus for actively stabilizing a payload according to an illustrative embodiment of the invention.
Figure 15:
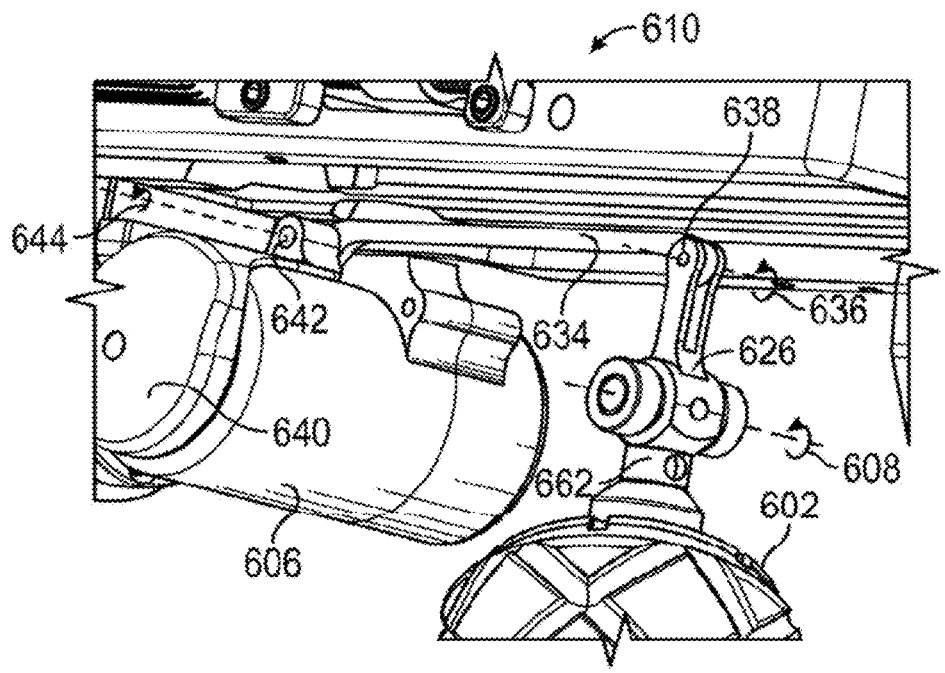
FIG. 15 shows components of a tilting mechanism according to an illustrative embodiment of the invention.

FIG. 13 depicts components of the tilt mechanism with parts of apparatus 600 removed for better visibility. FIG. 15 provides additional components of the tilting mechanism; however, select parts are also not included for ease of understanding. Mounting 626 is rotatably attached to tie rod link 634 at an end of mounting 626 opposing handle 602. Tie rod link 634 rotates about axis 636 through pivot 638. A bell housing 640 is rotationally attached to tie rod link 634 at pivot 642, which is at an end of tie rod link 634 that opposes mounting 626. Bell housing 640 is further connected to the shaft of tilt motor 606, so as the shaft of tilt motor 606 rotates so too does bell housing 640 with respect to tie rod link 634 at pivot 642, about axis 644, and in turn tie rod link 634 rotates at pivot 638 about axis 636, and finally, mounting 626 rotates about axis 608. The body of tilt motor 606 is attached to roll frame 616. As can be seen in FIG. 12, axis 608 is through bosses 628, 630, which are bolted to roll frame 616, and thus, as tilt motor 606 rotates bell housing 640, pan motor shaft 662 rotates with respect to axis 608. Other mechanisms or components can be used for the same purpose as bell housing 640, such as an additional link, which would be connected between the tilt motor shaft and tie rod link 634. Turning back to FIG. 12, grip 620 is shown bolted to bosses 628, 630. Bosses 628, 630 are bolted to roll frame 616 so grip 620 stays referenced to roll frame 616 and rolls with handle 602.

Figure 14:
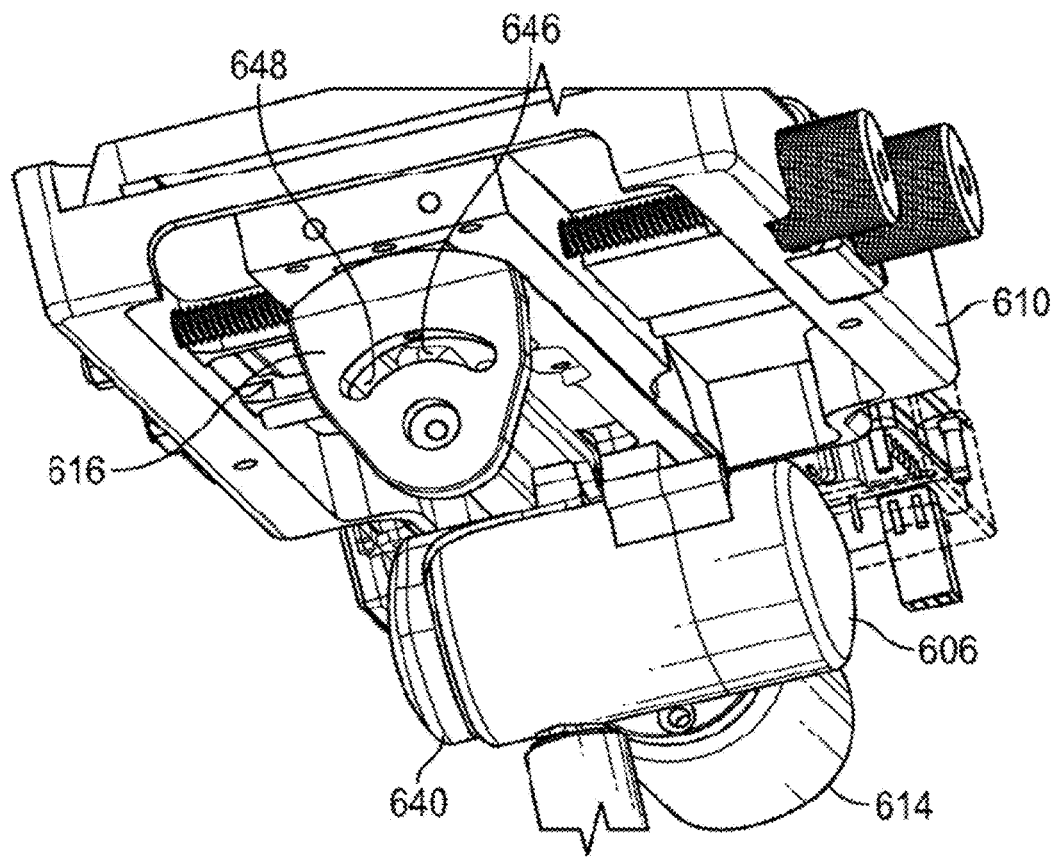
FIG. 14 depicts a roll motion limiting mechanism according to an illustrative embodiment of the invention.

As shown in FIGS. 12 and 14 according to illustrative embodiments, a pin 646 is disposed in slot 648 in roll frame 616. Pin 646 is fixedly secured to an outer frame. As frame 616 rotates, the position of pin 646 changes within slot 648. The relative excursion of pin 646 is limited by the ends of the slot. This serves as a stop to limit the rotation of roll frame 616. If it is desired for grip 620 to float independently and stay referenced to stage 610, grip 620 can be fixedly secured to pin 646.

Outer frame 650 is connected to stage 610 and either directly or through stage 610 to spar 652. Spar 652 is hinged to a second spar 654 at hinge 656 to allow the apparatus to fold. A battery 660 or other component associated with a payload is located at or toward the end of spar 654. A weight 658 can be used to balance apparatus 600 with a payload in place on stage 610. Weight 658 can be adjustable, for example, by adding to or eliminating portions of the weight, or by advancement of the weight along a threaded shaft. Placement of weight 658 can be directly situated under the intersection of axes 608, 618, 612 and parallel to the camera-mounting surface on stage 610. In doing so, adjustment of weight 658 vertically towards or away from the camera mounting surface on stage 610 should not influence the overall balance of device 600 in the roll or tilt axis.

Advantageously, brushed motors can be used with illustrative embodiments of the apparatus. Brushed motors with small gear ratios may be particularly suitable for use with the apparatus. Illustrative ratios include 4:1 or 10:1. Small gear ratios allow the motor to be back driven relatively easily by application of pressure to grip 620. The artificially increased inertia provided by algorithms described herein allow for use of brushed motors. Brushless motors typically produce much more torque for their size than same size brushed motor. Brushless motors generally suffer from magnetic cogging, which is an unwanted torque coming through the motor shaft as it spins, even when unpowered. A very high loop bandwidth and fast response time can overcome this cogging, but the payload is then held very stiffly by the feedback system and consequently cannot be guided by direct contact to a grip as in illustrative embodiments of the invention. It is noted that brushless motors can be used in some illustrative embodiments of the apparatus.

Figure 16:
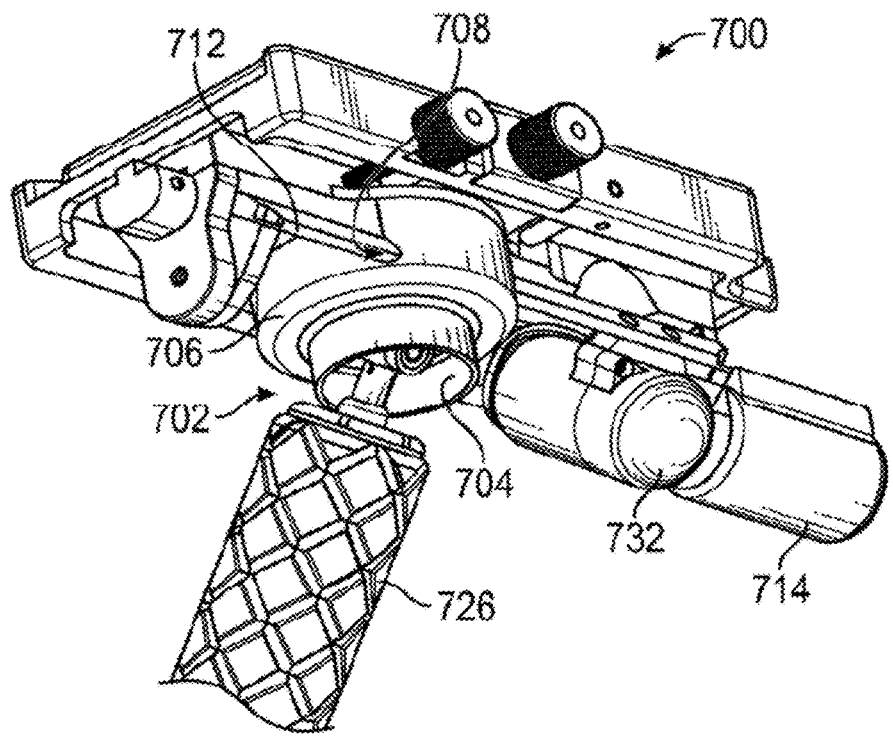
FIG. 16 depicts another configuration of an actively stabilized payload support apparatus having a slotted grip, according to an illustrative embodiment of the invention.

FIG. 16 depicts another configuration of an actively stabilized payload support apparatus 700 according to an illustrative embodiment of the apparatus. Support apparatus 700 has a grip 702 having a first grip section 704 extending from the bottom of a second section 706. Second grip section 706 has a larger diameter than first grip section 704. First and second grip sections 704, 706 are generally cylindrical in this illustrative embodiment. The outer surface of first grip section 704 is substantially linear along its length unlike the grip 620 shown in FIG. 12 for example, which is curved. First grip section 704 can have a uniform diameter throughout or can be angled to varying degrees in a conical frustum configuration.

Figure 19:
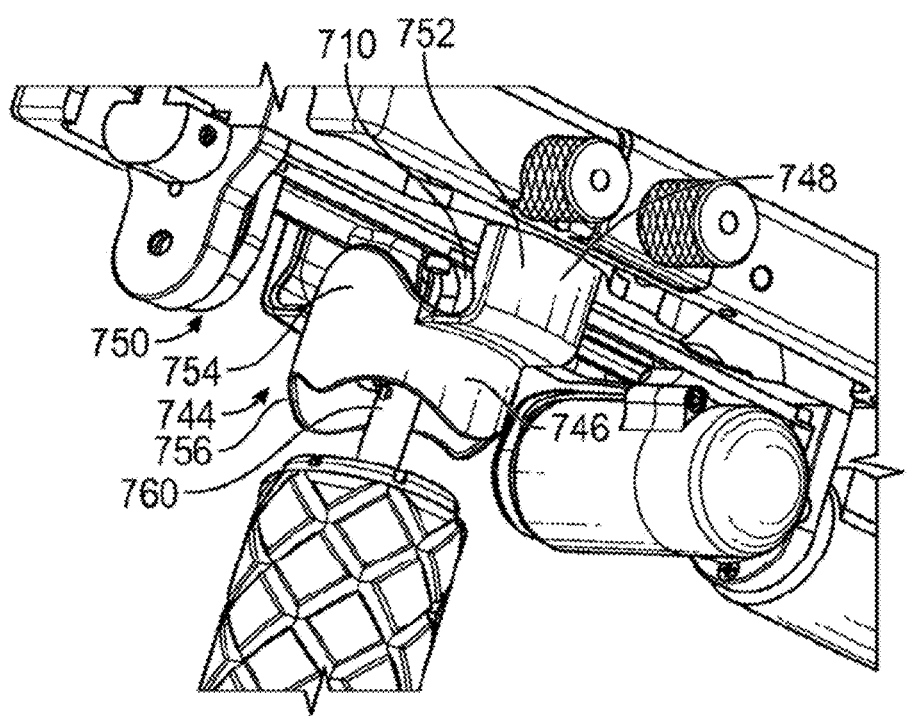
FIG. 19 depicts an actively stabilized payload support apparatus with a grip having a scalloped lower edge, according to an illustrative embodiment of the invention.
Figure 24:
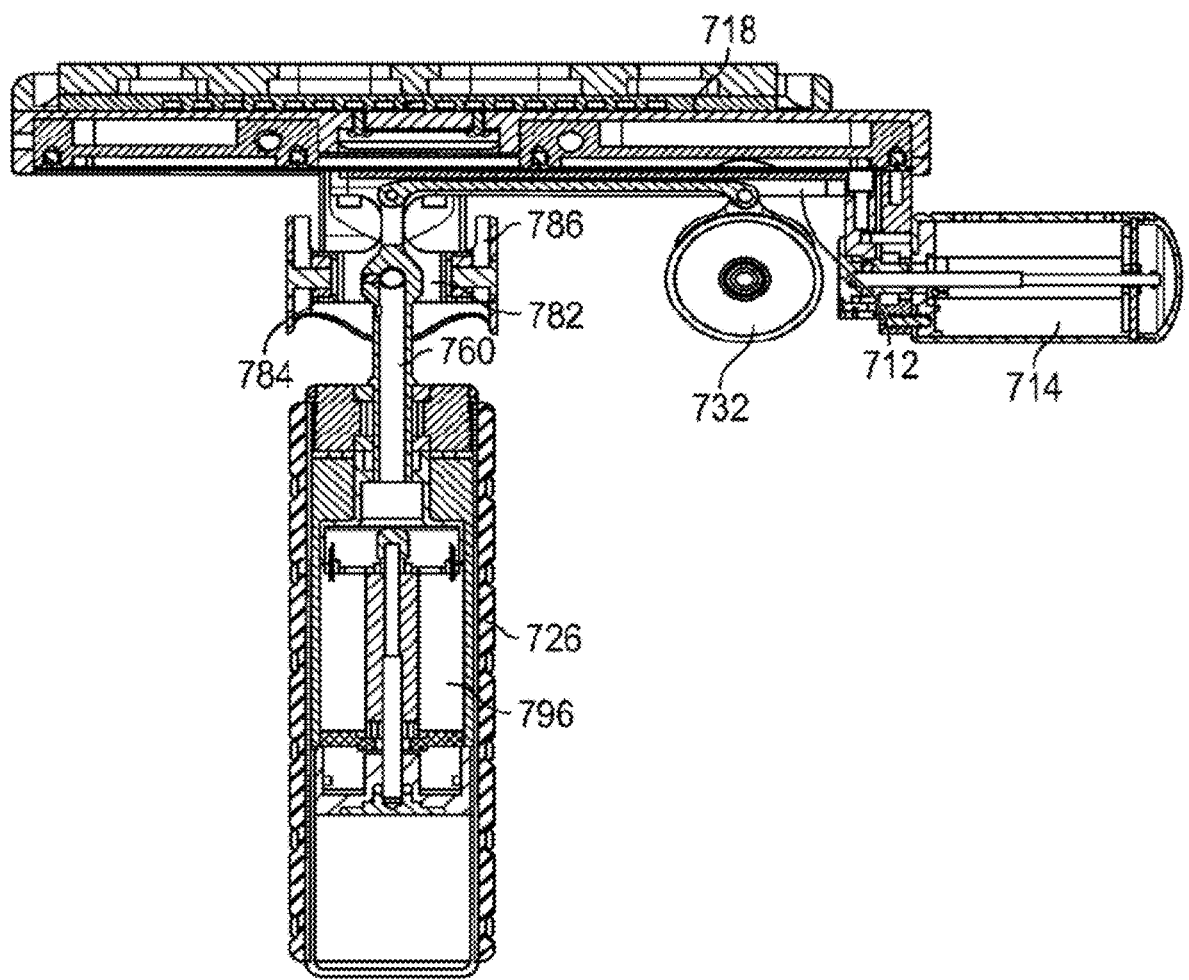
FIG. 24 depicts a second cross-sectional view of the actively stabilized payload support apparatus of FIG. 23, according to an illustrative embodiment of the invention.

As shown in FIGS. 16 and 24, second grip section 706 has slots 708, 710, which accommodate roll frame 712 when roll frame 712 is rotated through its excursion. Roll motor 714 is functionally connected to roll frame 712 to impart rotational motion to roll frame 712. FIG. 19 shows roll frame 712 in a horizontal position. FIG. 16 shows roll frame 712 at an extreme of it excursion so it is disposed into slot 708.

Slots 708, 710 are generally arced slits in grip 702, such as shown in FIG. 16, for example for example. Grip 702 can be used on actively stabilized support systems such as shown in FIGS. 10-15, for example. The slotted grip configuration will likely be stiffer than the cantilevered version.

An illustrative upper limit of angular excursion range for payload support apparatus 600 is about ±30° to about ±35°. An illustrative upper limit of angular excursion range for payload support apparatus 700 is about ±40° to about ±45°. Depending on specifications of various parts, such as grip diameter and the length of shaft 724 of the pan motor located in handle 726, the excursion of roll frames 616 and 712 can vary.

Figure 17:
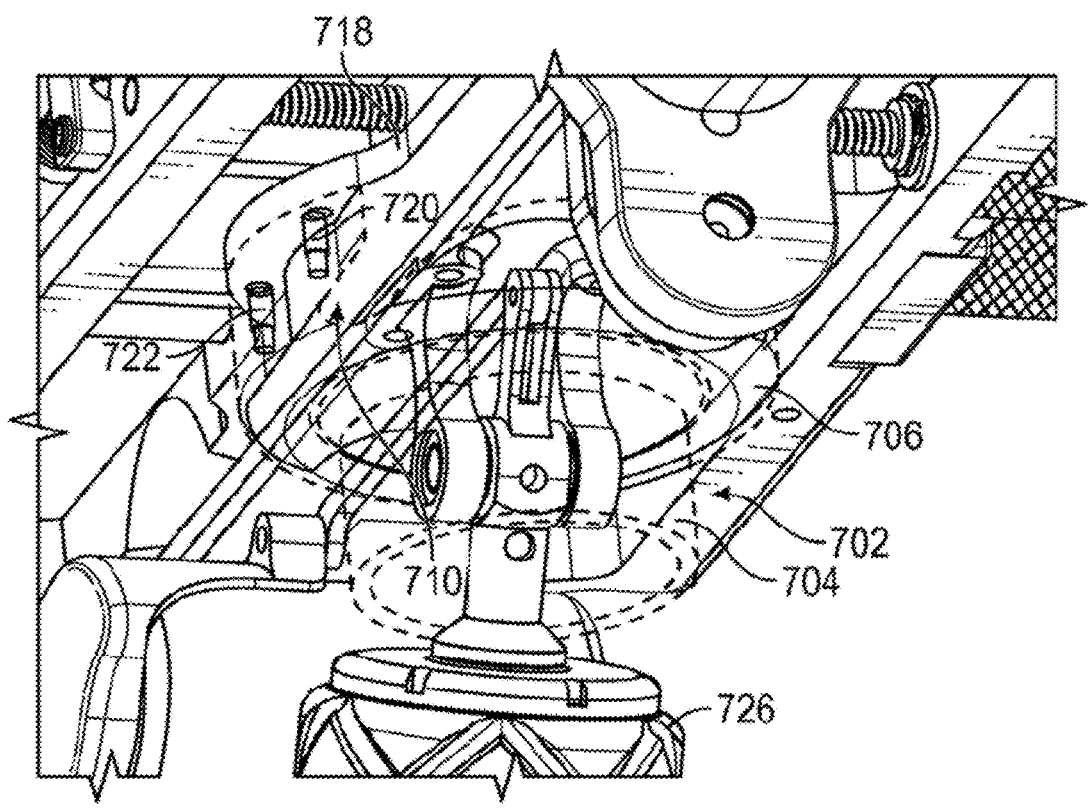
FIG. 17 depicts a portion of an actively stabilized payload support apparatus with the grip shown transparently, according to an illustrative embodiment of the invention.

FIG. 17 depicts a portion of an actively stabilized payload support system with grip 702 shown transparently, thereby revealing various components of pan, tilt and roll mechanisms and an illustrative fastening mechanism to secure grip 702 to stage 718.

Bolts 720, 722 are shown securing grip 702 to stage 718. Additional bolts or other fastening mechanisms can be employed. Grip 702 is thus referenced to stage 718 and moves independently from roll frame 712. This is a significant difference from grip 620 shown in FIGS. 10-15, which is referenced to roll frame 616.

Dimensions of exemplary grip 702 are now provided. An illustrative outer diameter of first grip section 704 is 1.25 inches, and an illustrative outer diameter range is about 1.2 inches to about 1.3 inches. An illustrative length of first grip section 704, as measured from the opening of first grip section 704 to the interface with second grip section 706, is about 0.40 inches to about 0.45 inches. The payload size will be one factor that will determine the optimum dimensions of various parts of the payload support apparatus. The relationship of components will also have an effect on dimensions of parts and range of motion. For example, the positions of the bottom of grip 702, top of handle 726 and the relative location of tilt axis 730, which relate to the length of pan shaft 724, will have an effect on the maximum tilt excursion.

FIG. 16 shows handle 726 tilted with respect to grip 702. In FIG. 16, further tilting is limited by contact between handle 726 and grip 702. The position of tilt motor 732 and roll motor 714 can depart from that which is shown in the figures. Alternative positions may be desired to avoid interference with other support apparatus components, or to better balance the system.

Figure 18:
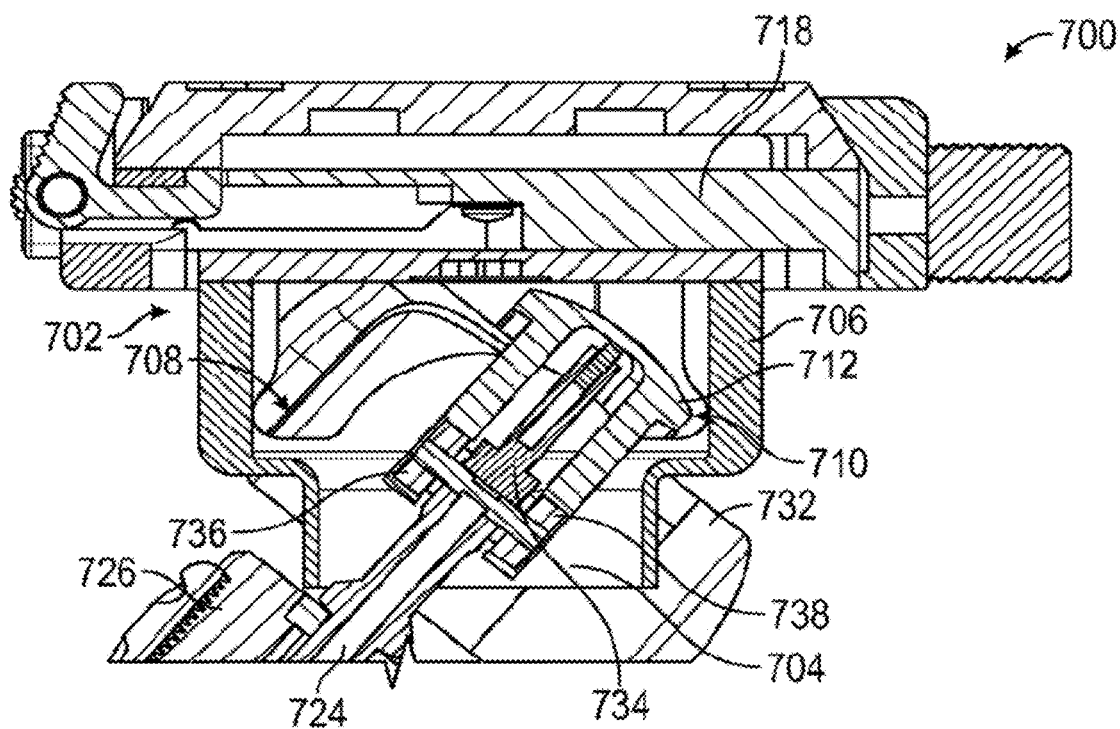
FIG. 18 is a cross section of an actively stabilized payload support apparatus according to an illustrative embodiment of the invention.

FIG. 18 is a cross-section of a portion of actively stabilized payload support apparatus 700 according to an illustrative embodiment of the invention. In FIG. 18, roll frame 712 is in a non-horizontal position. Tilt motor 732 is attached to roll frame 712, so rolls with it. Grip 702 is referenced to stage 718 so does not roll with roll frame 712. Mounting 734 is disposed between bosses 736, 738, which are attached to roll frame 712. Mounting 734 is further attached to pan shaft 724.

Figure 20:
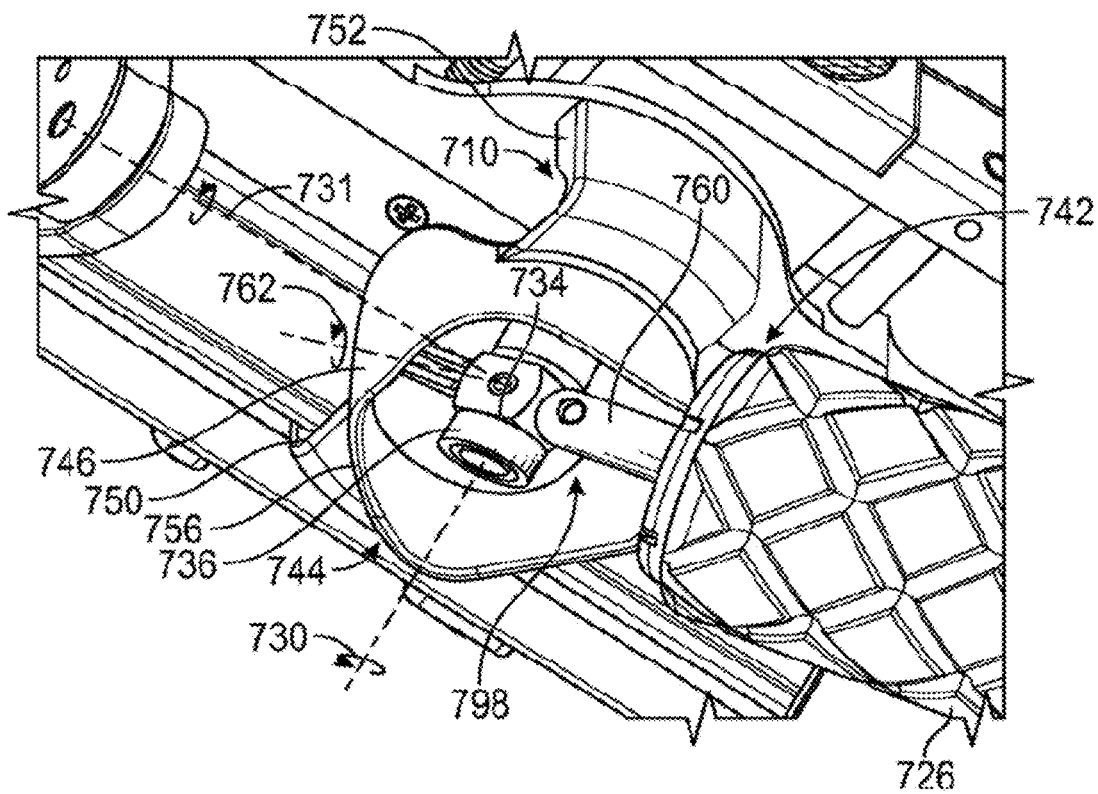
FIG. 20 depicts a universal joint within a grip of an actively stabilized payload support apparatus, according to an illustrative embodiment of the invention.

FIG. 20 depicts a view looking up through the bottom of grip 702 according to an illustrative embodiment of the invention. Handle 726 is angled in this view but extends directly below grip 702 in a non-angled mode. Slots 710, 742 accommodate roll frame 712 as it rolls in a first direction away from the horizontal position, and slot 708 and a slot opposing slot 742 (not shown) accommodate roll frame 712 as it rolls in the opposite direction away from the horizontal position. Further visible in FIG. 20 are bosses 736, 738 and mounting 734 disposed between the bosses.

FIG. 19 depicts a scalloped-edged grip 744 having a smaller diameter grip section 746 and a larger diameter grip section 748 according to an illustrative embodiment. Two opposing portions 750, 752 of larger diameter grip section 748, together with interspersed, extended smaller diameter portion 754, and an opposing extended portion, form slots into which roll frame 712 can rotate. Smaller diameter grip section 746 is not stacked with larger diameter grip section in the manner of grips 620 and 702, i.e. with all points of an interface in the same plane. Instead, portions of smaller diameter grip section 746 extend up to levels at which larger diameter grip section 748 is present, such as portion 754 of smaller diameter grip section 746. A second smaller diameter grip portion exists opposite grip portion 754 (but is not visible), and also extends to a level in common with portions of larger diameter grip portion 748. Smaller diameter grip portions extending to levels of larger diameter grip section 748 provide additional grip surface area for an operator to utilize when controlling the apparatus. This can compensate for reduced surface area resulting from reduction in material at the lower edge of grip 744 to the form a scalloped edge 756. In an illustrative embodiment of the invention, the diameter of smaller diameter grip section 754 is approximately 1.3 inches, with an illustrative range of about 1.25 inches to about 1.35 inches. An illustrative diameter of pan shaft 760 is about 0.25 inches.

Figure 21:
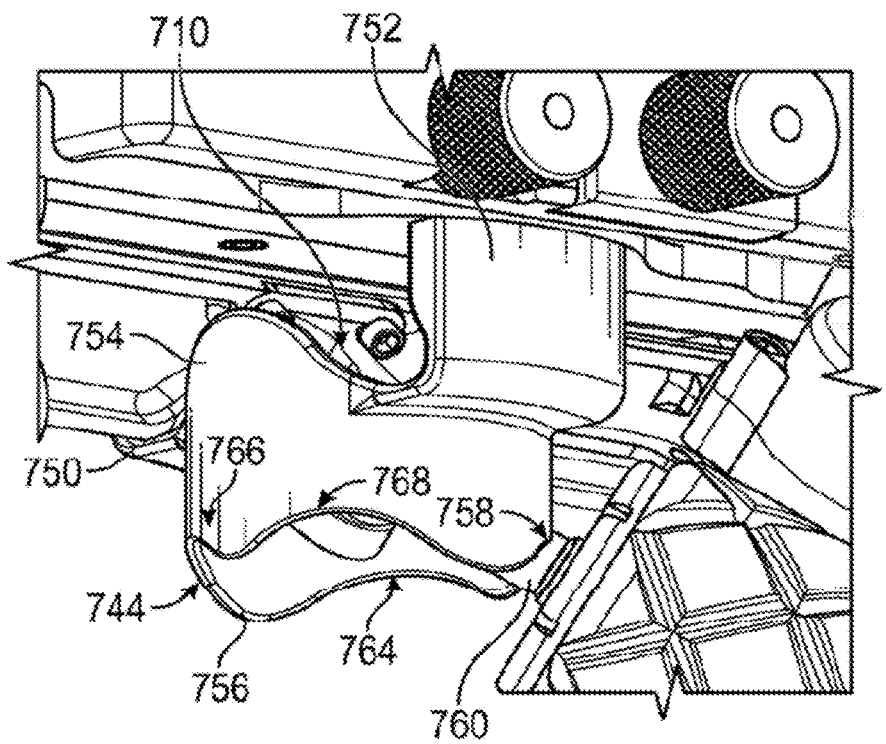
FIG. 21 shows the scalloped-edged grip of an actively stabilized payload support apparatus, according to an illustrative embodiment of the invention.

FIGS. 20-21 demonstrate the function of scalloped-edge 756 of grip 744. FIGS. 20 and 21 show handle 726 tilted toward grip 744. FIG. 21 shows the point at which pan shaft 760 encounters grip 744. An indentation 758 in scalloped edge 756 provides space to accommodate pan shaft 760 as it is tilted upward toward grip 744. Three additional indentations spaced evenly around scalloped edge 756 allow pan shaft 760 to be tilted at a greater angle than if no indentations were present. The indentations are cut-outs in the scalloped edge 756 of grip 744. Other numbers, configurations and distributions of the cut-outs can be used provided they achieve the desired function and extent of accommodating pan shaft 760.

FIG. 20 provides a view of the universal joint 798 providing perpendicular axes of rotation, one around roll axis 731 and one about tilt axis 730. As pan shaft 760 tilts about tilt axis 730, and stage 718 rolls about roll axis 731, the four indentations 758, 764, 766, 768 in the bottom of scalloped edge 756 provide room for pan shaft 760 to extend into grip 744 to increase the degree of possible tilt compared to the tilt limit of a straight-edged grip. The center of indentations 758, 764, 766, 768 are positioned at the midpoint angle (i.e. 45°) of each quadrant formed by the two axes of universal joint 798, tilt axis 730 and roll axis 731. This midpoint represents the excursion produced when both joints are exercised equally, thereby maximizing the angle of handle 726 from the vertical.

FIG. 21 shows the following features of grip 744 that were described above: indentations 758, 764, 766, 768; larger diameter grip portion 752; smaller diameter grip portion 754; and scalloped edge 756.

Figure 22:
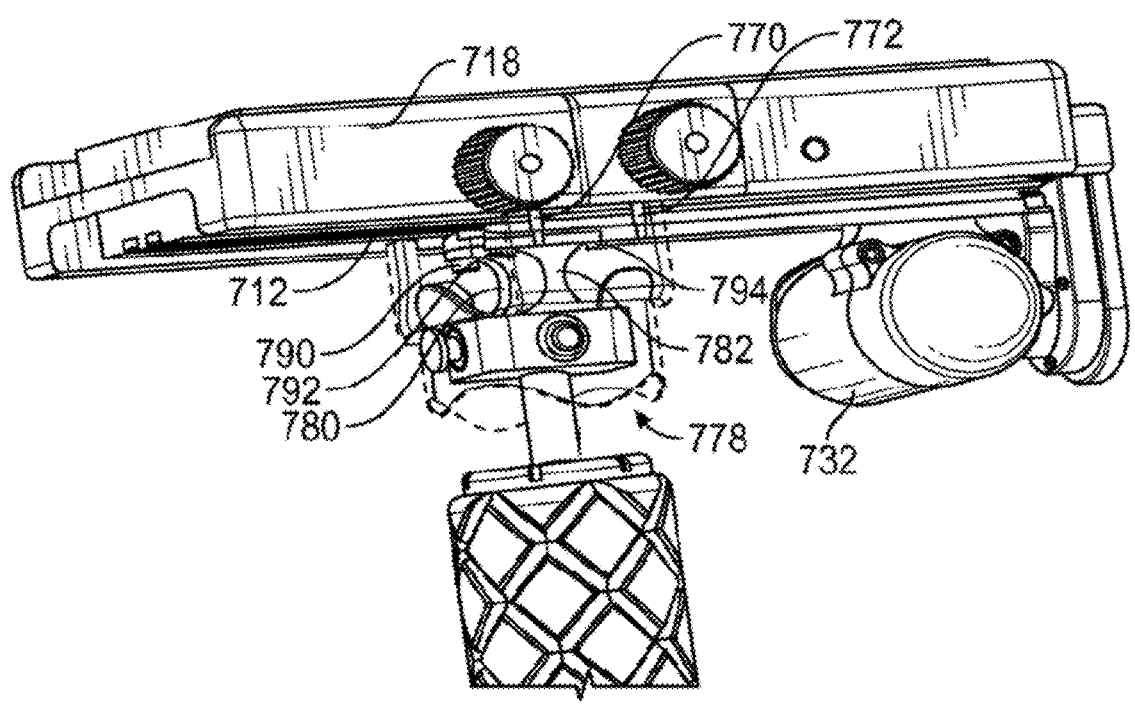
FIG. 22 depicts an actively stabilized payload support apparatus in which the roll frame is supported by the grip, according to an illustrative embodiment of the invention.
Figure 23:
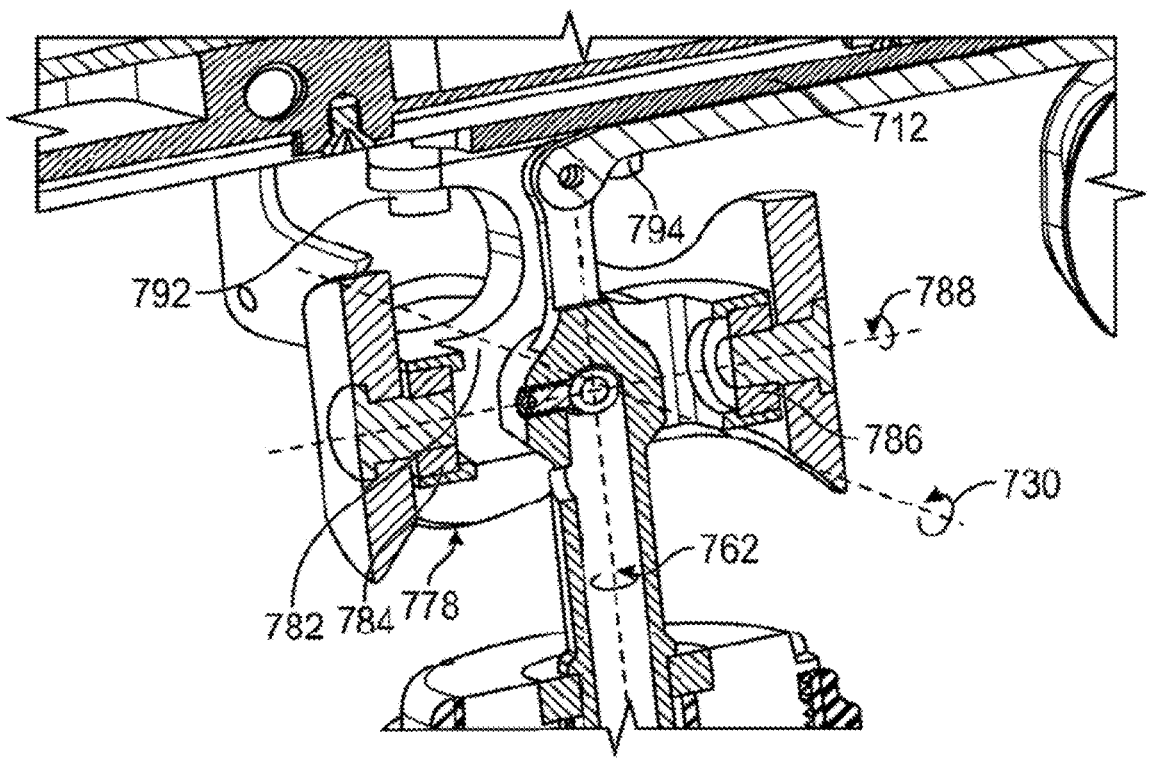
FIG. 23 depicts a cross section of an actively stabilized payload support apparatus in which the roll frame is supported by the grip, according to an illustrative embodiment of the invention.

FIGS. 22-24 depict an actively stabilized payload support apparatus according to a further illustrative embodiment of the invention. FIG. 22 shows a portion of the apparatus with grip 778 shown transparently to expose gimbal components and connection of grip 778 to various parts of the apparatus. Grip 778 is referenced to stage 718 by being fixedly secured with bolts 770, 772, on one side and additional bolts on the opposite side (not shown). Large diameter grip section 748 of grip 778, shown transparently in FIG. 22, and an opposing grip section are of a thickness sufficient to accommodate bolts 770, 772 and any additional bolts used to secure grip 778 to stage 718.

Figure 27:
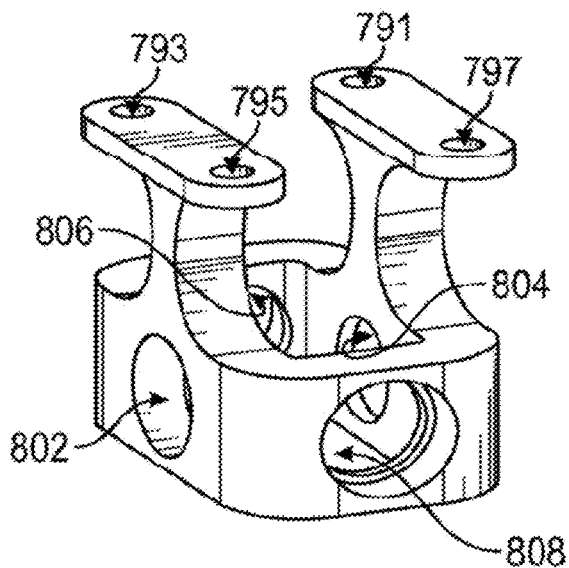
FIG. 27 depicts a boss according to an illustrative embodiment of the invention.

As can be seen in cross sectional FIG. 23, grip 778 is further secured to boss 782 via bearings 784, 786, thereby providing a roll axis 788. Boss 782 is secured to roll frame 712 by bolts 790, 792, 794, of which 790 is visible in FIG. 22, and an additional bolt not shown, although other fastening mechanisms or configurations may be used. FIG. 27 depicts an illustrative boss 782 having four holes 791, 793, 795, 797 through which bolts 790, 792, 794 and one additional bolt are disposed. Boss 782 also has openings 802, 804, 806, 808 to accommodate universal joint 798, with one axis of rotation passing through openings 802, 804 and a second, substantially perpendicular axis, passing through openings 806, 808.

The illustrative embodiment depicted in FIG. 23 differs from previously-described configurations because roll frame 712 terminates and is supported inside grip 778 by bearings 784, 786, placing the roll axis through grip 778. FIG. 23 also shows pan axis 762 and tilt axis 730.

FIG. 24 is a cross section of the actively stabilized payload support apparatus of FIGS. 22 and 23. Since roll frame 712 is secured to boss 782, which in turn are secured to grip 778, roll frame 712 need not extend on both sides of handle 726 for support. As can be seen in FIG. 24, roll frame 712 need only extend toward roll motor 714. Further seen in FIGS. 22-24 is pan shaft 760, which is secured to grip 778 so that grip 778 exhibits pan motion produced by a pan motor 796 that is contained in handle 726.

Figure 25:
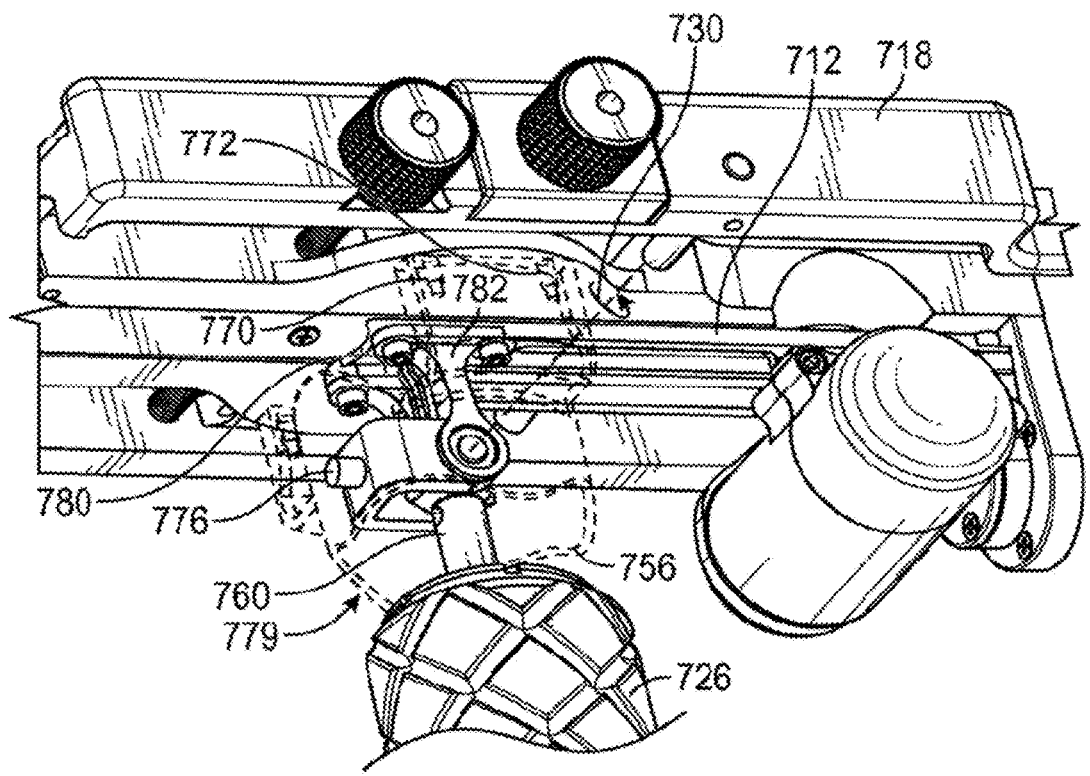
FIG. 25 depicts an actively stabilized payload support according to a further illustrative embodiment of the invention, in which the roll frame is supported by the grip.
Figure 26:
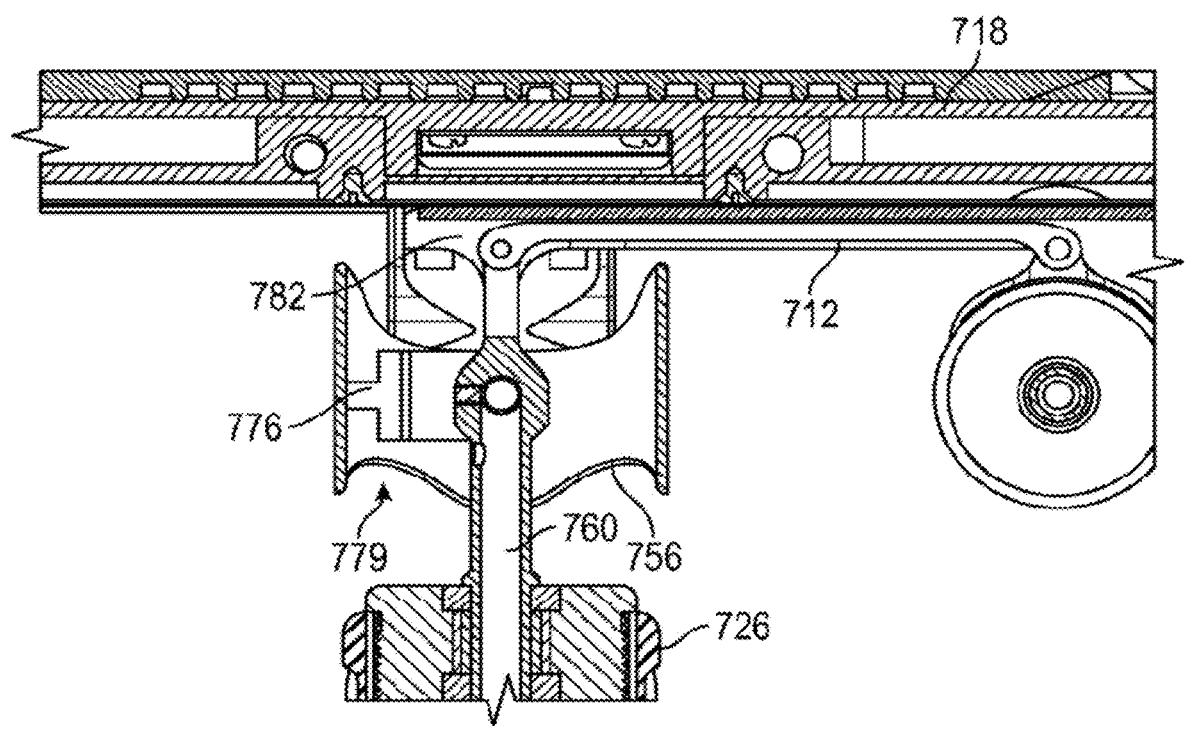
FIG. 26 is a cross section of an actively stabilized payload support according to the illustrative embodiment of the invention of FIG. 25.

FIGS. 25 and 26 depict an actively stabilized payload support according to an illustrative embodiment in which, similar to the illustrative embodiment shown in FIG. 23, has a grip 779 referenced to stage 718. Grip 779 is secured to boss 782 via a single bearing 776. This is different from the illustrative embodiment shown in FIG. 23 in which grip 778 is secured to boss 782 via two bearings 784, 786.

Figure 28:
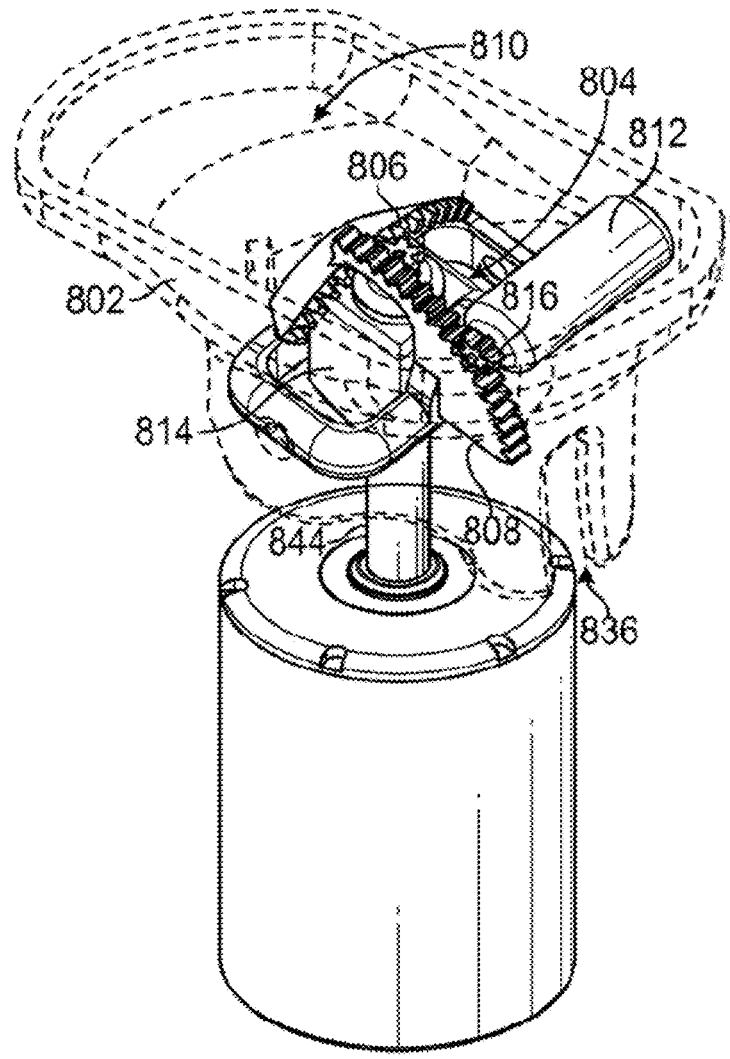
FIG. 28 depicts a portion of an actively stabilized payload support apparatus with the grip presented transparently to show a pinion and sector gear mechanism, according to an illustrative embodiment of the invention.
Figure 29:
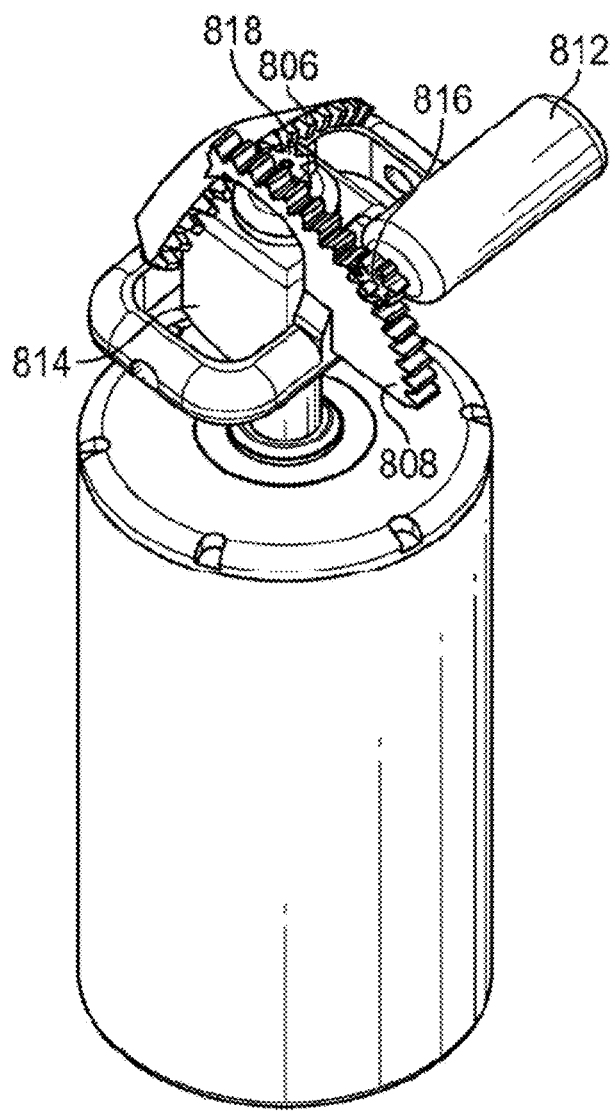
FIG. 29 depicts a portion of a pinion and sector gear mechanism, according to an illustrative embodiment of the invention.

FIG. 28 depicts a portion of an actively stabilized payload support apparatus 800 with grip 802 presented transparently to show a pinion and sector gear mechanism 804 that produces and controls roll and tilt motions, according to an illustrative embodiment of the disclosed apparatus. FIG. 29 depicts pinion and sector gear mechanism 804. Sector roll gear 806 generates roll motion and sector tilt gear 808 creates tilt motion. Motor 812 drives sector tilt gear 808 via tilt pinion 816. Motor 814 drives sector roll gear 806 via pinion 818. Grip 802 has an extended section 810, for example, to accommodate circuitry.

Figure 30:
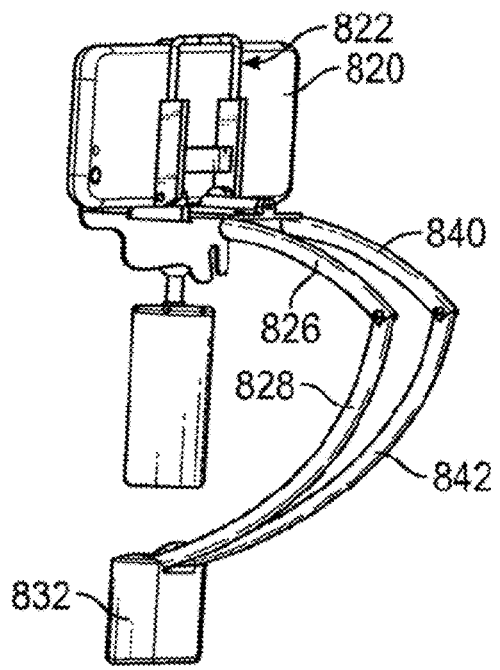
FIG. 30 depicts a front perspective view of an actively stabilized payload support, according to an illustrative embodiment of the invention.
Figure 31:
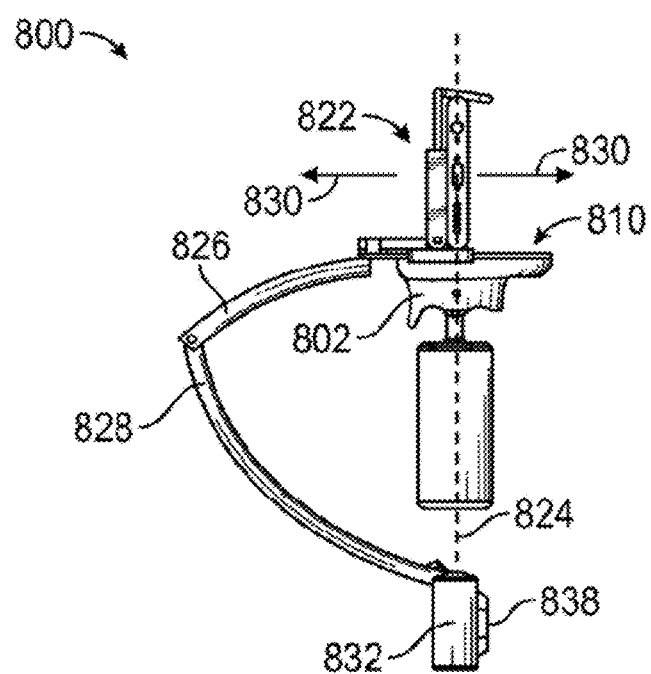
FIG. 31 depicts a side view of the actively stabilized payload support of FIG. 30, according to an illustrative embodiment of the invention.
Figure 32:
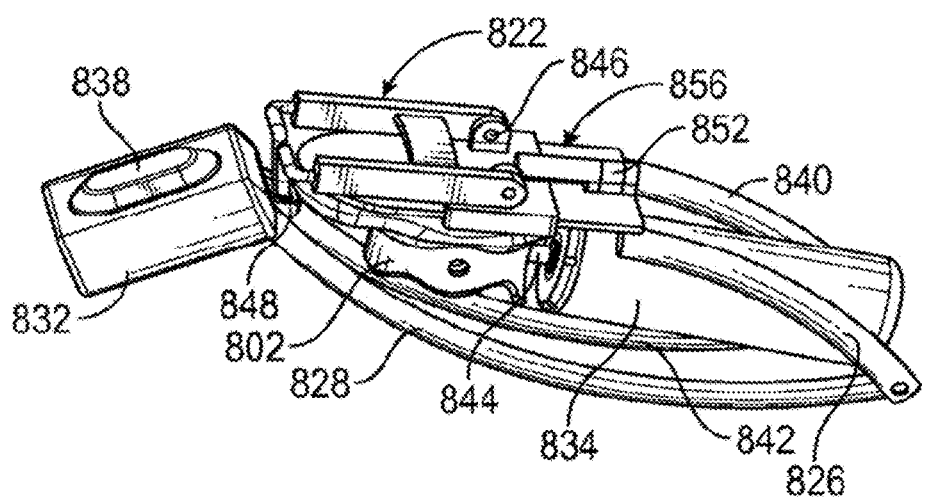
FIG. 32 depicts the actively stabilized payload support of FIG. 30 in a folded position, according to an illustrative embodiment of the invention.

FIGS. 30 and 31 depict a perspective and side view, respectively, of actively stabilized payload support 800 according to an illustrative embodiment of the disclosure apparatus. Imaging device 820 is secured to the payload support by holder 822. Holder 822 is moveable with respect to grip 802 as shown by arrows 830 on FIG. 31. As shown in FIG. 32, movement may be adjustable for example, by a screw 854 and threaded receiving component 856, with screw advancement controlled by a knob 852. The position of imaging device 820 and holder 822 with respect to centerline 824 of the apparatus affects the balance of the system. Centerline 824 is a virtual vertical line that extends through the center of gravity of the apparatus. Typically, a user will want centerline 824 to be coincident with the vertical centerline of imaging device 820, both front to back, and side to side. The apparatus and associated payload will be set up so centerline 824 passes through the longitudinal axis of handle 834 and the single convergent point of the tilt, roll and pan axes. Holder 822 though adds weight to one side of the imaging device. This may be offset by a number of components distributed about the center of gravity that further affect the system's balance. Extended grip section 810 as depicted offsets the opposing weight of spars 826, 828. Only one set of spars is shown in FIG. 31. Opposing spars 840, 842 are present in the apparatus as shown in FIG. 30, for example. Battery case 832, which in an illustrative embodiment holds three double A batteries, may be in line with centerline 824, or on either side. Extension 838 serves as a weight, which may be permanently affixed at a specific location. Alternatively, extension 838, or other form of weight, may be added or removed as necessary to further affect the desired balance of the apparatus. In an illustrative embodiment, extension 838 counterbalances spars 826, 828, 840, 842 the unloaded support apparatus, i.e. without batteries in battery case 832 and imaging device 820.

Figure 33:
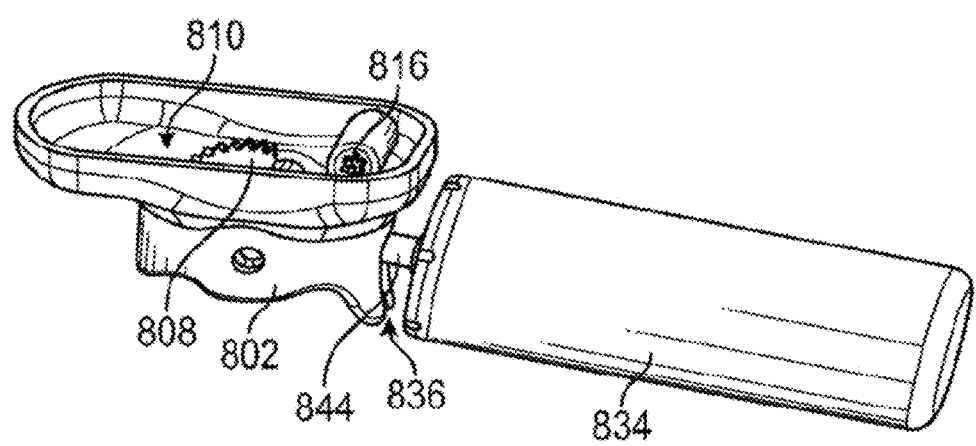
FIG. 33 illustrates how a tilt sector gear disengages from a tilt pinion when an actively stabilized payload support is folded, as configured, according to an illustrative embodiment of the invention.

Support apparatus 800 can be folded for storage as shown in FIG. 32. Referring to FIGS. 28, 32, and 33 a slot 836 is shown in grip 802. When handle 834 of payload support apparatus 800 is folded upward, pan shaft 844 is accommodated in slot 836. Spars, 826, 828 are fold toward each other and further toward handle 834. Similarly, spars 840, 842 fold toward each other and further toward handle 834 so that handle 834 is between spars 826, 828, 840, 842, as depicted, for example, in FIG. 32. One or more cross pieces (not shown) can be incorporated between the sets of spars to serve as a stop for handle 834 when folding the apparatus. A cross piece would extend, for example, between spars 826 and 840.

As shown in FIG. 33, tilt sector gear 808 disengages from tilt pinion 816 when the apparatus is folded. The relative positions of tilt sector gear 808 and slot 836 are designed to ensure that tilt sector gear 808 disengages from tilt pinion 816 when handle 834 is folded upward.

Figure 34:
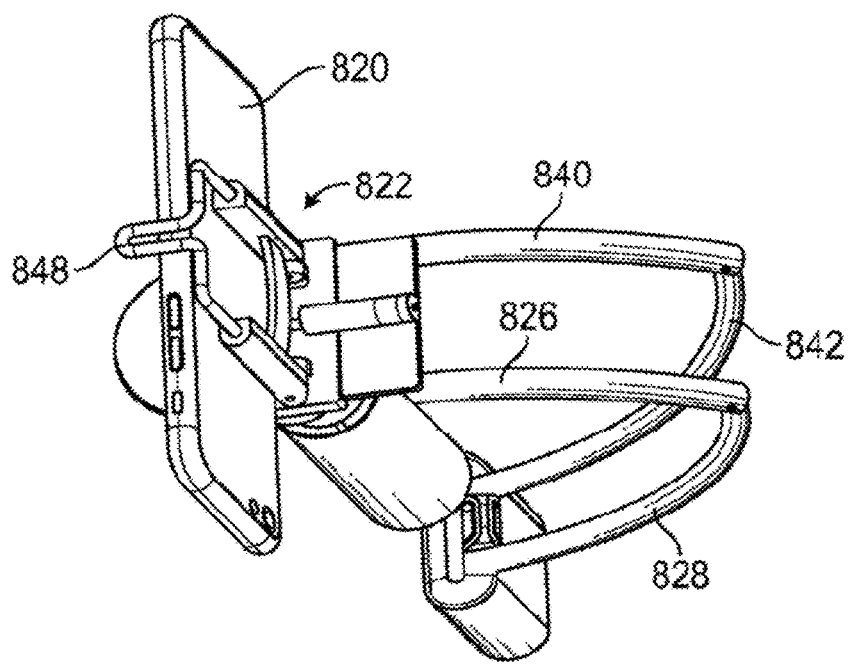
FIG. 34 depicts a portion of an actively stabilized payload support showing an image device holder, according to an illustrative embodiment of the invention.

As depicted in FIG. 32 holder 822 folds toward spars 826, 828, 840, 842 by pivoting about axle 846. As can be seen, for example, in FIG. 34 holder 822 has a clip 848 that secures imaging device 820 to payload support 800 when the apparatus is unfolded. Clip 848 is preferably spring-loaded, but alternative mechanisms can be used to securely engage clip 848 with imaging device 820 in the desired position. When holder 822 is in a folded position, clip 848 is in the vicinity of battery case 832. Battery case 832 has a clip-engaging component to secure battery case 832 in place when the payload support is folded. The clip-engaging component can have a variety of configurations, as long as it engages clip 848 to secure the apparatus in a folded position.

In a further illustrative embodiment of the invention, the handle is not folded up, but instead remains 'vertical' and other components fold toward or 'inline' with the handle.

Figure 35:
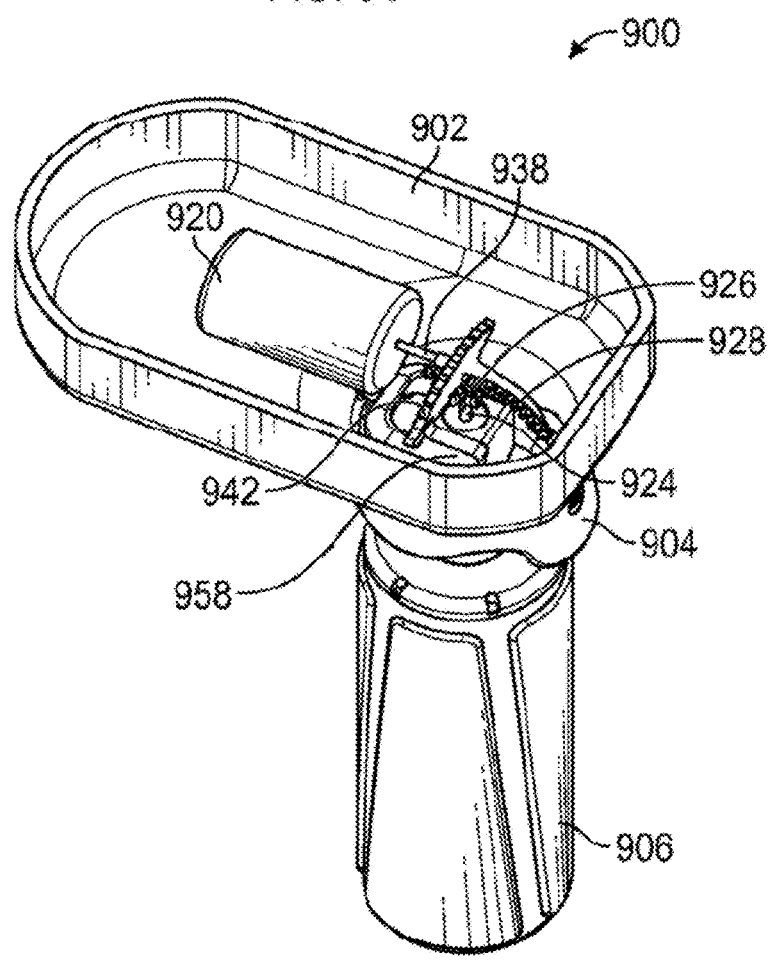
FIG. 35 is a perspective view of an actively stabilized payload support apparatus looking down into a stage body according to a further illustrative embodiment.
Figure 36:
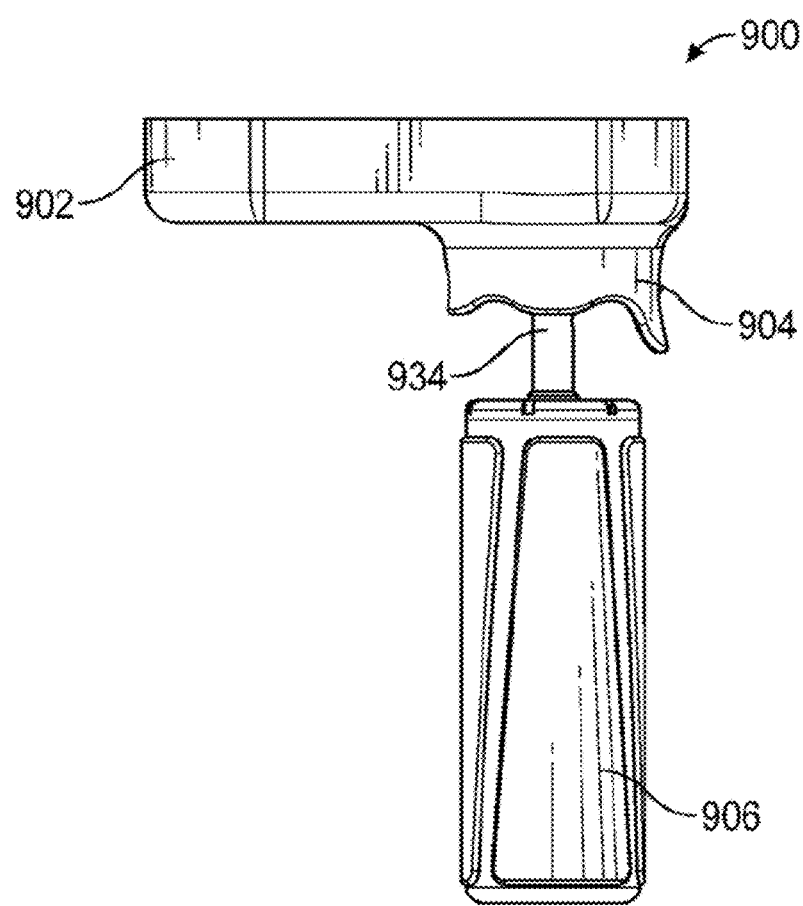
FIG. 36 is a side view of the illustrative embodiment shown in FIG. 35.
Figure 38:
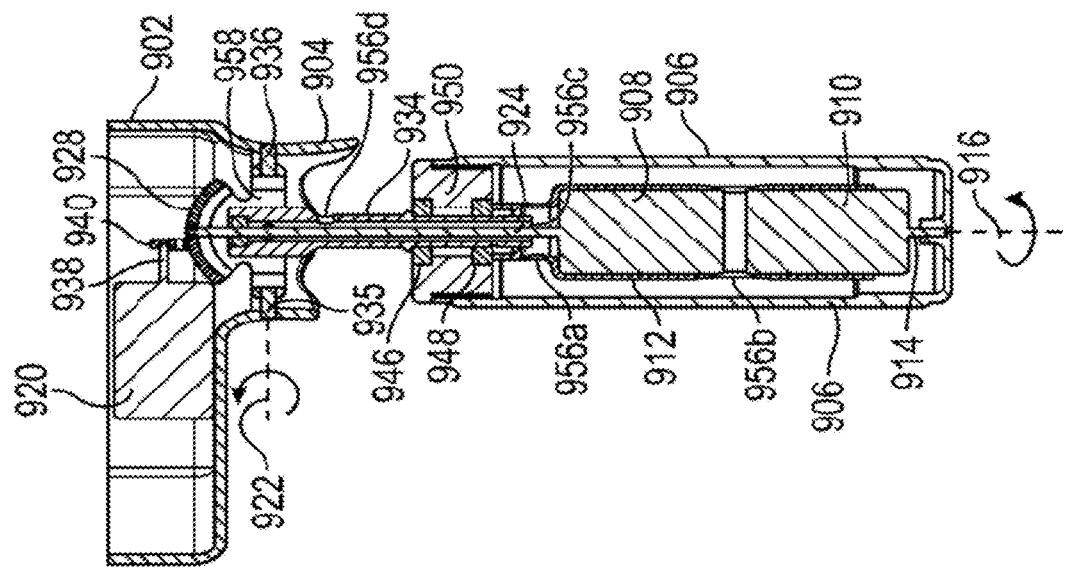
FIG. 38 is a cross-sectional view through line A-A of FIG. 37.
Figure 37:
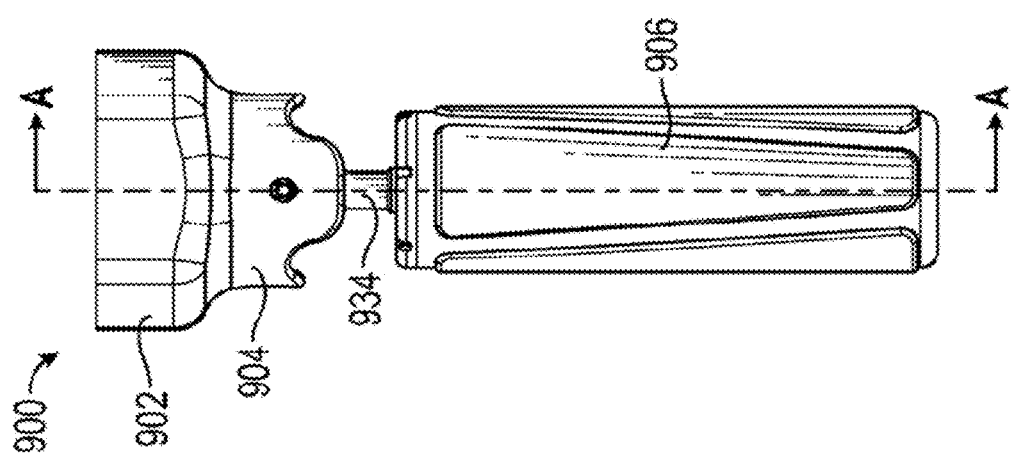
FIG. 37 is a back view of the actively stabilized payload support apparatus shown in FIG. 35.
Figure 39:
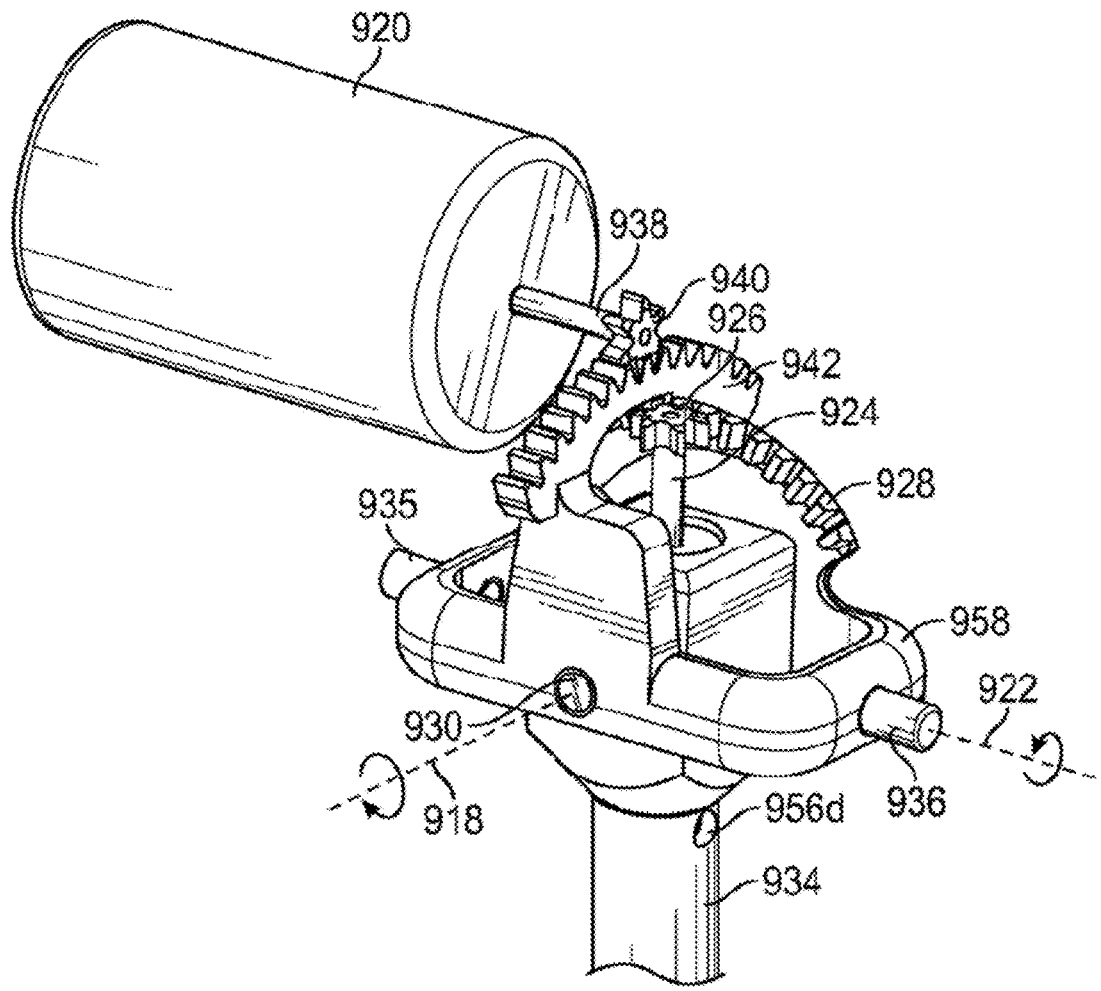
FIG. 39 is a close up perspective view of a portion of the mechanism shown in FIG. 35.
Figure 40:
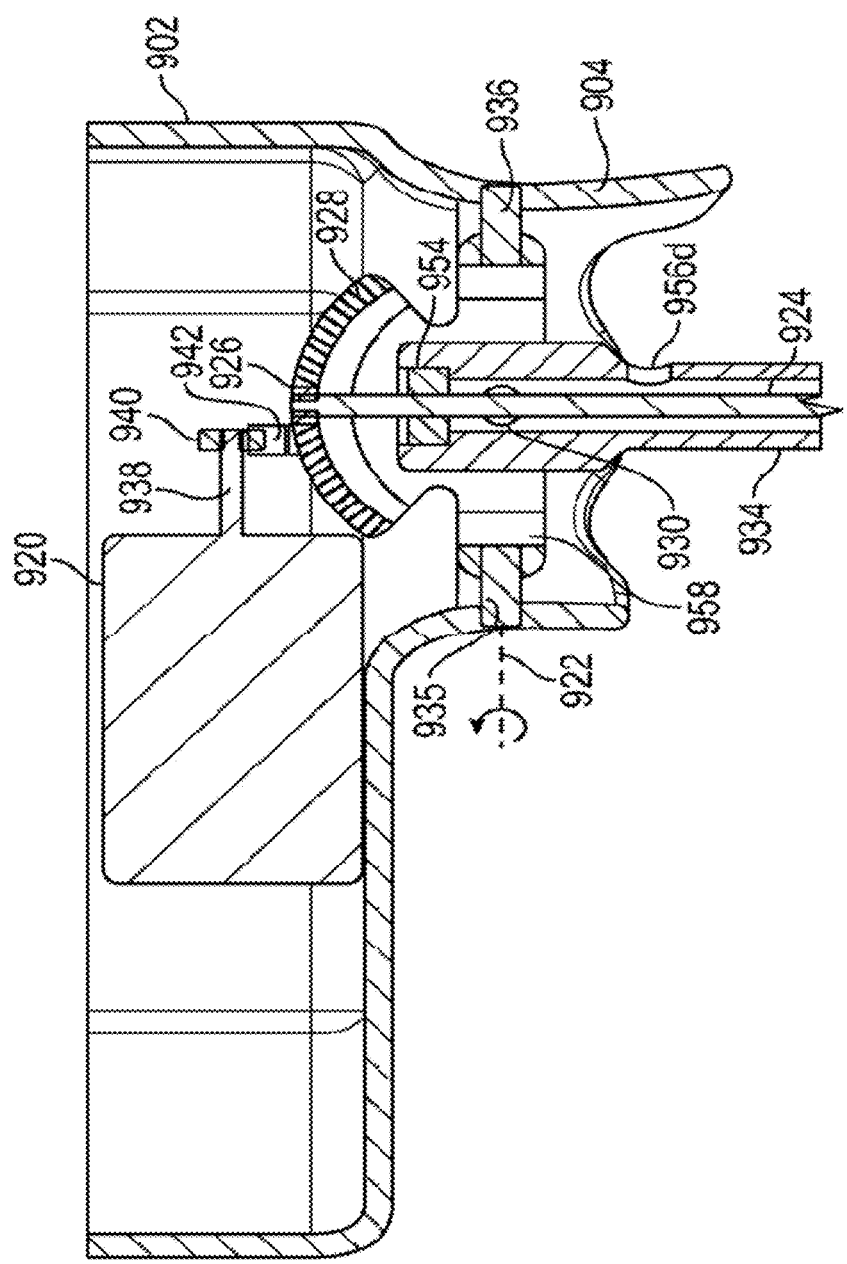
FIG. 40 is a close-up, cross-sectional view of a portion of FIG. 38.

FIGS. 35-39 depict a further illustrative embodiment of an actively stabilized payload support apparatus 900, which may include components of the other illustrative embodiments shown or described herein. FIG. 35 is a perspective view of actively stabilized payload support apparatus 900 looking down into a stage body 902. FIG. 36 is a side view of an illustrative embodiment. FIG. 37 is a back view of actively stabilized payload support apparatus 900. FIG. 38 is a cross-sectional view through line A-A of FIG. 37. FIG. 39 is a close up perspective view of the mechanism within stage body 902. FIG. 40 is a close-up cross-sectional view of the mechanism within stage body 902.

Actively stabilized payload support apparatus 900 includes a stage body 902 having a grip 904 attached thereto or integral therewith. Stage body 902 can be configured in numerous ways, provided that it is associated as necessary with other components of the apparatus, such as for example without limitation, pivot shafts 935, 936, and can be configured to allow support of a payload thereon or in conjunction with. Stage body 902 and grip 904 surround a tilt sector gear 928 and a roll sector gear 942 that impart roll and tilt motion to a payload supported by or secured to actively stabilized payload support apparatus 900. Sector gears 928, 942 are attached to or integral with frame 958. Frame 958 can have various configurations provided it allows for the necessary rotation about the associated axes. It can be for example, considered as a section of a gimbal apparatus, and may for example take on the form of, or replace, a gimbal yoke. Handle 906 surrounds a tilt motor 908 and a pan motor 910. The bodies of tilt motor 908 and pan motor 910 do not rotate relative to grip 904.

Tilt motor 908 is attached to tilt motor drive shaft 924. A tilt axis drive gear 926 is attached to tilt motor drive shaft 924. Tilt axis drive gear 926 is functionally engaged with tilt sector gear 928. Tilt sector gear 928 is attached to or integral with frame 958. Frame 958 is pivotally attached to main support shaft 934 at tilt axis pivot 930, 932 allowing frame 958 to rotate with respect to main support shaft 934 about tilt axis 918. Frame 958 is further attached to stage 902, at roll axis pivot shafts 935, 936, or other suitable attachment mechanism. As tilt axis drive gear 926 rotates it causes tilt sector gear 928 to rotate, and hence, frame 958 and stage body 902 are tilted about tilt axis 918 in a plane perpendicular to the rotation of tilt axis drive gear 926. A payload secured to stage body 902 would thus also rotate about tilt axis 918.

A roll motor 920 rotates a payload secured to actively stabilized payload support apparatus 900 about roll axis 922. Roll motor shaft 938 is connected to roll axis drive gear 940. Roll axis drive gear 940 is functionally engaged with roll sector gear 942. Roll sector gear 942 is attached to or integral with frame 958. Frame 958 is connected to stage body 902 by rotational components, such as roll axis pivot shafts 935, 936. Thus, a payload attached to stage body 902 will rotate about roll axis 922 when roll motor 920 imparts angular motion to roll axis drive gear 940, and hence roll sector gear 942.

Pan, tilt and roll axes 916, 918, 922, respectively, converge generally at a grip 904 or roughly at or near the center of gravity of the actively stabilized payload support apparatus 900 when containing a payload positioned a stage supported by stage body 902, or other stage structure.

Tilt motor 908 is coupled to pan motor 910 by a concentric motor coupler 912. Pan motor shaft 914 is grounded to handle 906. Bearings 946, 948 allow relative rotation between handle 906 and main support shaft 934. Because pan motor shaft 914 is grounded to handle 906 pan motor shaft 914 generates angular motion of stage body 902 with respect to handle 906 about a pan axis 916.

Figure 41:
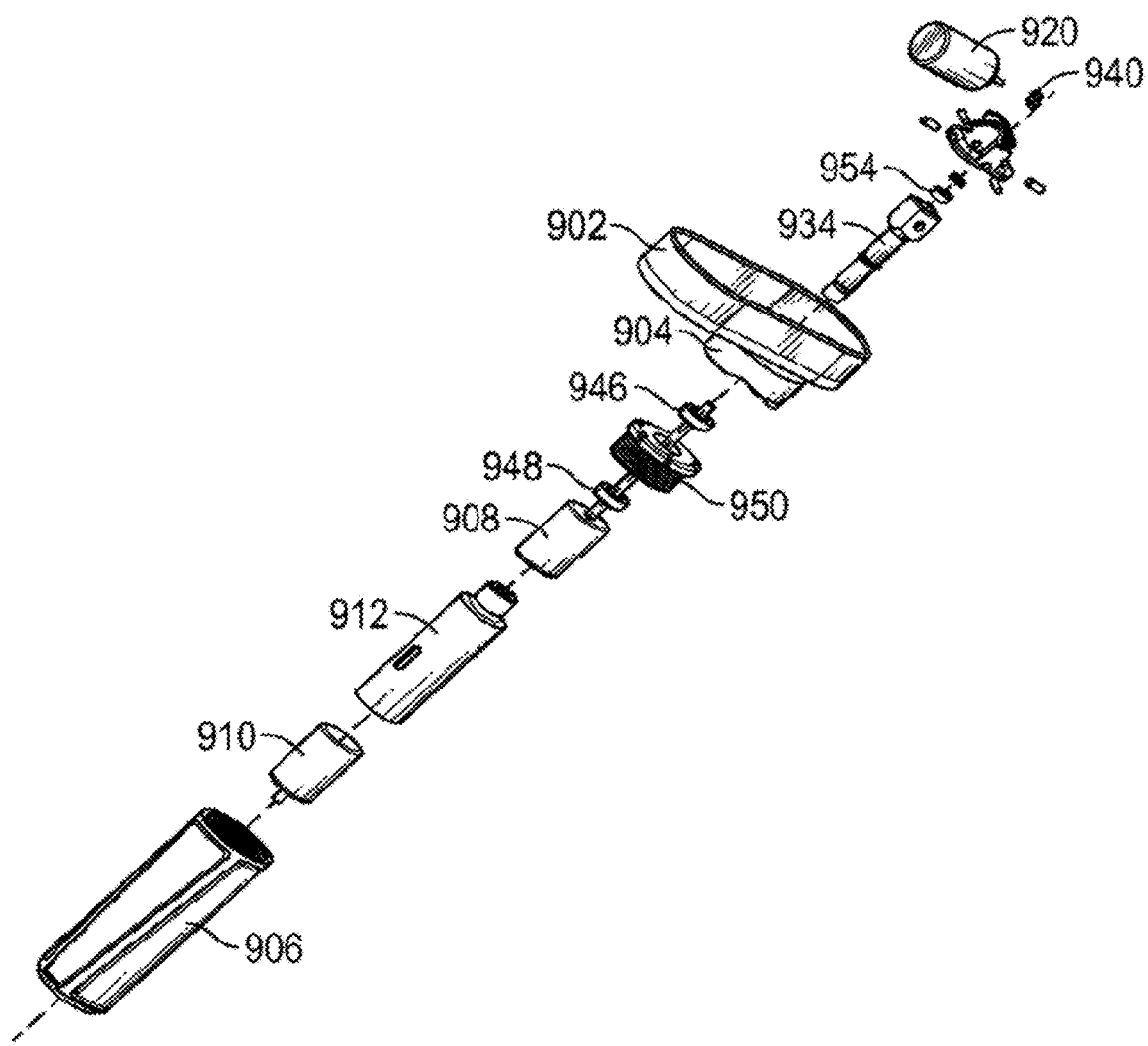
FIG. 41 is an exploded view of an actively stabilized payload support apparatus according to an illustrative embodiment.
Figure 42:
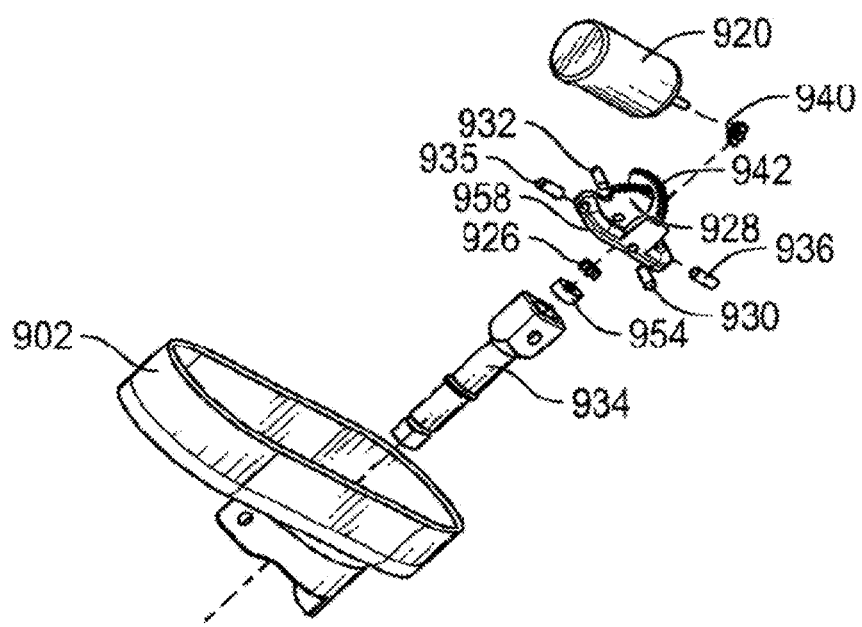
FIG. 42 is an enlargement of a portion of FIG. 41
Figure 43:
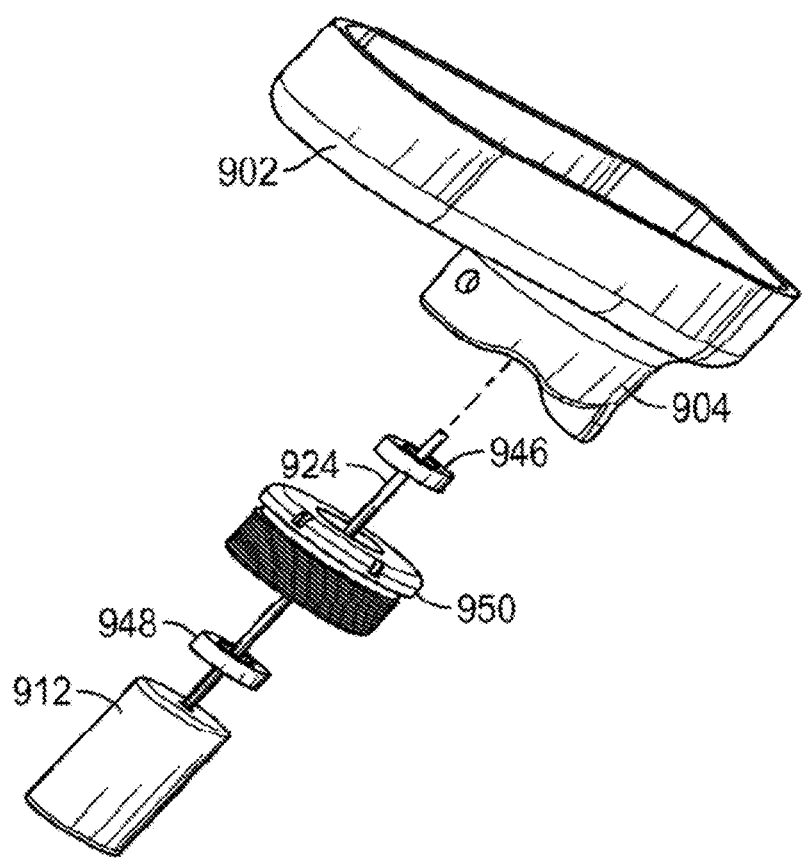
FIG. 43 is an enlargement of another portion of FIG. 41.

FIG. 41 is an exploded view of actively stabilized payload support 900. FIGS. 42 and 43 are enlargements of portions of FIG. 41. Shown in FIGS. 41-43 is handle 906, into which tilt motor 908, coupled to pan motor 910 by concentric motor coupler 912, are inserted. Tilt axis drive shaft 924 extends from tilt motor 908 through cap 950. Cap 950 is threaddedly engaged with handle 906. Main support shaft 934 is disposed around tilt axis drive shaft 924 and through cap 950. Stage body 902 and attachment components, roll axis pivot shafts 935, 936, which attach stage body 902 to frame 958 are also shown. Tilt axis drive shaft 924 is disposed through bearings 946, 948 at or near the top of handle 906. Main support shaft 934 is further disposed through bearing 954 within stage body 902.

Wire routing openings 956a,b,c,d are provided to thread wires through for operation of the motors and any other electronic components. Any number of openings suitable for the structure and use may be included.

Figure 45:
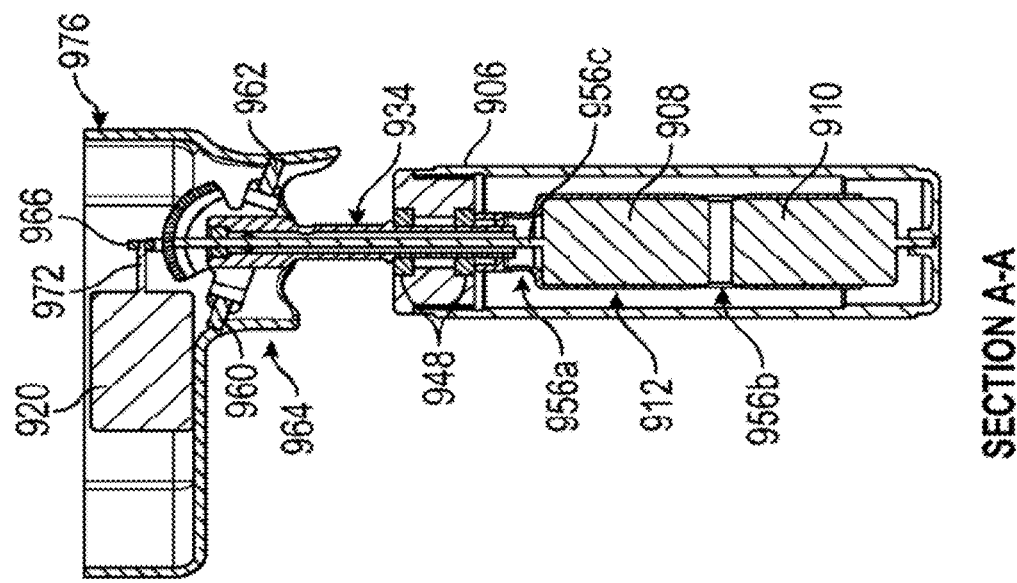
FIG. 45 is a cross-sectional view through line A-A of FIG. 44.
Figure 44:
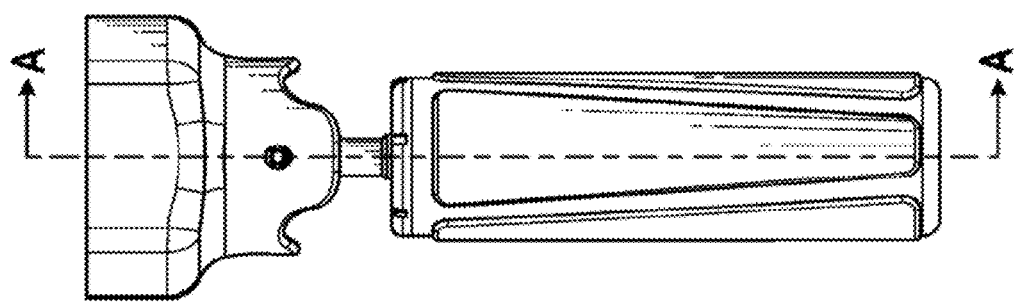
FIG. 44 is a back view of an actively stabilized payload support apparatus according to an illustrative embodiment.

FIG. 44 is a back view of a further illustrative embodiment of an actively stabilized payload support apparatus. FIG. 45 is a cross-sectional view through line A-A of FIG. 44 showing frame 958 tilted back at an angle α. Slot 964 accommodates the main support shaft 934, which may be required in this tilted configuration, particularly when the apparatus is folded. An illustrative angle α is shown in FIG. 45, wherein the angle is formed roughly between a line through roll pivot shafts 960, 962 and a line through a roll motor shaft 972. In an exemplary embodiment, angle α is in the range of about 10° to about 20°.

Figure 46:
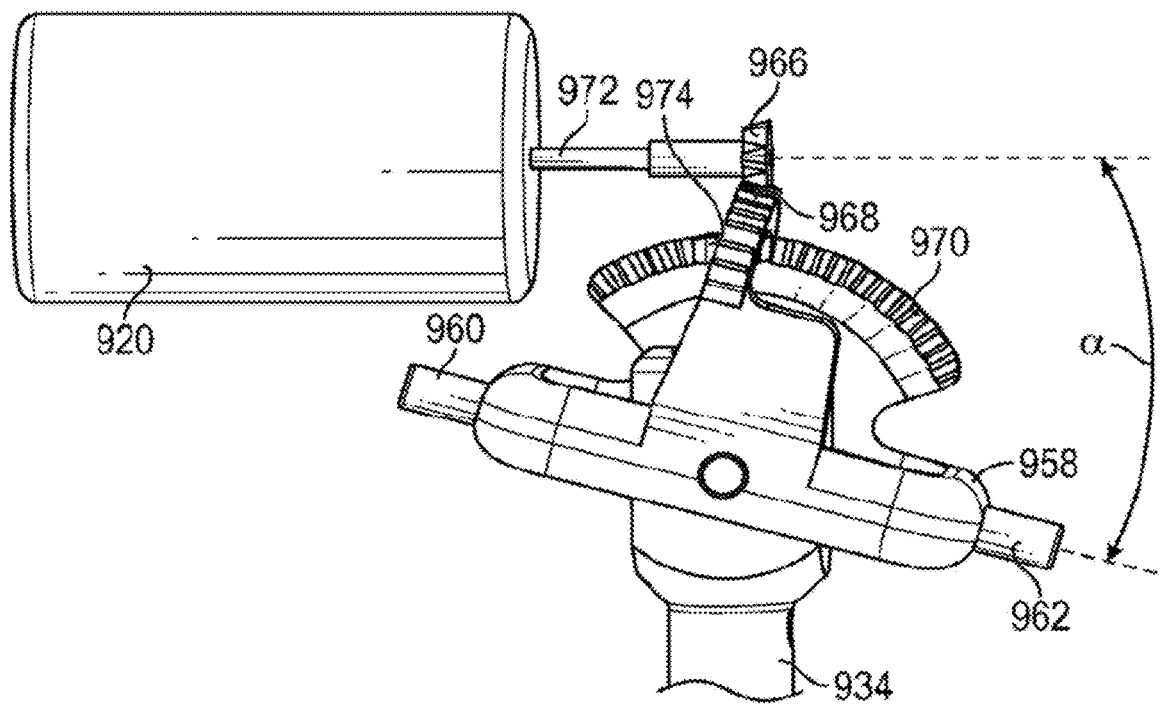
FIG. 46 is a close up perspective view of a portion of sector gears of the FIG. 45 embodiment.

A roll motor shaft 972 turns a roll axis drive gear 966. Roll sector gear 968 is tilted in this embodiment, so without change to the orientation of roll axis drive gear 966, one or both of the components must be modified so they functionally engage, such as by being beveled. FIG. 46 is a close up perspective view of a portion of sector gears 968, 970 of the FIG. 45 embodiment in which the angle of the gears with respect to one another is shown.

Roll pivot shafts 960, 962 interface with tilted stage body 976 at different points than those in a non-tilted version to accommodate the tilted configuration.

Figure 47:
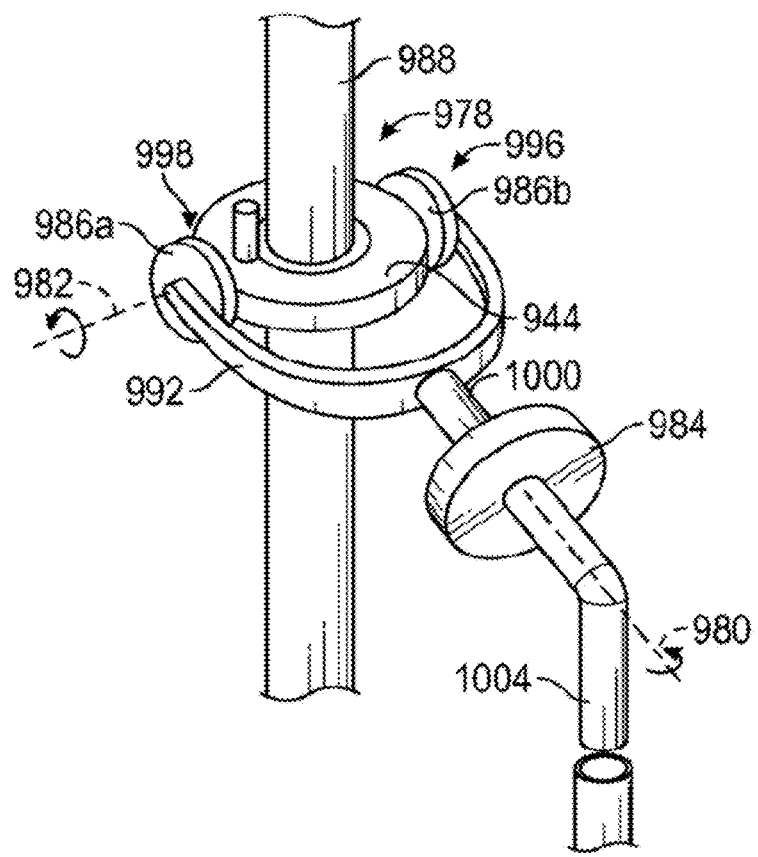
FIG. 47 depicts an illustrative embodiment of an actively stabilizing payload support having direct drive motors.
Figure 48:
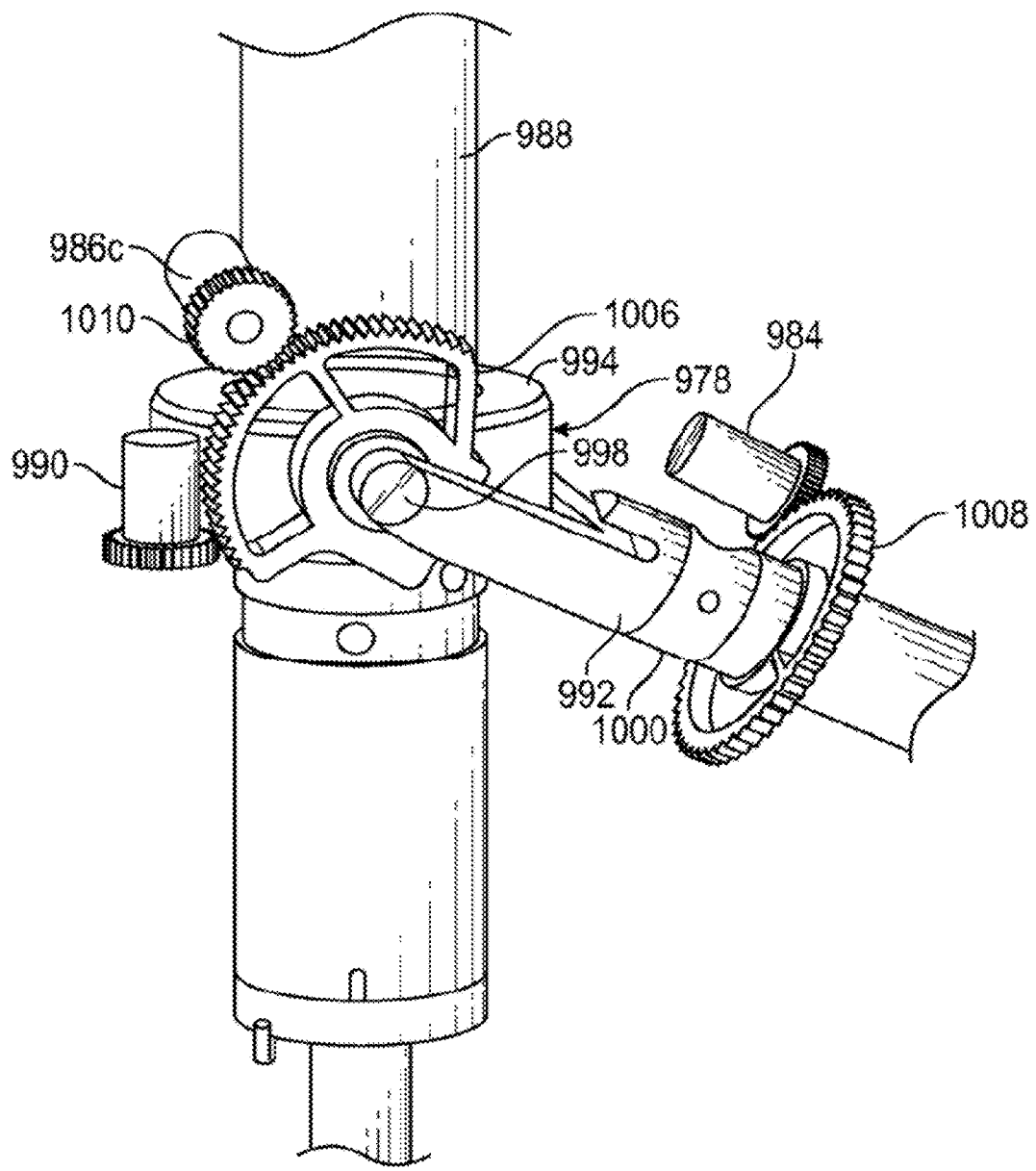
FIG. 48 depicts a further illustrative embodiment of an actively stabilizing payload support having a plurality of gears to generate rotational motion.
Figure 49:
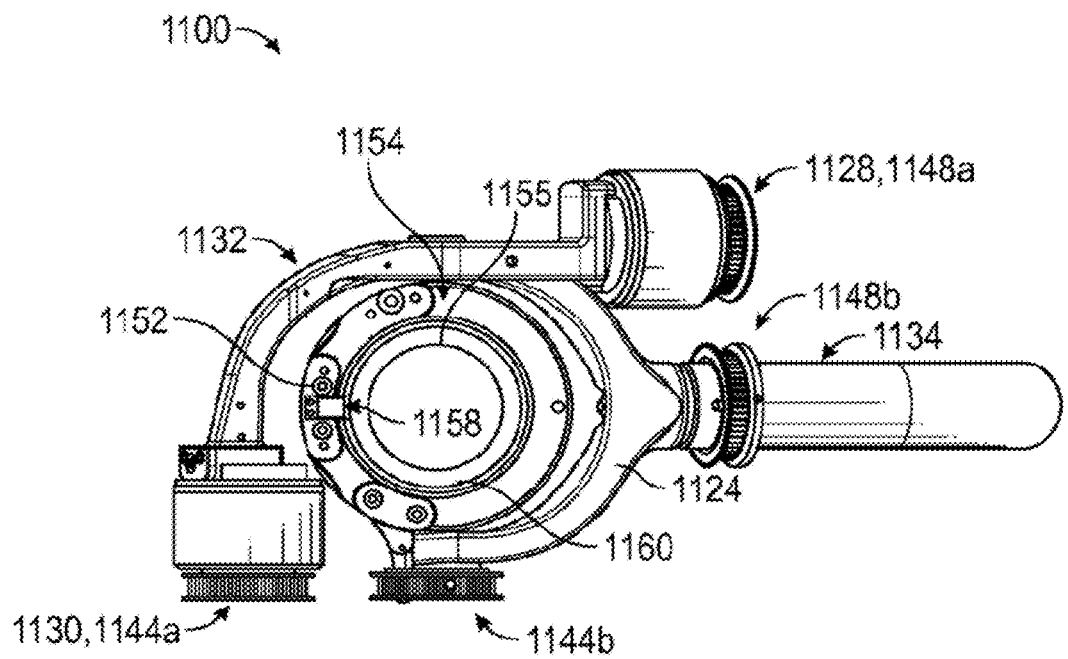
FIG. 49 depicts a top view of a stabilizing apparatus according to an illustrative embodiment.
Figure 50:
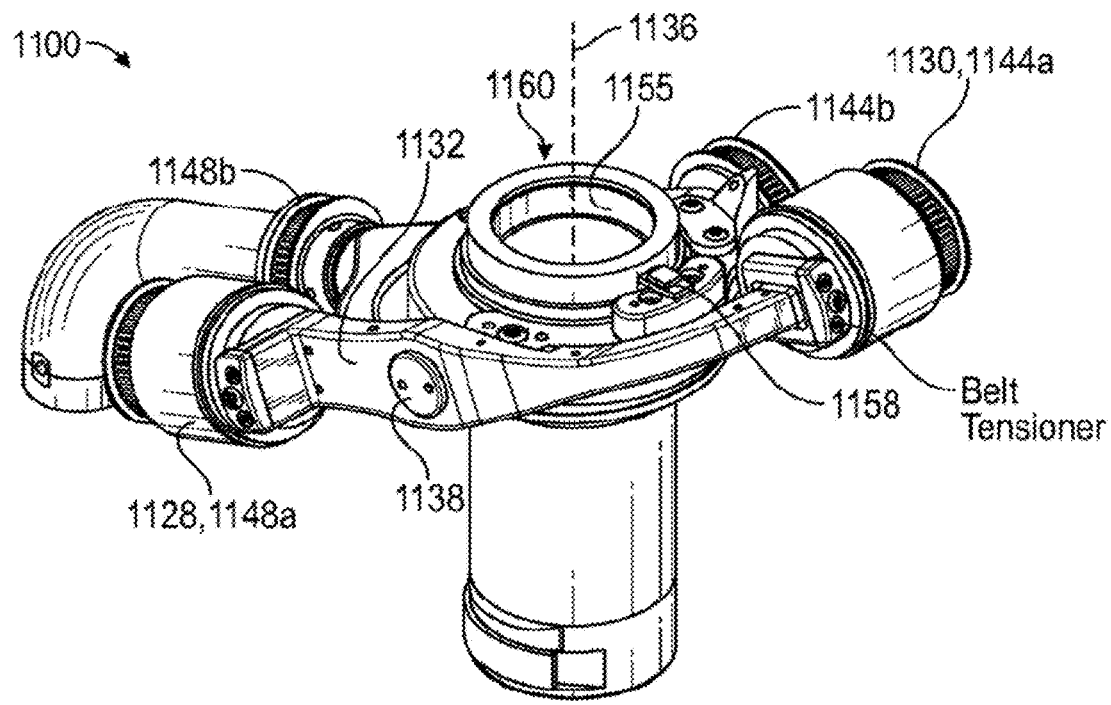
FIG. 50 depicts an iso view of a stabilizing apparatus according to an illustrative embodiment.
Figure 51:
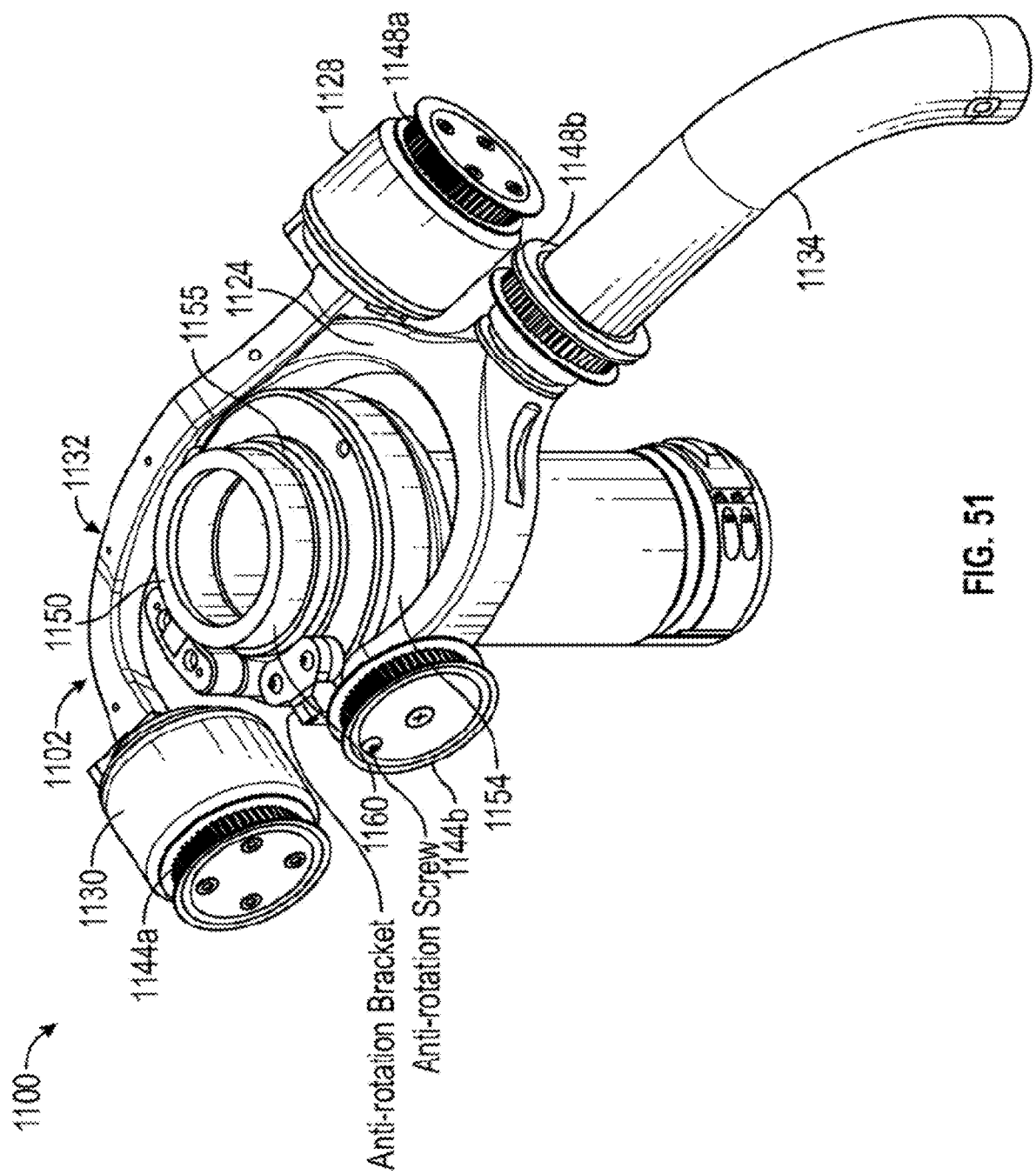
FIG. 51 depicts a further iso view of a stabilizing apparatus according to an illustrative embodiment.
Figure 52:
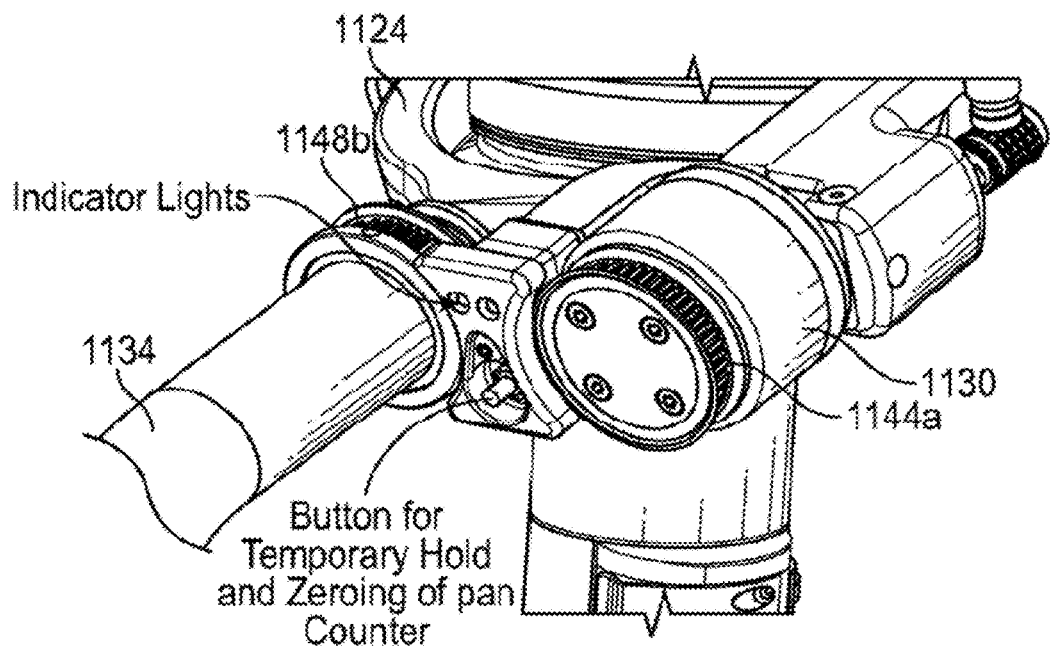
FIG. 52 depicts a portion of a stabilizing apparatus according to an illustrative embodiment.

FIGS. 47 and 48 depicts a further illustrative embodiments of an actively stabilized payload apparatus. The apparatuses have a gimbal 978 with a first gimbal axis 980 and a second gimbal axis 982, wherein the first gimbal axis is substantially perpendicular to the second gimbal axis. The gimbal is also rotatable about a pan axis coincident with the longitudinal centerline of pan shaft 988. The pan axis is mutually perpendicular to first gimbal axis 980 and second gimbal axis 982. Gimbal 978 has a yoke 992 pivotably attached to a gimbal pan bearing component 994 for rotation about second gimbal axis 982, wherein yoke 992 is attached to gimbal pan bearing component 988 at a first pivot shaft 996 and a second pivot shaft 998 opposing the first pivot shaft 996.

FIG. 47 depicts an illustrative embodiment with co-axial or omni torque-generators having direct drive motors to produce angular motion about first gimbal axis 980 and second gimbal axis 982. A first torque generator in the form of a motor 984 is disposed at yoke stem 1000 and produces rotational motion about first gimbal axis 980. Second torque generators in the form of motors 986a,b produce rotational motion about second gimbal axis 982. In this embodiment, one of each motors 986a,b is disposed on either side of pan shaft 988 at the connection of yoke 902 to gimbal pan bearing component 994.

FIG. 48 depicts an illustrative embodiment with co-axial or omni torque-generators comprising a first gear 1006 in the form of a sector or arc gear, driven by a functionally connected drive gear rotated by motor 986c to produce angular motion about second axis 982. A second arc or circular gear 1008 is functionally connected to a drive gear rotated by motor 984 to produce rotation about first gimbal axis 980. A pan axis counter 990 may be used to track the angular position of gimbal yoke 992, even as the operator moves his body, and thus yoke 992, around the rig, from side to front to back, while obtaining his or her shots. Pan axis counter 990 provides angle θ, which is input to a processing device containing computer code to carry out an algorithm, such as will be described further below. Pan axis counter 990 tracks the ratio between the sum of the gimbal torques and the and angular directionality as their relationships vary with respect to the first gimbal axis or second gimbal axis of the actual sled, which may be 'roll' and 'tilt' axes, for example.

Engagement of motors 984 and 986a, b, c to adjust the apparatus about first gimbal axis 980 and second gimbal axis 982 can be by means other than the gears depicted, provided they are compatible with the support apparatus structure and use.

FIG. 47 further depicts an arm post socket 1004 attached to or integral with stem 1000 and configured for attachment to a counterbalancing arm, such as for example an equipoising arm. The counterbalancing arm may include a parallelogram link with a resilient member to counter the weight of the support apparatus and a payload support thereby.

In an exemplary embodiment, one or more torque generators on the apparatuses are brushless motors.

Various embodiments of an actively stabilizing payload supports have been described that can containing sensors. The associated sensors can be located in various positions depending, at least in part, on the configuration of the payload support and the methods and algorithms used. In an exemplary embodiment, an angular sensing unit (IMU) is co-located with the camera or other payload, with the IMU roll, tilt, pan angular sensing means co-axial with and responsive to the camera's roll, tilt, pan axes of rotation, respectively.

In a further illustrative embodiment the IMU is attached to the gimbal's outer pan bearing support with a first angular sensing means responsive to the trunnion axis angle, a second angular sensing means responsive to an axis substantially perpendicular to both the trunnion axis and pan post axis, said means substantially responsive to the yoke axis angle, and a third angular sensing means responsive about an axis parallel with the pan post. Note though that sensors need not be in a single unit but can be separate sensors disposed at different locations from one another.

A rotation measuring device 990 is functionally installed in the payload support apparatus to measure an angle $\theta$ of rotation of the pan shaft. One or more processing devices are configured to receive angle $\theta$. One or more non-transitory storage devices on which is stored executable computer code are operatively coupled to the one or more processing devices and execute computer to carry out the method comprising:

receiving angle $\theta$ from the rotation measuring device;
calculating cosine $\theta$ and sine $\theta$;
receiving a selected supplemental roll torque;
receiving a selected supplemental tilt torque;
adding the product of the supplemental payload tilt torque and cosine $\theta$ to the product of the supplemental payload tilt torque and sine $\theta$ to obtain a second gimbal axis torque;
subtracting the product of the supplemental payload first torque and sine $\theta$ to the product of the supplemental payload first torque and cosine $\theta$ to obtain a first gimbal axis torque;
causing the second torque generator to generate the second gimbal axis torque; and
causing the first torque generator to generate the first gimbal axis torque.

In an illustrative embodiment, angle $\theta$ equals zero when first gimbal axis 980 aligns with a payload roll axis and second gimbal axis 982 aligns with a payload tilt axis. The zero reference though can be calibrated to be referenced to other suitable configurations of the gimbal axes.

The illustrative embodiments of the support and orienting apparatus and methods disclosed may include some or all of the following features:

a) supplemental counter torques applied to the payload through a gimbal while remaining responsive to direct operator contact to guide and orient a supported balanced expanded payload;

b) direct operator control of an actively stabilized three axis platform wherein a three axis apparatus is not touched directly by an operator during actual use, and is remotely steered electronically by an operator employing a remote control interface, such as a joystick or the like;

c) increase in the moment of inertia of the supported expanded payload without adding weight, spinning flywheels, or increasing the size, the inertia increased by providing supplemental counter torques to the expanded payload through the gimbal, the torques being proportional to and in opposition to external torques intentionally applied by the operator or through disturbances;

d) a dynamic friction referenced to a stationary inertial frame producing a resistive feedback torque which increases with angular rate and is felt by the operator as the operator applies torque to rotate the orientation of the expanded payload. The dynamic friction as desired damps excessive operator torque impulses and external disturbances such as wind friction;

e) a static frictional torque feedback, referenced to a stationary inertial frame, such that when a particular pan and tilt orientation is achieved by direct operator control and the device is stationary, it will tend to maintain that orientation once the operator has released control of the operator control surface attached to the payload and even when slightly unbalanced or disturbed by an external force;

f) feedback torques through the gimbal to the expanded balanced payload, the torques directed to align the payload's axis of tilt to be substantially parallel to the local horizon, or equivalently, perpendicular to a measure of the direction of gravity, even as the operator continues to apply pan and tilt torques to orient the payload; and g) application of the supplemental torques described above such that the stabilizer operates relatively unobtrusively.

The invention includes a method of stabilizing a balanced component assembly such as those described herein, having a plurality of torque generators. In an illustrative embodiment of the invention, the method includes the following steps:

a) using an angular motion sensing unit measuring and providing angular rates and orientation motions of the balanced component assembly about three substantially mutually orthogonal axes, wherein such angular rates and orientation motions include that which is produced by operator input and external disturbances;

b) providing a physical model comprising desired angular rates and orientation motions for the three substantially mutually orthogonal axes;

c) comparing using a signal processor the measured angular rates and orientation motions to the modeled angular rates and orientation motions, respectively, for each of the three substantially mutually orthogonal exes, to create a comparison for each of the substantially mutually orthogonal axes;

d) generating a supplemental torque signal for each of the substantially mutually orthogonal axes based on the respective comparisons;

e) applying each of the supplemental torque signals to a respective torque generator;

f) repeating step (a) through (e) to form a feedback loop.

The three mutually orthogonal axes may correspond to pan, tilt and roll, for example. Separate algorithms may be used for each of the substantially mutually orthogonal axes to create a comparison of the measured angular rates and orientation motions to the modeled angular rates and orientation motions. The supplemental torque signal may increases the angular inertia of the balanced component assembly.

Static torque and frictional torque referenced to a fixed inertial frame may be added to the modeled tilt torque and modeled pan torque of the physical model. The moment of inertia and coefficient of dynamic braking friction may be automatically reduced over time as a function of increasing measured angular rate about each substantially mutually orthogonal axis.

The method may include providing a threshold torque below a supplemental torque limit and reducing the supplemental torque when the external torque reaches the threshold torque, thereby signaling an operator to reduce operator torque input. When the external torque departs from the threshold torque, supplemental torque is re-applied.

The invention includes: a gyro-stabilizing Steadicam-type gimbal replacement assembly comprising:
  level and tilt sensing means located remotely on the 'sled stage';
  pan-angle sensing means (as detected between inner and outer races of gimbal pan bearing) located on the gimbal assembly;
  means for motorizing the gimbal trunnion assemblies to influence the gimbal yoke to center post angle;
  means for coaxially motorizing the gimbal yoke bearing shaft assembly to influence the angular relationship between an arm post and the gimbal yoke shaft; and
  computational means (located on either the stage or the gimbal) to integrate the essentially perpendicular influences of trunnion and yoke motors according to the momentary gimbal angle in order to cause the Steadicam 'sled' to seek level and simultaneously preserve the selected tilt angle in spite of the operator's changing position—on either side or behind—his or her equipment.

Illustrative embodiments of the invention include an apparatus for stabilizing a payload comprising a rig having an omni-axial torque generator comprising a roll torque generator, a tilt torque generator and a pan torque generator; a feedback controller; the omni-axial torque generator driven by a supplemental torque output signal generated by the feedback controller; an angular motion sensing unit capable of measuring angular rates and orientation motions produced by the omni-torque generator wherein the angular rates and orientation motions include that which is produced by operator-input and external disturbances; the feedback controller having a signal processor functionally connected to the angular motion sensing unit to receive as an input the measured rates and measured orientations. The signal processor includes an artificial horizon algorithm, a roll axis algorithm, a tilt axis algorithm and a pan axis algorithm. The signal processor, by the respective algorithms, is capable of processing the measured angular rates and orientation motions to produce the supplemental torque signals to be applied to each of the pan, tilt and roll axis, which when applied modify the angular rates and angular positions to conform to a physical model.

The electronic structure and related mechanical structure can include any of the handles and related mechanisms to impart roll, tilt and pan to the payload supported by the apparatus.

The apparatus may have an operator-control surface for controlling motion about the pan axis and the tilt axis, wherein motion about the roll axis is controlled by the feedback controller only.

The stabilization techniques, methods and theories of embodiments of the camera stabilization system can be applied to larger stabilization sleds, but there are some differences.

Conventional "sleds," such as those marketed under the name STEADICAM® sold by The Tiffen Company, rely on the relatively large masses of the camera, monitor, and batteries to generate inertia for angular stabilization of the image. These sleds also use these masses to balance the sled to hang upright from a very low friction three-axis gimbal. In order for the sled of these larger systems to hang upright, its center of gravity must be below the supporting three-axis gimbal. With a typical sled, when it is so balanced and is moved, the sled behaves like a long pendulum and the image goes off level unless the operator intervenes. One of the basic skills of camera stabilization system operating is to anticipate this pendular action and prevent it from happening. The more the center of gravity is situated below the supporting gimbal, the stronger the pendular effect and the more work an operator has to do to prevent it.

If the operator balances the sled with the center of gravity close to the supporting gimbal, the pendular effect and consequent prevention efforts, are reduced, but with a loss of tactile feedback for what is level, which can be a challenge to the operator. The operator must concentrate more and more on keeping the frame level without any tactile feedback, whether or not the camera stabilization system is moving in space.

What is desired is a neutrally balanced, naturally inert sled that artificially creates vertical positioning and operator feedback. The sled will create the feeling of a classically balanced camera stabilization sled, but can be balanced and operated with reduced negative pendular consequences nor the loss of horizon, freeing the operator to concentrate more on artful framing.

As noted above, appropriate assistive torques may be applied to at least two gimbal/yoke axes. This includes application of supplemental payload torques to the pan and roll axes by activation of pan and roll motors.

Figure 60:
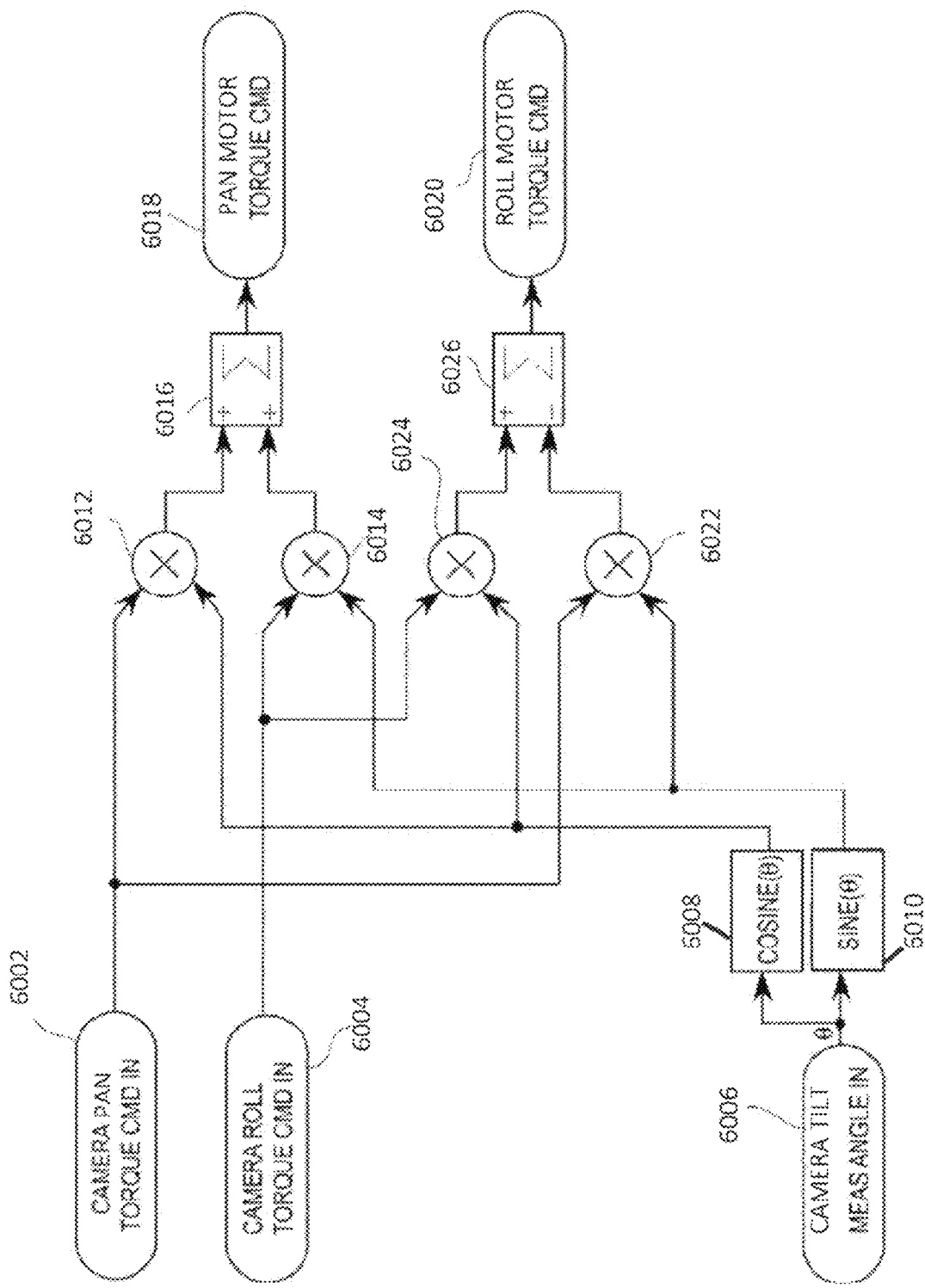
FIG. 60 is a diagram representing the calculation of actual torques to be generated by the roll and pan motors.

Turning to FIG. 60, calculation of the actual torques to be generated by the roll and pan motors will be described. Block 6002 indicates the supplemental payload pan torque value "Y" and block 6004 indicates the supplemental payload roll value "X". Block 6006 provides the tilt angle $\theta$. Steps 6008 and 6010 show cosine $\theta$ and sine $\theta$, respectively. The payload pan torque value "Y" is multiplied by cos $\theta$ in step 6012. In step 6014, the payload roll torque value "X" is multiplied by sin $\theta$. The results generated in steps 6012 and 6014 are summed in step 6016 to obtain the actual torque Y' to be generated by the gimbal pan motor as provided in block 6018.

The actual torque to be generated by the gimbal roll motor is depicted by block 6020 and obtained by the following steps: The supplemental payload pan torque "Y" from block 6002 is multiplied by sin $\theta$ in step 6022. The supplemental payload roll torque "X" is multiplied by cos $\theta$ in step 6024. In step 6026, the result from step 6022 is subtracted from the result generated in step 6024 to obtain the actual torque "X" in block 6020.

If you plug in 0, 90. degree., 180. degree., 270. degree. for $\theta$ into the above equations you will get the mix factors shown in FIGS. 9A, 9C, 9E and 9G, respectively. FIG. 9A depicts the mix factor values when the gimbal roll and pan axes are aligned with the payload roll and pan axes, +100% for the roll axis and zero for the pan axis. $\theta=0$ in this configuration so no adjustment is needed. FIG. 9C depicts a configuration where $\theta=90$. degree., which corresponds to factors of zero for the roll axis and −100% for the pan axis. FIG. 9E represents the configuration when $\theta=180$. degree., wherein the factors are zero for the pan axis and −100% for the roll axis. At $\theta=270$. degree., the pan factor is +100% and the roll factor is zero as shown in FIG. 9G. Additional increments of 90. degree. from the initial 45. degree. are depicted in FIGS. 9D, 9F and 9H, wherein the mix factors in FIG. 9D (.theta.=135. degree.) are −70.7% for both the roll and pan axes; the mix of factors in FIG. 9F (.theta.=225. degree.) are +70.7% for the pan axis and −70.7% for the roll axis; and the factors for both the pan and roll axes in FIG. 9H (.theta.=315. degree.) are +70.7%. At 45. theta. you obtain +70.7% for the roll axis, and −70.7% for the pan axis, as represented in FIG. 9.

Since gimbal torques are applied 90.degree. apart they are not additive but instead obey a vector addition equation:

$$T_{total} = \sqrt{T_{roll}^2 + T_{tilt}^2}$$

wherein:

$$1 = \sqrt{0.707^2 + 0.707^2}$$

Utilizing the various calculations and apparatus described with respect to FIGS. 9A-H, the pan axis can be preset for a desired friction and inertia goals just as the roll axis is automatically preset to seek level.

It is noted that, advantageously, FIG. 60 and FIG. 8 math and the supporting algorithms may produce a virtual set of axes for the operator. The simulated behavior enhancements are applied about these axes; for example, strong roll level seeking, tilt headroom holding friction, virtual bottom heavy, pan inertia and friction, any desired combination. The virtual axes are: pan, roll, tilt, all preferably aligned to earth: pan axis is vertical and tilt and roll axes are horizontal, all preferably perpendicular to each other. The result is that the rig may be manipulated in any way desired. Yet the enhancements always refer back to familiar earth platform of the virtual axes. The beneficial result is the behavior of the rig may remain benign, controllable, sensible for operator and captured motion may be naturally grounded for viewer.

When employing the system and method of FIG. 60. use of a pan torque generator, the 'rotated' roll torque motor command 6020 may advantageously replace signal 504 input of FIG. 8. That is when features of FIG. 60 employed: responsive to desired camera roll and pan torques, and influenced by a measured camera tilt angle: the desired 'rotated' torques 6018, 6020, respectively, are assigned to a camera pan axis and camera roll axis based on the measured tilt angle.

So operating in a cascade fashion: when the system and method of FIG. 60 are employed, input 504 of FIG. 8 rather than being a desired torque based on direct measure of camera roll angle, desired torque is the 'rotated' roll motor torque cmd. signal 6020 of FIG. 60. The features of the method and system of FIG. 8 continue produce yoke and trunnion torques which in combination produce desired camera roll and tilt torques to beneficially align camera roll and tilt axes to desired angles as previously claimed.

FIGS. 49-54 depict illustrative embodiments of the disclosed camera stabilization system, which include a number of sensors and motors that attach to a camera stabilization sled 1100 having a three-axis gimbal 1102. FIGS. 55-59 depict an electronic control unit to implement the system processes according to illustrative embodiments. In an illustrative embodiment the sensors include three angular rate sensors 1104, 1106, 1108, three accelerometers 1110, 1112, 1114, and a pan counter 1116.

The sensors may be in an enclosure 1120 aligned or fixed to a camera 1122 on top of sled 1100. Flexible wiring may connect the sensors to a gimbal yoke 1124 of gimbal 1102. Two main motors 1128, 1130, gimbal yoke axis motor and trunnion motor, respectively, are attached to a support arm 1132 locked to gimbal yoke 1124, and are oriented at 90 degrees from one another. A third motor 1118 can also be employed that may double as a pan counter. Third motor 1118, if employed, acts parallel to the "pan" axis 1136 and provides additional "leveling" torque when the stabilization sled 1100 is tilted up or down. Via adjustable belts and pulleys, motor 1128 acts to drive gimbal 1102 rotationally around a plane at 90 degrees to a support handle 1134. Motor 1130 acts on the axis of the trunnions.

Pan counter 1116 is used because camera 1122 and sensors 1110, 1112, 1114 that determine level are not fixed relative to gimbal support handle 1134, so neither of motors 1128, 1130 is necessarily aligned to camera roll (level) or to camera tilt. Pan counter 1116 keeps track of the pan rotation about pan axis 1136, or orientation, between camera 1122 and motors 1128, 1130, so the appropriate corrections to both motors will keep sled 1100 level with respect to camera 1122 or at the desired angle.

In an exemplary embodiment, components of camera stabilization system 1100 are readily removable or attached to a standard, and possibly unmodified, gimbal 1102. Support arm 1132 for motors 1128, 1130 is attached to gimbal yoke 1124 via a single cap 1138 that screws into one of two trunnions 1140, 1142. Gimbal trunnion driven pulley 1144b attaches via a screw to the opposite trunnion. The gimbal yoke axis driven pulley 1148b attaches via set screws to gimbal support handle 1134. A magnetic sensor 1158 for pan counter 1116 is attached via a bracket 1152 and screws to the outer race 1154 of the pan bearing 1156.

The system may be configured to be small enough to remain attached to gimbal 1102 for "normal" operating and also for storage in a standard case.

Gimbal trunnion pulley 1144 connects to the gimbal's outer pan bearing race 1154. A screw connecting to bracket 1152 on outer pan bearing race 1154 prevents gimbal trunnion pulley 1144 from turning relative to outer pan bearing race 1154.

Pan counter 1116 comprises a pan counter sensor 1158 attached to outer pan bearing race 1154, and a reference ring 1160 attached to an inner race 1155 of pan bearing 1156, which is locked to the camera orientation. The pan counter sensor 1158 and reference ring 1160 shown are magnetic, but the pan counter system could be optical, electrostatic, or mechanical. Typically, in a two-motor configuration a system other than a mechanical system is preferred due to additional friction, but use of a mechanical system cannot be ruled out.

A mechanical connection (either a spur gear train or a belt and pulley system) may be used if pan counter sensor 1158 is part of a system using third motor 1118 situated to drive sled 1100 around pan axis 1136. Third motor 1118 may be desired when sled 1100 is tilted up or down more than 25 degrees from horizontal or so. See for example FIGS. 53 and 54. The more camera 1122 is tilted, keeping it level to the horizon becomes more and more a function of pan bearing 1156. Having a motor acting on pan axis 1136 may be more efficient than driving motors 1128, 1130. If camera 1122 is pointed directly up or down, pan axis 1136 will generally be 100%, or near 100%, oriented to camera level.

Figure 53:
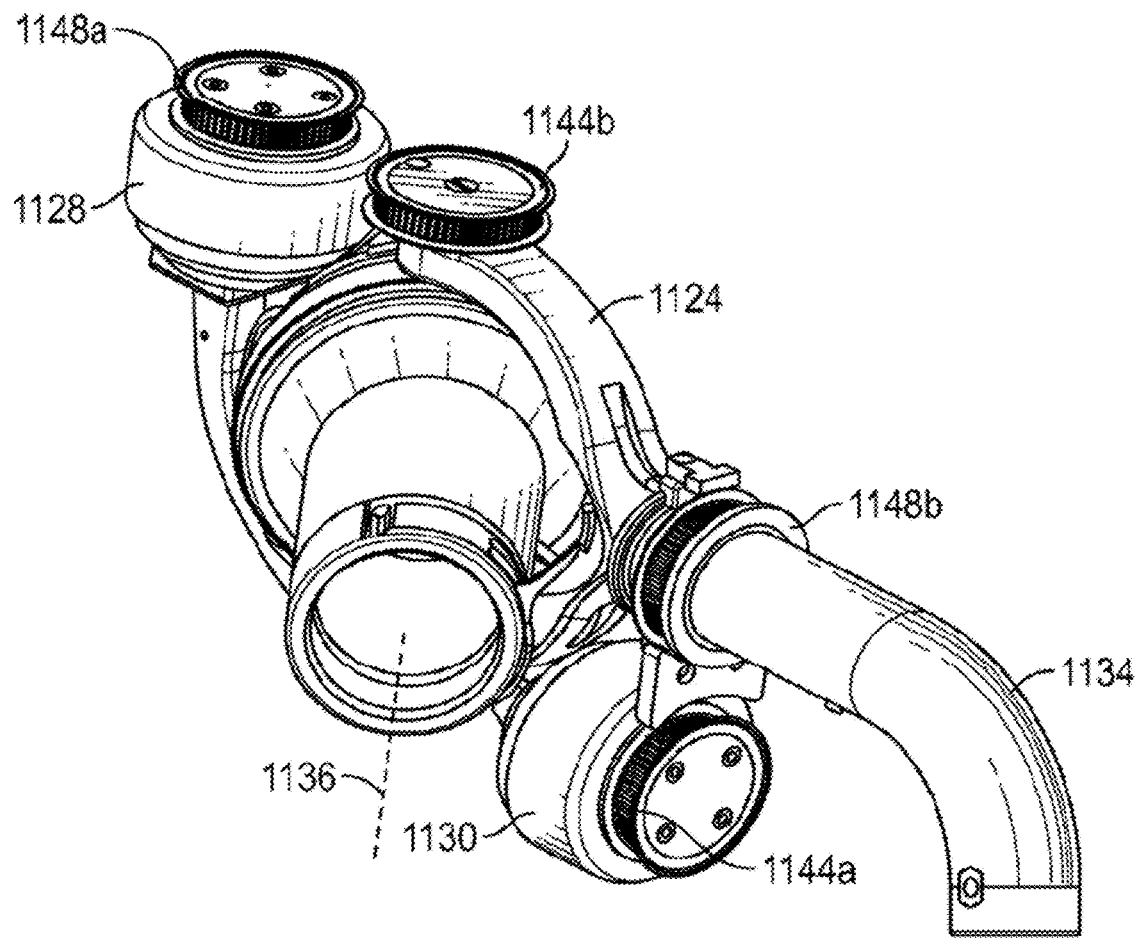
FIG. 53 depicts a stabilizing apparatus in a radical tilt position according to an illustrative embodiment.
Figure 54:
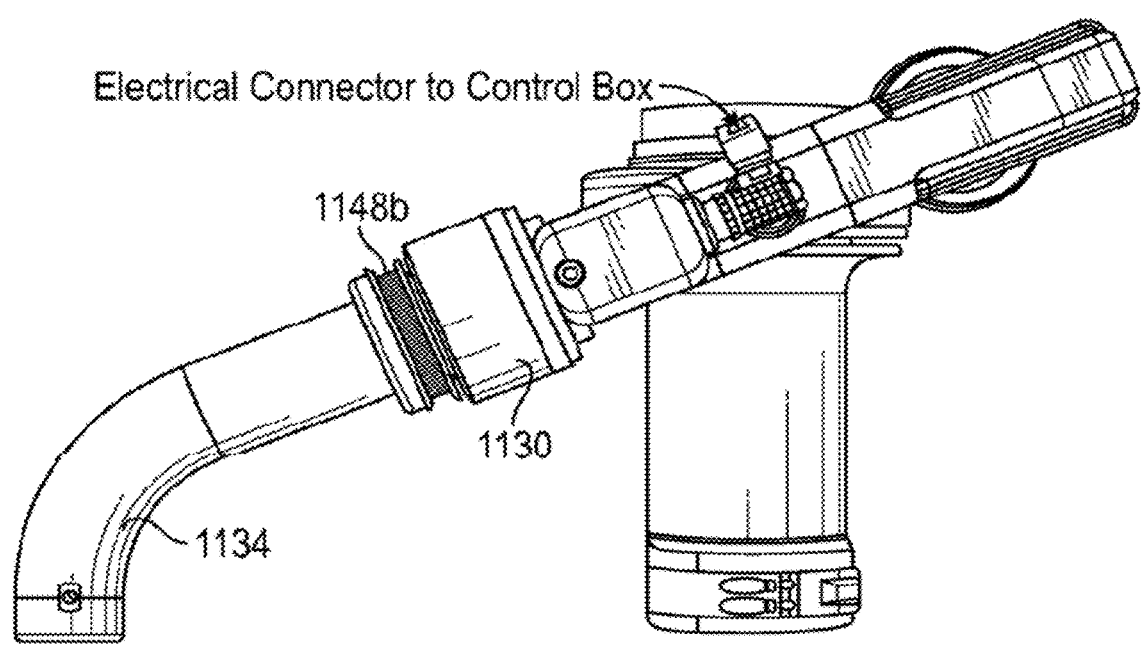
FIG. 54 depicts a stabilizing apparatus according to an illustrative embodiment.

Typically, when camera 1122 is pointed radically up or down, for example, as shown in FIG. 53, locking camera 1122 to the horizon becomes less and less important. In a two motor configuration as shown, methods carried out by electronic control unit 1162 and the associated sensors, may be implemented to reduce and eventually cut off the effect of motors 1128, 1130 as sled 1100 is increasingly tilted.

The operator can, if desired, force sled 1100 off level. If wildly off-level shots are desired, the operator can temporarily disable the system causing sled 1100 to behave more like a conventional sled.

Figure 55:
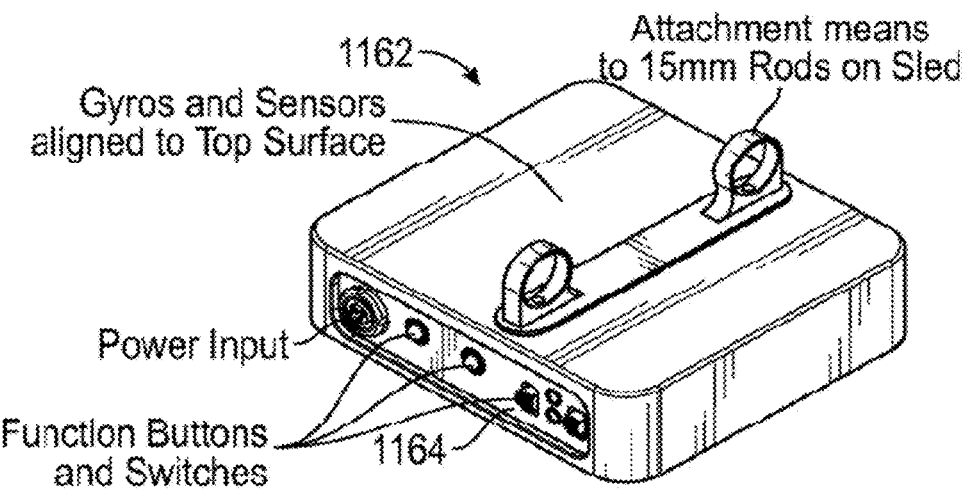
FIG. 55 depicts an electronic control unit of a payload stabilizing system according to an illustrative embodiment.
Figure 58:
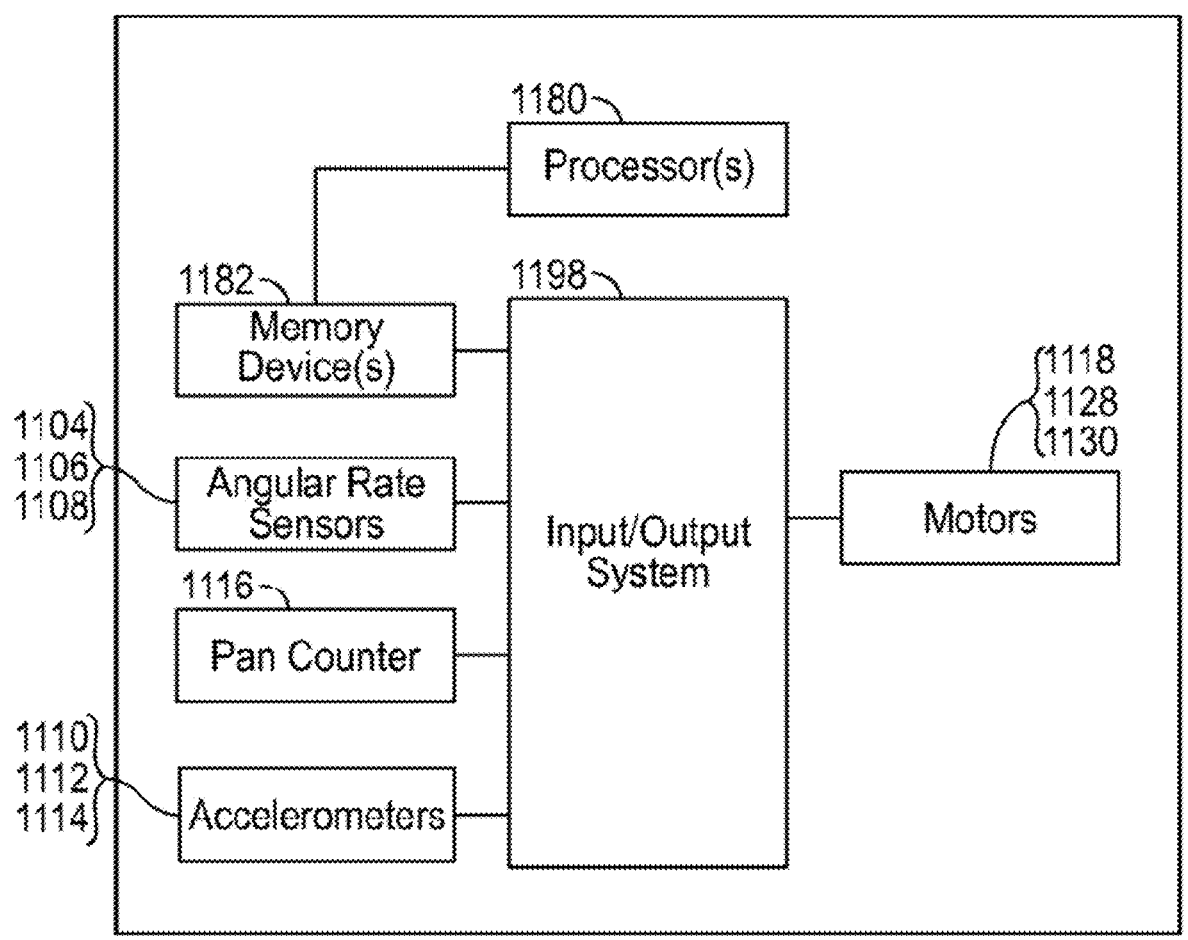
FIG. 58 depicts a schematic of components of a payload stabilizing system according to an illustrative embodiment

FIG. 55 depicts an illustrative electronic control unit (ECU) 1162 that houses the electronics to control camera stabilization system 1100. Referring to FIG. 58, ECU 1162 houses one or more processors 1180 operatively coupled to one or more non-transitory storage devices 1182 on which is stored executable computer code, which when executed by the one or more processors causes the system to carry out the methods described herein to stabilize the camera and sled apparatus. Computer readable media contain code that can be implemented by the system's processor(S) to carry out the desired steps, and may be, for example, volatile and non-volatile, removable and non-removable media, including but not limited to ROM, PROM, EPROM, EEPROM, RAM, SRAM, DRAM and flash memory.

Sensors 1104, 1106, 1108, 1110, 1112, 1114 1116 are in communication with input/output sub-system or bus 1198. Also in communication with bus 1198 is memory 1182 and processor 1180. Memory 1182 and processor 1180 may include multiple processors and memory devices, but are used herein in the singular for simplicity. Bus 1198 is further functionally connected to motors 1128, 1130 and, optional, third motor 1118.

Figure 56:
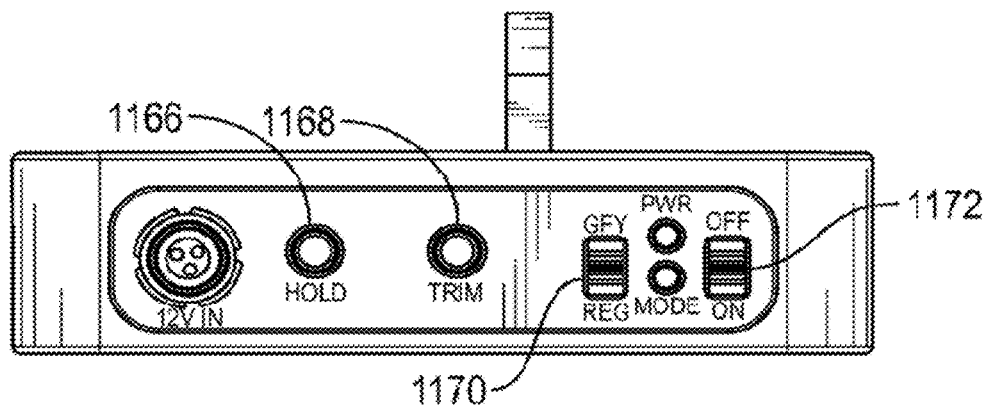
FIG. 56 depicts another view of an electronic control unit of a payload stabilizing system according to an illustrative embodiment.

A user interface, for example, in the form of interface panel 1164, shown in FIGS. 55 and 56, allows a user to temporarily turn off the pan counter and set it to zero by pan counter button 1166. Camera tilt angle button 1168 allows a user to set the camera tilt angle. For a system that allows for either left-handed or right-handed operation, left/right switch 1170 is employed to change between the operations. The system may be turned on and off via power switch 1172. Other user interfaces to provide signals to an input device may be employed that are configured to accept user selections, such as via buttons, switches, touch screens and the like and transmit the signals to or as an input device.

Figure 57:
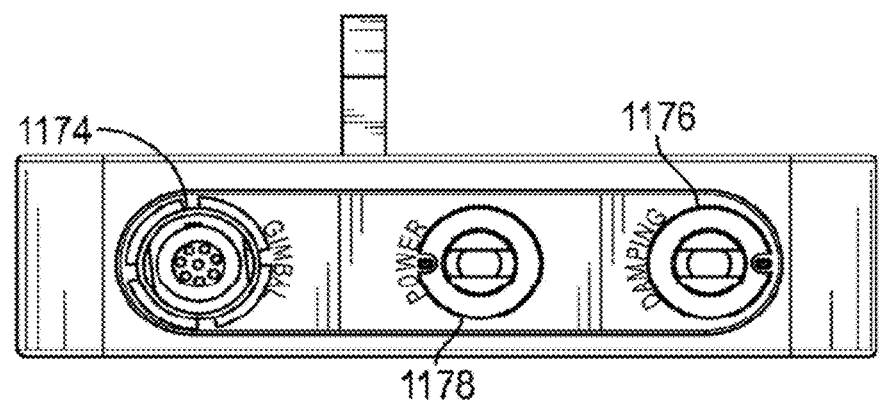
FIG. 57 depicts a further view of an electronic control unit of a payload stabilizing system according to an illustrative embodiment.

FIG. 57 depicts a further view of ECU 1162, which may be, for example, the rear panel. Connector 1174 connects ECU 1162 to motors 1118, 1128, 1130. Responsiveness dial 1176 can be used to set the responsiveness of sensors 1104, 1106, 1108, 1110, 1112, 1114, wherein sensors 1104, 1106, 1108 are angular rate sensors that measure the angular rotation rate of the attached stabilizer plus camera about three substantially mutually orthogonal axes such as roll", "tilt" and "pan" axes of rotation, and sensors 1110, 1112, 1114 are accelerometers to measure the spatial acceleration along three linear and mutually orthogonal axes, such as "up-down", "left-right" and "fore-aft" axes. By force dial 1178 the level of force to motors 1128, 1130 can be set.

Figure 59:
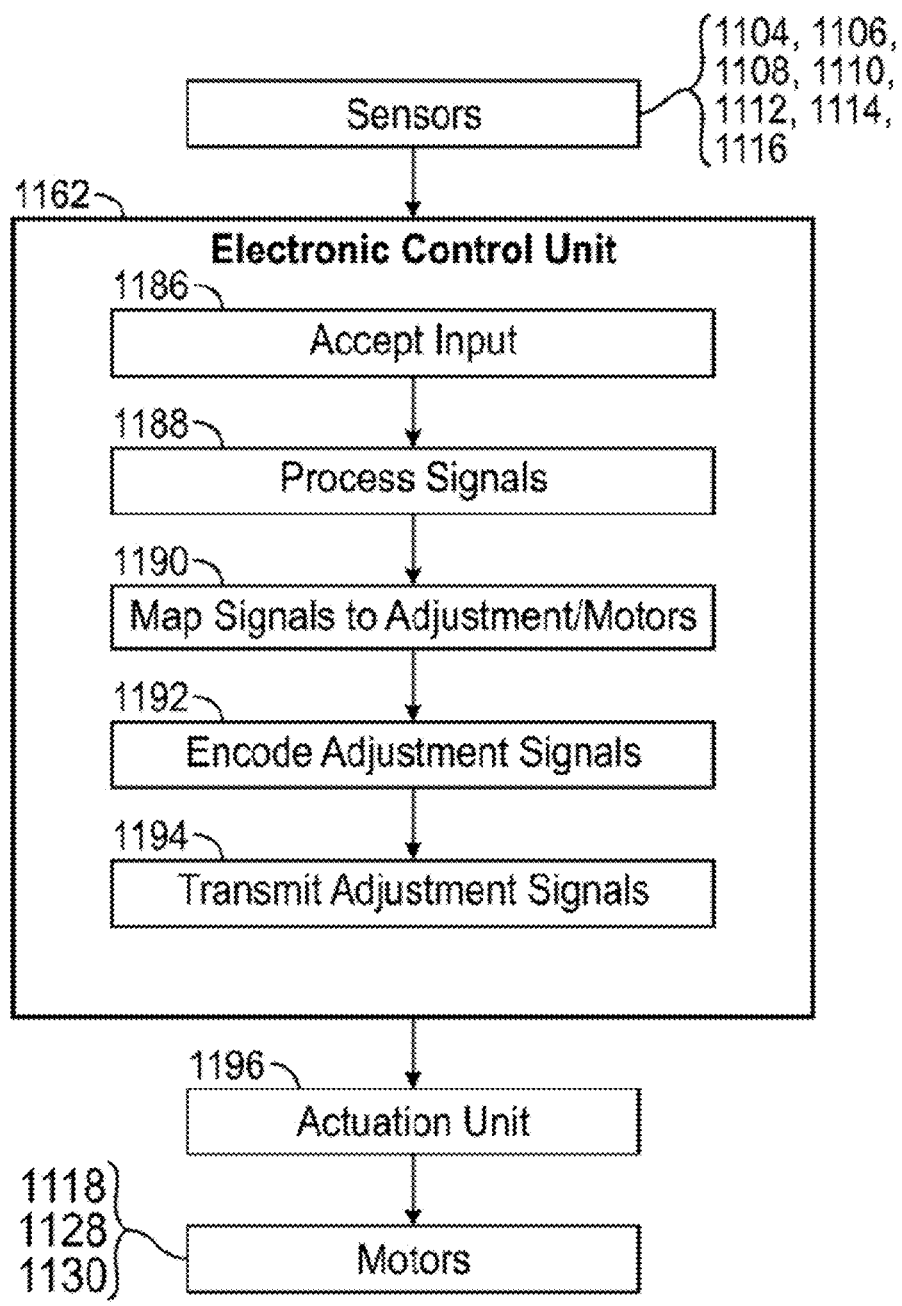
FIG. 59 depicts a further schematic of components of a payload stabilizing system according to an illustrative embodiment.

FIG. 59 is a schematic of a portion of camera stabilization system 1184 in which the camera stabilization methods can be carried out, according to an illustrative embodiment. Sensors 1104, 1106, 1108, 1110, 1112, 1114, 1116 output signals to ECU 1162. ECU 1162 accepts sensor output signals in block 1186. The accepted signals are processed in block 1188. The processed signals are mapped to adjustments in block 1190. The adjusted signals are encoded in block 1192. In block 1192 the encoded adjustment signals are transmitted to an actuation unit 1194. Actuation unit 1194 acts on motors 1128, 1130 and pan counter 1116 of camera stabilization sled 1100.

The components of ECU 1162 can be incorporated into a single device, or may be a plurality of devices that are functionally connected. A person of ordinary skill in the art will appreciate other or additional components that can be included in ECU 1162 to implement the various embodiments of the methods and systems described herein, and therefore, such knowledge is deemed inherently contained in this disclosure.

In the embodiment shown in FIGS. 49-53, motors 1128, 1130 are attached to an armature 1132 locked to gimbal yoke 1124. It is also possible, via different brackets, to attach trunnion motor 1130 to pan bearing outer race 1154 and trunnion pulley 1144b to yoke 1124, and/or yoke axis motor 1128 to gimbal support handle 1134 and the driven pulley to the gimbal yoke.

Figure 61:
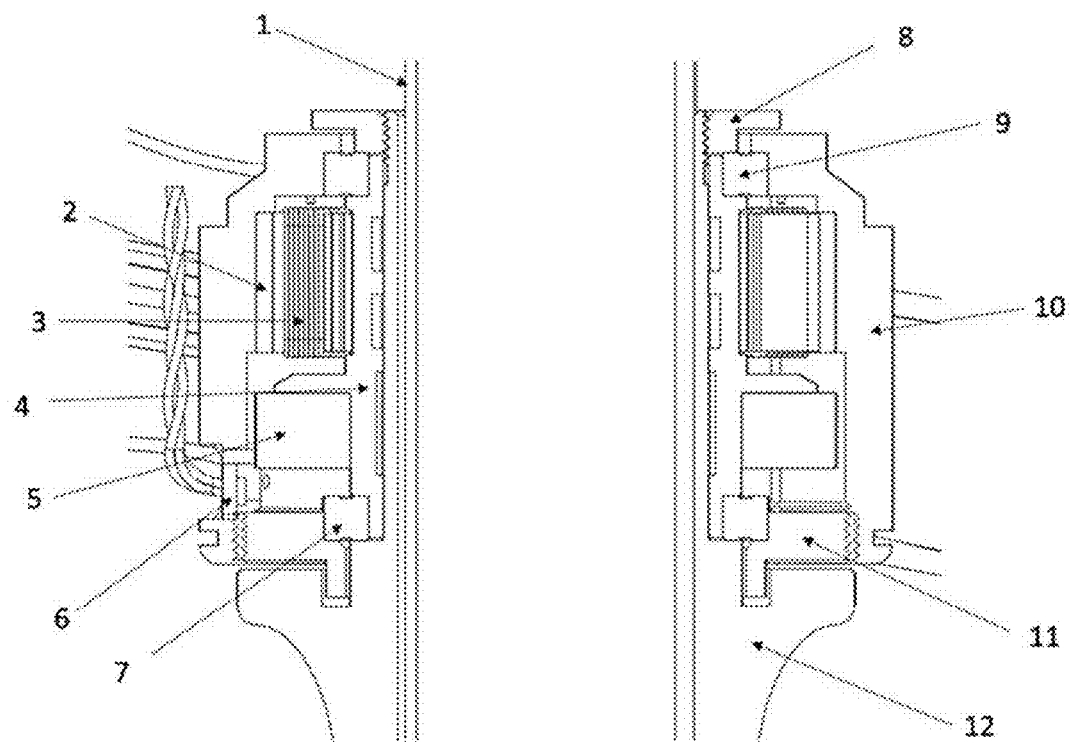
FIG. 61 is a cross-section of a payload stabilization apparatus.
Figure 62:
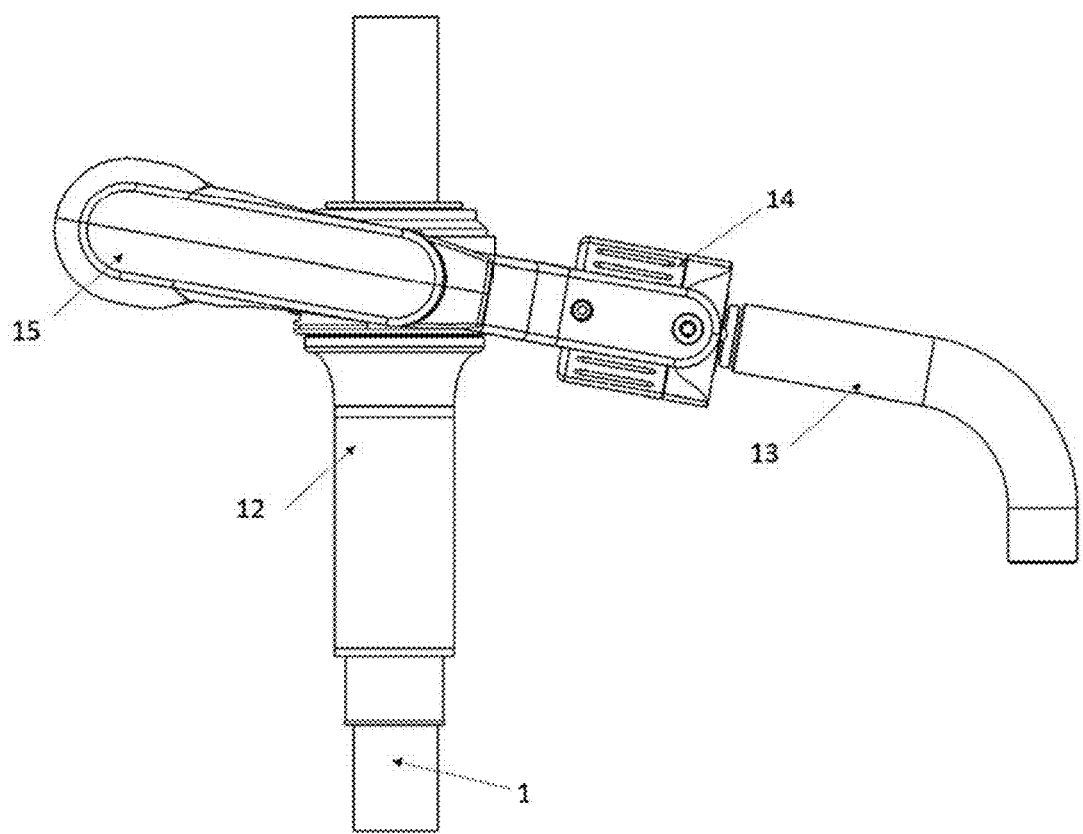
FIG. 62 is a side view of a payload stabilization apparatus.
Figure 63:
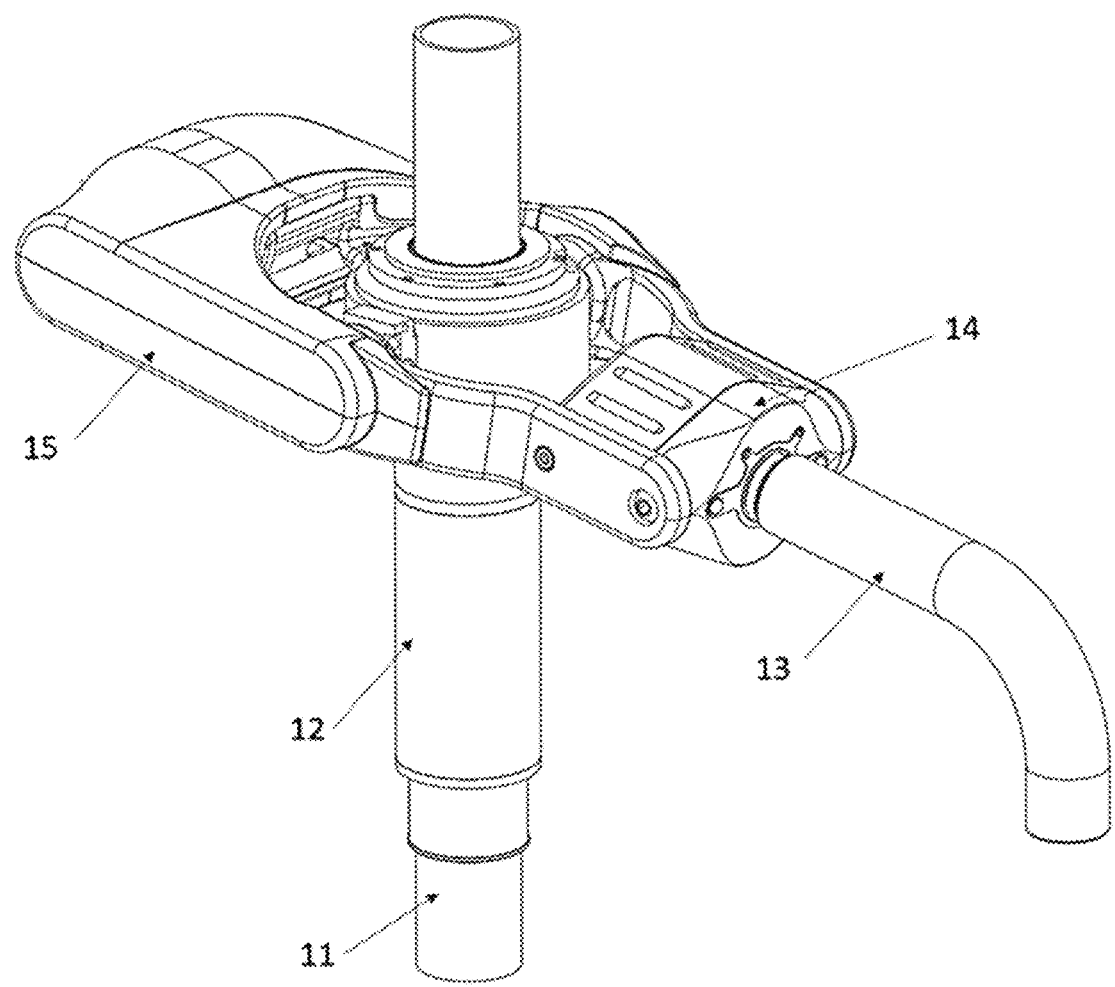
FIG. 63 is a isometric, cross-sectional view of a payload stabilization apparatus.
Figure 64:
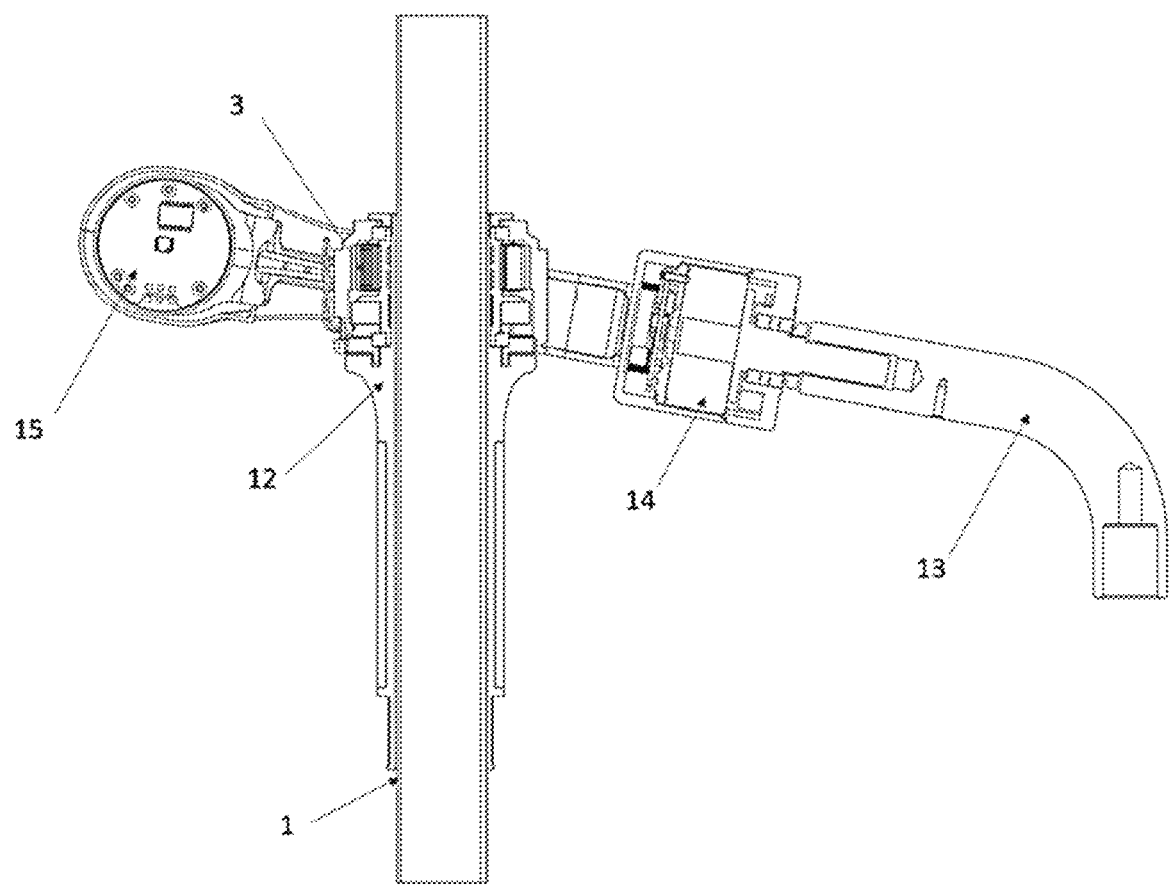
FIG. 64 is a cross-section of a payload stabilization apparatus, including through the roll and tilt motors.
Figure 65:
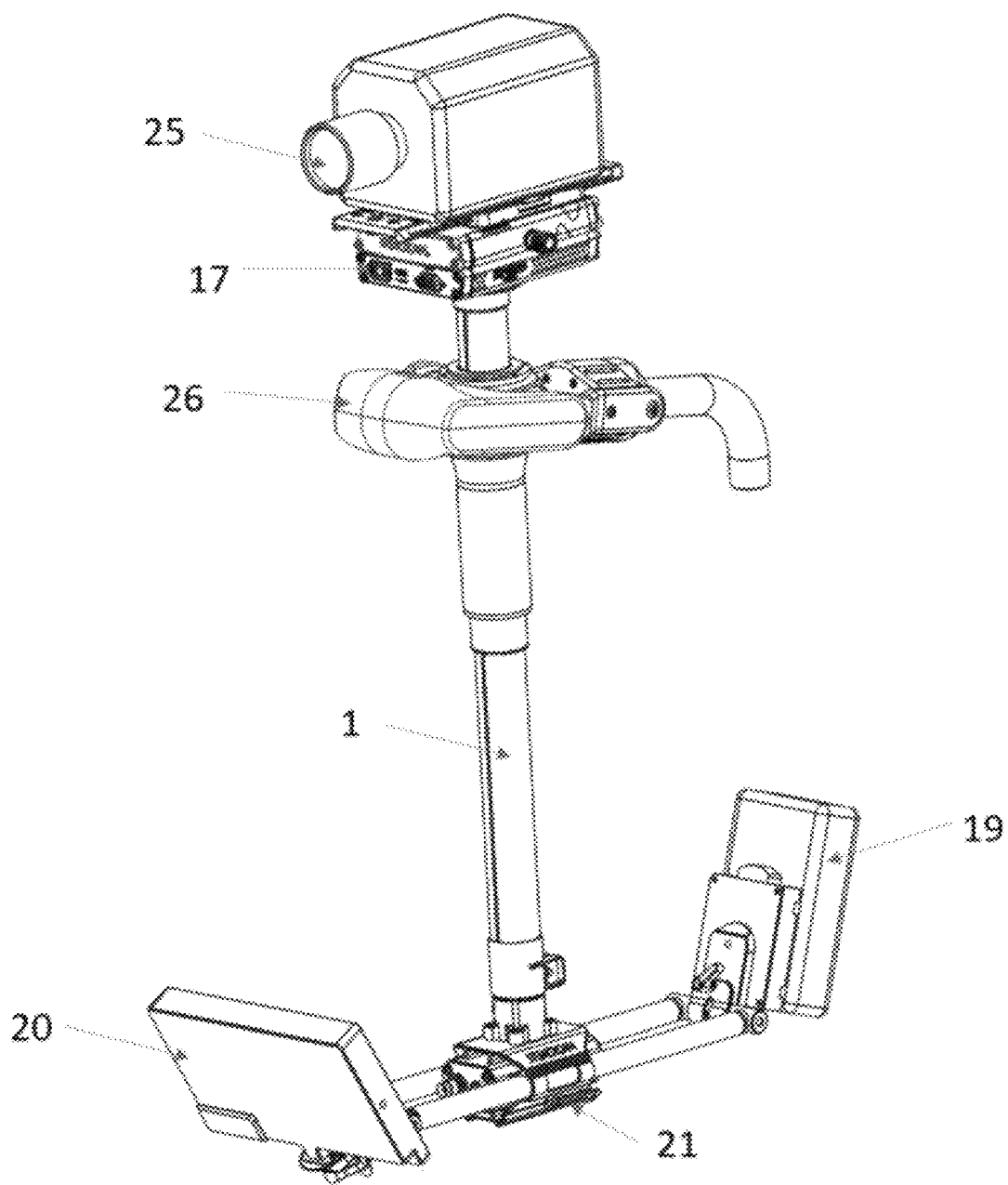
FIG. 65 depicts a payload stabilization apparatus including a gimbal post and sled base.
Figure 66:
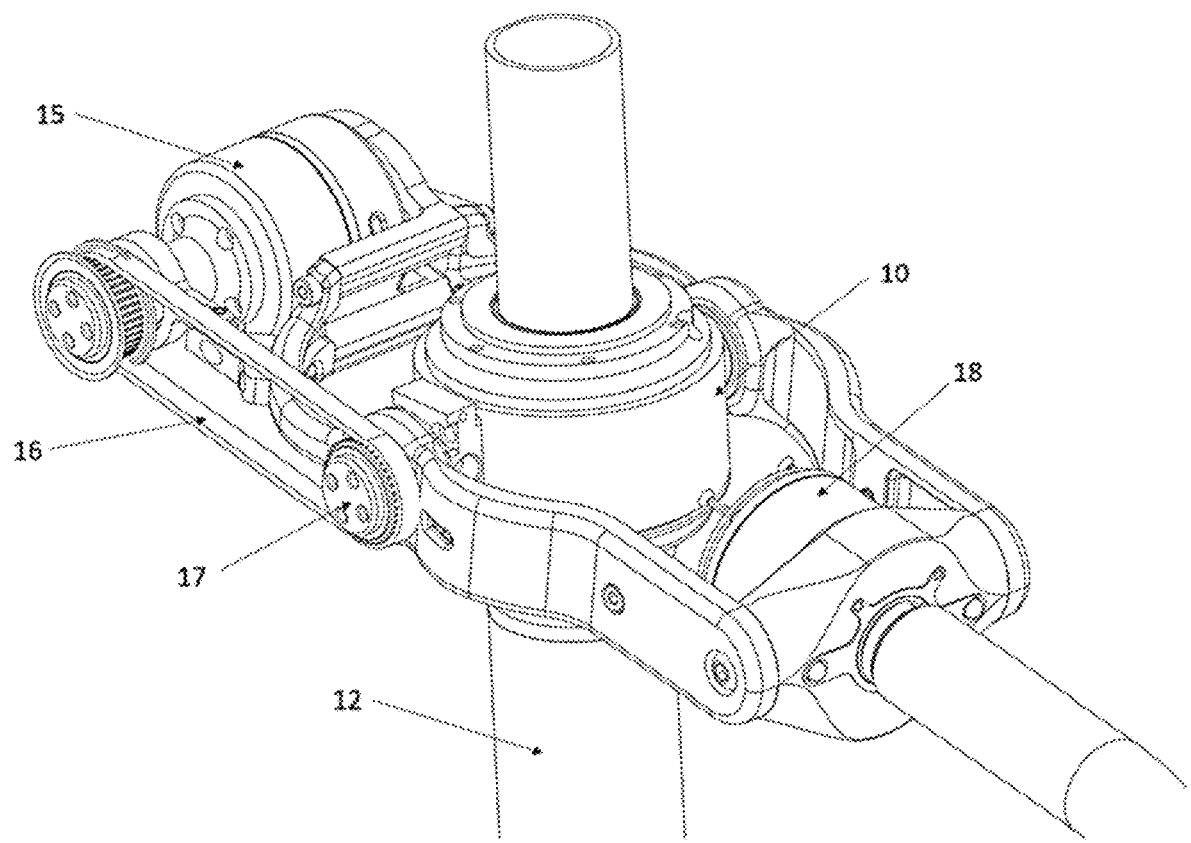
FIG. 66 depicts an isometric view of a payload stabilization apparatus.
Figure 67:
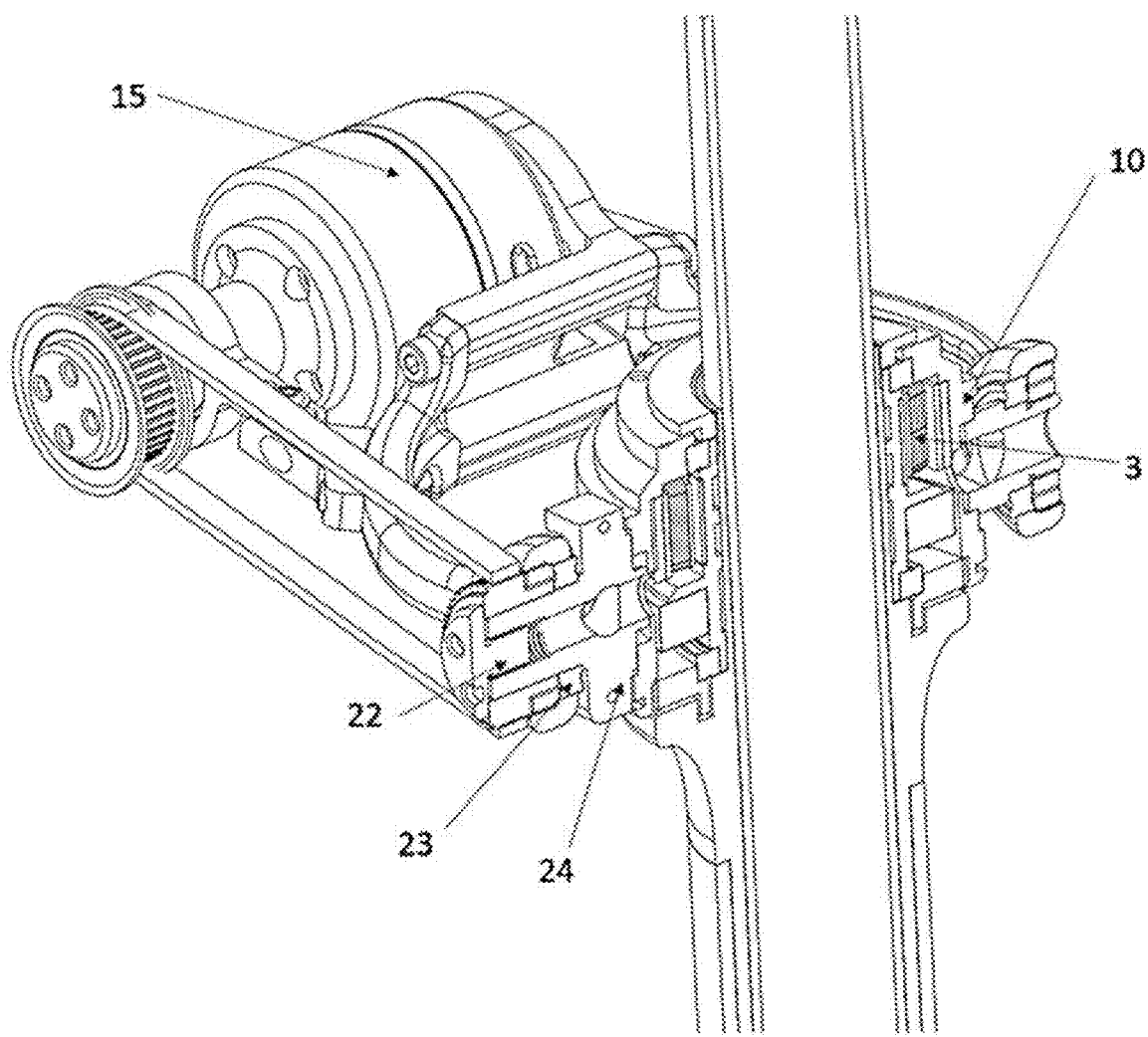
FIG. 67 is an isometric, cross-sectional view through the gimbal of a payload stabilization apparatus.
Figure 68:
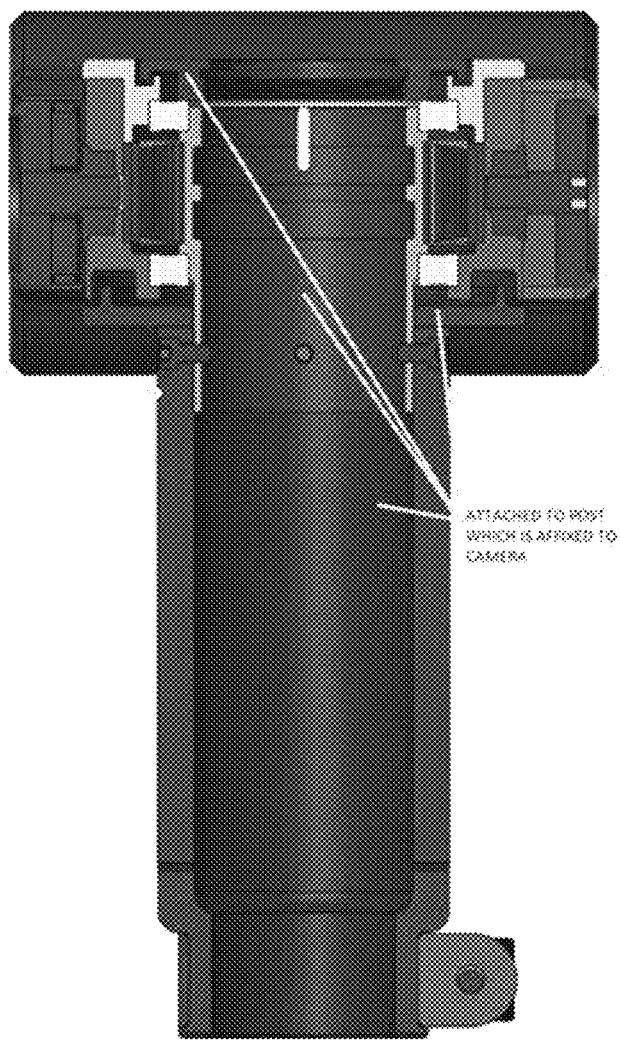
FIG. 68 depicts a payload stabilization apparatus showing how the gimbal portion is attached to a post, which is attached to a payload.
Figure 69:
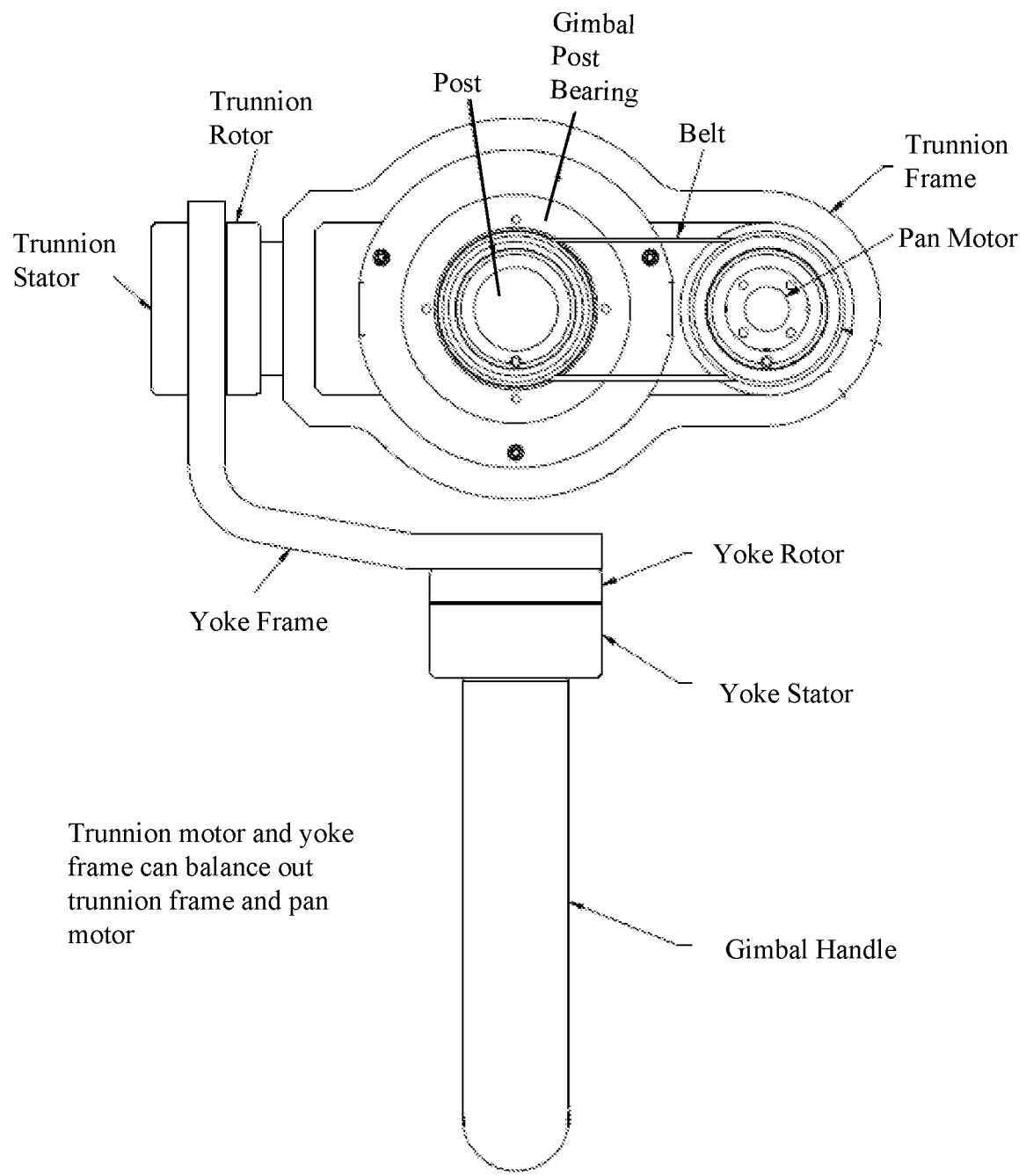
FIG. 69 depicts a further embodiment of a payload stabilization apparatus.

FIGS. 61-69 depict camera stabilization or support apparatuses according to illustrative embodiments of the invention. FIG. 61 is a cross-section of a camera stabilization apparatus. FIG. 62 is a side view of a camera stabilization apparatus. FIG. 63 is a isometric, cross-sectional view of the camera stabilization apparatus. FIG. 64 is a cross-section of the camera stabilization apparatus, including through the roll and tilt motors. FIG. 65 depicts the camera stabilization apparatus including a gimbal post and sled base. FIG. 66 depicts an isometric view of the camera stabilization apparatus. FIG. 67 is an isometric, cross-sectional view through the gimbal of the camera stabilization apparatus. FIG. 68 depicts a camera stabilization apparatus showing how the gimbal portion is attached to a post, which is attached to a camera. The following part numbers apply to FIGS. 61-68.

1. gimbal post
2. pan motor stator magnets
3. pan motor arbor windings
4. inner motor/gimbal hub
5. pan encoder magnet
6. absolute position pan encoder
7. lower gimbal bearing
8. upper gimbal threaded cap
9. upper gimbal bearing
10. gimbal housing
11. lower threaded gimbal cap
12. gimbal grip
13. gimbal handle
14. roll motor
15. tilt motor
16. tilt belt
17. stage
18. roll motor
19. battery
20. monitor
21. sled base
22. tilt pulley
23. tilt bearing
24. tilt axle
25. camera
26. tilt motor housing Motors may be any type of torque generator compatible with the payload support apparatus and its functioning.

In the embodiments shown in FIGS. 61-68, the pan motor is integral to the gimbal handle and the main post which, allows the gimbal to move up and down to adjust for proper sled balance. This is contrary to conventional technology that has the handle surrounding the motor. The convention technology does not accommodate movement or adjustment of the gimbal along a central post. Movement of the gimbal is critical to camera stabilization apparatus operation and used to aid the user in adjusting the position of the central sled mass such that high or low camera positions can be easily accommodated and balanced for.

Having the mass of a pan motor central to the gimbal will improve gimbal balance, as opposed to positioning such a motor off axis and compensating its mass by use of counter balance weights.

Having the pan motor also directly coupled to the pan axis, will negate the addition of any backlash compensation methods or precision components that may be employed to link an off axis motor to the main pan axis. This would allow for more responsive feedback loops and precise motor positioning control.

The camera stabilization apparatus depicted in FIGS. 61-68 has the roll motor 14 aligned with the gimbal handle 13, allowing for a more ergonomic design and also a more responsive feedback loop and precise motor positioning control as mentioned above.

Having the addition of a pan motor on a traditional camera stabilization platform architecture adds control to the third rotational axis of movement thus allowing stabilization of this axis as outlined in U.S. Pat. No. 10,359,690 B2, incorporated herein by reference. Its operation is that of a motor utilizing electromotive force between stator and rotor to impart rotational torque on the central post to compensate or adjust for undesirable panning motion that may be imparted on the camera from the operator or other external forces.

Drive electronics for the pan, tilt and roll motors in this embodiment can be located on or off the main gimbal body. Positioning of such electronics has not been shown.

The use of an absolute pan position encoder also allows the mechanism to be easily and quickly turned on and ready for operation as it will not require a start-up routine to align the rotational position of the gimbal with the reference electronics in the stage or mounted onto the gimbal itself.

Permanent magnets and stator slots are mismatched in the pan, roll and tilt motors as to help reduce cogging torque and reduce the undesirable jerkiness thereof, allowing for smoother gimbal and thus camera movements.

FIG. 68 depicts a further embodiment of the camera stabilization apparatus. In this embodiment is a fully counterbalanced alternative that accommodates offset pan drive motor driven with a timing belt where all counterbalancing weights are useful weights not dead counterweights.

It is noted that portions of the application refer to "camera stabilization" but the apparatuses and methods can be applied to level and stabilize other payloads.

The invention may be embodied in a variety of ways, for example, a system, method or device. The invention includes the methods as described herein, and processors to carry out the methods, including storage devices and components and any associated program code.

The invention includes an actively stabilized payload support, a non-transitory computer-readable medium and a method of stabilizing a payload according to any of the embodiments depicted or described herein, their equivalents, and apparatuses comprising any possible combination of elements of the aforementioned.

Various illustrative embodiments of the invention have been described, each having a different combination of elements. The invention is not limited to the specific embodiments disclosed, and may include different combinations of the elements disclosed, omission of some elements, or the replacement of elements by equivalents of such structures.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention for example by implementing the invention for payloads other than cameras and varying positions of components. Accordingly, it is intended that the invention not be limited to the specific illustrative embodiments, but be interpreted within the full spirit and scope of the appended claims and their equivalents.

The invention claimed is:

1. A payload stabilization apparatus comprising:
a gimbal having two or more mutually perpendicular axes about which motion is generated by at least two of a pan motor, a gimbal-bearing motor and a gimbal-yoke motor;
wherein the pan motor is integral to a gimbal handle and surrounds a main post of the gimbal handle.

2. The payload stabilization apparatus of claim 1 wherein the mass of the pan motor is central to the gimbal.

3. The payload stabilization apparatus of claim 1 wherein the pan motor is directly coupled to the pan axis.

4. The payload stabilization apparatus of claim 1 wherein the gimbal-yoke motor is aligned with the gimbal handle.

5. The payload stabilization apparatus of claim 1 further comprising:
drive electronics for at least one of the pan, gimbal-bearing and gimbal-yoke motors located on the main gimbal body.

6. The payload stabilization apparatus of claim 1 further comprising:
drive electronics for at least one of the pan, gimbal-bearing and gimbal-yoke motors located off the main gimbal body.

7. The payload stabilization apparatus of claim 1, wherein tilt and roll axes of the payload are controlled based on a calculation of proportional power provided by drive electronics to the gimbal-bearing and gimbal-yoke motors as the gimbal itself rotates about the pan axis.

8. The payload stabilization apparatus of claim 1 further comprising permanent magnets and stator slots that are mismatched in at least one of the pan, roll and tilt motors.

9. The payload stabilization apparatus of claim 1 further comprising a payload stabilization system configured to act upon the payload stabilization apparatus having at least two mutually perpendicular rotational axes.

10. A method of stabilizing a payload stabilization apparatus, the method comprising:
providing a payload stabilization apparatus with a gimbal having two or more mutually perpendicular axes about which motion is generated by at least two of a pan motor, a gimbal-bearing motor and a gimbal-yoke motor; wherein the pan motor is integral to a gimbal handle and surrounds a main post of the gimbal handle;
providing a supplemental pan torque value;
providing a supplemental roll torque value;
calculating by a real time signal processor torques to be generated by the roll motor and pan motor based on the supplemental pan torque value, the supplemental roll torque value and a tilt angle; and
applying signals to the pan and gimbal-yoke motors based on the calculated torques.

11. A non-transitory computer readable medium with computer executable instructions stored thereon executed by a processor to perform a payload stabilization method for a payload stabilization apparatus with a gimbal having a yoke comprising:
- providing a supplemental pan torque value;
- providing a supplemental roll torque value;
- tracking a tilt axis angle representing a momentary angular position of the gimbal yoke as momentary relationships of the gimbal torques vary;
- calculating by a real time signal processor torques to be generated by the gimbal-yoke motor and pan motor based on the supplemental pan torque value, the supplemental roll torque value and the tilt axis angle; and
- applying signals to pan and gimbal-yoke motors based on the calculated torques.

12. A payload stabilization apparatus comprising:
- a gimbal having two or more mutually perpendicular axes about which motion is generated by at least two of a pan motor, a tilt motor and a roll motor;
- wherein the gimbal is fully counterbalanced thereby accommodating an offset pan drive motor driven with a timing belt where all counterbalancing weights are useful weights not dead counterweights.

\* \* \* \* \*